(12) United States Patent
Deng et al.

(10) Patent No.: US 11,856,235 B2
(45) Date of Patent: Dec. 26, 2023

(54) ADAPTIVE LOOP FILTERING

(71) Applicants: Beijing Bytedance Network Technology Co., Ltd., Beijing (CN); Bytedance Inc., Los Angeles, CA (US)

(72) Inventors: Zhipin Deng, Beijing (CN); Ye-Kui Wang, Los Angeles, CA (US); Li Zhang, Los Angeles, CA (US); Kai Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/942,845

(22) Filed: Sep. 12, 2022

(65) Prior Publication Data
US 2023/0071955 A1  Mar. 9, 2023

Related U.S. Application Data

(63) Continuation of application No. PCT/CN2021/080187, filed on Mar. 11, 2021.

(30) Foreign Application Priority Data

Mar. 11, 2020  (WO) ............... PCT/CN2020/078770

(51) Int. Cl.
*H04N 19/70* (2014.01)
*H04N 19/17* (2014.01)
(Continued)

(52) U.S. Cl.
CPC .......... *H04N 19/70* (2014.11); *H04N 19/117* (2014.11); *H04N 19/12* (2014.11); *H04N 19/124* (2014.11);
(Continued)

(58) Field of Classification Search
None
See application file for complete search history.

(56) References Cited

U.S. PATENT DOCUMENTS

| 2015/0264099 A1 | 9/2015 | Deshpande |
| 2016/0100161 A1 | 4/2016 | Chang et al. |

(Continued)

FOREIGN PATENT DOCUMENTS

| CN | 103096054 A | 5/2013 |
| CN | 103688547 A | 3/2014 |

(Continued)

OTHER PUBLICATIONS

Ma et al., "AHG9: Constraints on ALF APS," JVET-Q0358, 17th Meeting: Brussels, BE, Jan. 2020.*
(Continued)

*Primary Examiner* — Michael J Hess
(74) *Attorney, Agent, or Firm* — Conley Rose, P.C.

(57) ABSTRACT

Methods, systems and apparatus for video processing are described. One example video processing method includes performing a conversion between a video including a video region and a bitstream of the video according to a rule, wherein the rule specifies that an adaptive loop filtering operation is allowed for the video region in response to an absence of one or more adaptation parameter set (APS) network abstraction layer (NAL) units that include adaptive loop filtering data.

20 Claims, 19 Drawing Sheets

1600

1602 — Performing a conversion between a video comprising video pictures and a bitstream of the video according to a rule, wherein the rule specifies that an adaptive loop filtering operation or a cross-component adaptive loop filtering operation is disallowed in response to a first value of a first syntax element having a value of 1 that indicates that that a second value of a second syntax element is equal to 0, wherein the rule specifies that a general constraint information syntax structure includes the first syntax element, and wherein the rule specifies that the second syntax element in a sequence parameter set (SPS) having a value of 0 indicates that the cross-component adaptive loop filtering operation is disabled for all video pictures of the video

(51) Int. Cl.
*H04N 19/186* (2014.01)
*H04N 19/117* (2014.01)
*H04N 19/136* (2014.01)
*H04N 19/169* (2014.01)
*H04N 19/30* (2014.01)
*H04N 19/12* (2014.01)
*H04N 19/157* (2014.01)
*H04N 19/176* (2014.01)
*H04N 19/124* (2014.01)
*H04N 19/132* (2014.01)
*H04N 19/172* (2014.01)
*H04N 19/174* (2014.01)
*H04N 19/60* (2014.01)
*H04N 19/85* (2014.01)

(52) U.S. Cl.
CPC ......... *H04N 19/132* (2014.11); *H04N 19/136* (2014.11); *H04N 19/157* (2014.11); *H04N 19/17* (2014.11); *H04N 19/172* (2014.11); *H04N 19/174* (2014.11); *H04N 19/176* (2014.11); *H04N 19/186* (2014.11); *H04N 19/188* (2014.11); *H04N 19/1887* (2014.11); *H04N 19/30* (2014.11); *H04N 19/60* (2014.11); *H04N 19/85* (2014.11)

(56) References Cited

U.S. PATENT DOCUMENTS

| | | |
|---|---|---|
| 2016/0345014 A1 | 11/2016 | Kim et al. |
| 2017/0238014 A1 | 8/2017 | Said |
| 2017/0238019 A1 | 8/2017 | Said |
| 2019/0068985 A1 | 2/2019 | Yamamoto et al. |
| 2019/0327477 A1 | 10/2019 | Ramasubramonian et al. |
| 2019/0387241 A1 | 12/2019 | Kim |
| 2020/0260070 A1 | 8/2020 | Yoo |
| 2020/0322623 A1 | 10/2020 | Chiang |
| 2020/0389671 A1 | 12/2020 | Zhao |
| 2020/0396475 A1 | 12/2020 | Furht |
| 2021/0092408 A1 | 3/2021 | Ramasubramonian |
| 2021/0092460 A1 | 3/2021 | Chen |
| 2021/0136415 A1 | 5/2021 | Hashimoto |
| 2021/0185321 A1 | 6/2021 | Liao |
| 2021/0274204 A1 | 9/2021 | He |
| 2021/0377525 A1 | 12/2021 | Lim |
| 2021/0409779 A1 | 12/2021 | Li |
| 2022/0007043 A1 | 1/2022 | Park |
| 2022/0070473 A1 | 3/2022 | Ye |
| 2022/0078415 A1* | 3/2022 | Taquet ................. H04N 19/176 |
| 2022/0094936 A1 | 3/2022 | Lai |
| 2022/0109877 A1 | 4/2022 | Choi |
| 2022/0224884 A1 | 7/2022 | Kim |
| 2022/0394301 A1 | 12/2022 | Deshpande |
| 2022/0408114 A1 | 12/2022 | Deshpande |

FOREIGN PATENT DOCUMENTS

| | | | |
|---|---|---|---|
| CN | 103907349 A | 7/2014 | |
| CN | 104054345 A | 9/2014 | |
| CN | 104509115 A | 4/2015 | |
| CN | 104604236 A | 5/2015 | |
| CN | 106170980 A | 11/2016 | |
| CN | 107409227 A | 11/2017 | |
| CN | 110178372 A | 8/2019 | |
| CN | 110506421 A | 11/2019 | |
| CN | 110870311 A | 3/2020 | |
| WO | 2013156679 A1 | 10/2013 | |
| WO | 2014098704 A1 | 6/2014 | |
| WO | 2015161271 A1 | 10/2015 | |
| WO | 2019205998 A1 | 10/2019 | |
| WO | 2019235887 A1 | 12/2019 | |
| WO | WO-2021032751 A1 * | 2/2021 | ........... H04N 19/105 |
| WO | 2021045765 A1 | 3/2021 | |
| WO | 2021053002 A1 | 3/2021 | |
| WO | 2021108750 A1 | 6/2021 | |
| WO | 2021174098 A1 | 9/2021 | |

OTHER PUBLICATIONS

Browne et al., "Monochrome processing," JVET-Q0438, 17th Meeting: Brussels, BE, Jan. 2020.*
Hu et al., "AHG9: On constraints for ALF APS," JVET-Q0248, 17th Meeting: Brussels, BE, Jan. 2020.*
Hu et al., "CE5-related: Removing number of filters for CC-ALF in slice and picture header," JVET-Q0250, 17th Meeting: Brussels, BE, Jan. 2020.*
Kotra et al., "CE5-related: High level syntax modifications for CCALF," JVET-Q0253-v1, 17th Meeting: Brussels, BE, Jan. 2020.*
Kotra et al., CE5-related: High level syntax modifications for CCALF (combination of JVET-Q0253 and JVET-Q0520), JVET-Q0782-v3, 17th Meeting: Brussels, BE, Jan. 2020.*
Wang et al., "AHG9: Cleanups on signaling for CC-ALF, BDPCM, ACT and Palette," JVET-Q0520-v1, 17th Meeting: Brussels, BE, Jan. 2020.*
Auyeung et al., "Modifications to VVC Draft 7 to support monochrome and independently coded color planes," JVET-Q0265, 17th Meeting: Brussels, BE, Jan. 2020.*
"Series H: Audiovisual and Multimedia Systems Infrastructure of audiovisual services—Coding of moving video High efficiency video coding," ITU-T and ISO/IEC, Rec. ITU-T H.265 | ISO/IEC 23008-2 (in force edition), Nov. 2019, 712 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-Q2001-vD, Bross, B., et al., Versatile Video Coding (Draft 8), Joint Video Experts Team (JVET) of ITU-T SG 16 WP 3 and ISO/IEC JTC 1/SC 29/WG 11 17th Meeting: Brussels, BE, Jan. 7-17, 2020, 511 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Bossen, F., Retrieved from the Internet: https://vcgit.hhi.fraunhofer.de/jvet/VVCSoftware_VTM.git, Dec. 6, 2022, 3 pages.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
Document: JVET-Q0505, Zhang, H., et al., "AHG15: Improvement for Quantization Matrix Signaling," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.
Document: JVET-Q0420-v1, Li, L., et al., "AHG12: Signaling of chroma presence in PPS and APS," Joint Video Experts Team (JVET) of ITU-T SG 16 WP 3 and ISO/IEC JTC 1/SC 29/WG 11 17th Meeting: Brussels, BE, Jan. 7-17, 2020, 3 pages.
Document: JVET-R0074-v3, Deng, Z., et al., "AHG9: Removal of APS semantics dependencies on SPS," Joint Video Experts Team (JVET) of ITU-T SG 16 WP 3 and ISO/IEC JTC 1/SC 29/WG 11 18th Meeting: by teleconference, Apr. 15-24, 2020, 6 pages.
Document: JVET-R0177, Naser, K., et al., "AhG 9: APS Cleanup," Joint Video Experts Team (JVET) of ITU-T SG 16 WP 3 and ISO/IEC JTC 1/SC 29/WG 11 18th Meeting: by teleconference, Apr. 15-24, 2020, 8 pages.
Document: JVET-Q0183-v1, Hsiang, S., et al., "AHG9: High-level syntax related to transform skip mode," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.
Document: JVET-P0430r1, Chang, Y., et al., "AHG17: High level syntax cleanup on the syntax elements of transform skip," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.

(56) References Cited

OTHER PUBLICATIONS

Document: JVET-R0049-v1, Hsiang, et al., "AHG9: HLS on disabling TSRC," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Document: JVET-R0068-v1, Wang, Y.K., et al., "AHG8/AHG9/AHG12: Miscellaneous HLS topics," Joint Video Experts Team (JVET) of ITU-T SG 16 WP 3 and ISO/IEC JTC 1/SC 29/WG 11 18th Meeting: by teleconference, Apr. 15-24, 2020, 10 pages.
Document: JVET-Q0374-v1, Kim, D., et al., "AHG9: Cleanups on redundant signalling in HLS," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.
Document: JVET-O0178-r1, Deshpande, S., et al., "On DPB Parameters," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.
Document: JVET-Q0270, Pettersson, M., et al., "AHG9: On Picture Header Modifications," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
Document: JVET-O0288-v1, Chubach, O., et al., "CE5-related: On the syntax constraints of ALF APS," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.
Document: JVET-P0223-v2, Choi, B., et al., "AHG8/AHG12: Efficient signaling of picture size and partitioning information," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.
Document: JVET-Q0260, Samuelsson, J., et al., "AHG9: Intended display resolution," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.
Document: JVET-R0262-v2, He, Y., et al., "AHG9: On PPS syntax," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Document: JVET-P0241-v1, Hellman, T., et al., "AHG17/CE1-related: Specifying Scaling Regions for Reference Picture Resampling," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.
Document: JVET-P0591, Seregin, V., et al., "AHG8: Resampled output picture," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Document: JVET-S0050-v3, Deng, Z., et al., "AHG9: On general constraints information," Joint Video Experts Team (JVET) of ITU-T SG 16 WP 3 and ISO/IEC JTC 1/SC 29/WG 11 19th Meeting: by teleconference, Jun. 22-Jul. 1, 2020, 9 pages.
Document: JVET-S0129-v2, Li, L., et al., "AHG9: cleanup on parameter sets and GCI," Joint Video Experts Team (JVET) of ITU-T SG 16 WP 3 and ISO/IEC JTC 1/SC 29/WG 11 19th Meeting: by teleconference, Jun. 22-Jul. 1, 2020, 15 pages.
Document: JVET-P0476, Chao, Y., et al., "Non-CE8: Palette mode and prediction mode signaling," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.
Document: JVET-P0063-v2, Zhao, Y., et al., "AHG16: Fix on local dual tree," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.
Foreign Communication From A Related Counterpart Application, International Application No. PCT/CN2021/080175, English Translation of International Search Report dated Jun. 9, 2021, 11 pages.
Foreign Communication From A Related Counterpart Application, International Application No. PCT/CN2021/080180, English Translation of International Search Report dated Jun. 9, 2021, 11 pages.
Foreign Communication From A Related Counterpart Application, International Application No. PCT/CN2021/080183, English Translation of International Search Report dated Jun. 17, 2021, 10 pages.
Foreign Communication From A Related Counterpart Application, International Application No. PCT/CN2021/080187, English Translation of International Search Report dated Jun. 10, 2021, 13 pages.
Foreign Communication From A Related Counterpart Application, International Application No. PCT/CN2021/080190, English Translation of International Search Report dated May 27, 2021, 11 pages.
Foreign Communication From A Related Counterpart Application, International Application No. PCT/CN2021/096705, English Translation of International Search Report dated Aug. 30, 2021, 10 pages.
Foreign Communication From A Related Counterpart Application, International Application No. PCT/CN2021/096707, English Translation of International Search Report dated Aug. 26, 2021, 9 pages.
Document: JVET-Q2001-vD, Bross, B., et al., "Versatile Video Coding (Draft 8)," Joint Video Experts Team (JVET) of ITU-T SG 16 WP 3 and ISO/IEC JTC 1/SC 29/WG 11, 17th Meeting: Brussels, BE Jan. 7-17, 2020, 509 pages.
Document: JVET-R0073-v1, Deng, Z., et al., "AHG9: Some cleanups on QP delta signalling," Joint Video Experts Team (JVET) of ITU-T SG 16 WP 3 and ISO/IEC JTC 1/SC 29/WG 11, 18th Meeting: by teleconference, Apr. 15-24, 2020, 7 pages.
Non-Final Office Action dated Feb. 10, 2023, 28 pages, U.S. Appl. No. 17/942,432, filed Sep. 12, 2022.
Non-Final Office Action dated Mar. 31, 2023, 17 pages, U.S. Appl. No. 17/942,618, filed Sep. 12, 2022.
Non-Final Office Action dated Feb. 14, 2023, 22 pages, U.S. Appl. No. 17/942,880, filed Sep. 12, 2022.
Foreign Communication From A Related Counterpart Application, European Application No. 21768196.4 dated Apr. 14, 2023, 13 pages.
Non-Final Office Action dated Apr. 12, 2023, 18 pages, U.S. Appl. No. 18/071,335, filed Nov. 29, 2022.
Non-Final Office Action dated Jun. 12, 2023, 19 pages, U.S. Appl. No. 17/942,880, filed Sep. 12, 2022.
Document: JVET-Q0817-v1, Hendry, et al., "AHG12: On single_slice_per_subpic_flag constraint," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.
Document: JVET-Q2001-vC, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 508 pages.
Document: JVET-Q0382-v1, Chen, F., "CE5-related: On high level syntax of CC-ALF," Joint Video Experts Team (JVET) of ITU-T SG 16 WP 3 and ISO/IEC JTC 1/SC 29/WG 11, 17th Meeting: Brussels, BE, Jan. 7-17, 2020, 5 pages.
Foreign Communication From A Related Counterpart Application, European Application No. 21767845.7, Extended European Search Report dated Jul. 14, 2023, 9 pages.
Foreign Communication From A Related Counterpart Application, European Application No. 21768196.4, Extended European Search Report dated Jul. 14, 2023, 14 pages.

* cited by examiner

ADAPTIVE LOOP FILTERING

CROSS REFERENCE TO RELATED APPLICATIONS

This application is a continuation of International Patent Application No. PCT/CN2021/080187, filed on Mar. 11, 2021 which claims the priority to and benefits of International Patent Application No. PCT/CN2020/078770, filed on Mar. 11, 2020. For all purposes under the law, the entire disclosure of the aforementioned application is incorporated by reference as part of the disclosure of this application. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video comprising a video unit and a bitstream of the video according to a rule, wherein the rule specifies whether or how to include, in an adaptation parameter set (APS), information related to a scaling list of the video is based on a first syntax element that indicates whether the APS includes chroma component related syntax elements and is independent of one or more syntax elements in a sequence parameter set (SPS).

In another example aspect, a video processing method is disclosed. The method includes performing a conversion between a video and a bitstream of the video according to a rule, wherein the rule specifies that a syntax element is included in an adaptation parameter set (APS), and wherein the rule specifies that the syntax element indicates whether one or more syntax elements for chroma residual scaling are included in the APS.

In another example aspect, a video processing method is disclosed. The method includes performing a conversion between a video and a bitstream of the video according to a rule, wherein the rule specifies that whether one or more syntax elements for chroma residual scaling are included in an adaptation parameter set (APS) is based on a first syntax element indicating whether the APS includes chroma component related syntax elements.

In another example aspect, a video processing method is disclosed. The method includes performing a conversion between a video comprising a video block and a bitstream of the video according to a rule, wherein the rule specifies whether to include, in a slice header (SH), a first syntax element that indicates whether a transform skip based residual coding is disabled for a slice, and wherein the rule specifies that whether to include the first syntax element in the SH is selectively based on a second syntax element in a sequence parameter set (SPS) that indicates whether a transform skip (TS) mode is enabled for the video block.

In another example aspect, a video processing method is disclosed. The method includes performing a conversion between a video comprising a luma block and a bitstream of the video according to a rule, wherein the rule specifies that whether a slice header (SH) includes a first syntax element is based on a second syntax element, and wherein the first syntax element indicates whether use of a delta quantization parameter (QP) is enabled for one or more coding units (CUs) of a specific slice of the luma block.

In another example aspect, a video processing method is disclosed. The method includes performing a conversion between a video comprising video pictures and a bitstream of the video according to a rule, wherein the rule specifies that responsive to a first syntax element indicating that each subpicture of a video picture includes only one rectangular slice: a second syntax element plus 1 indicating a number of rectangular slices in each video picture referring to a picture parameter set (PPS) is equal to a third syntax element plus 1 indicating a number of subpictures in each video picture in a coded layer video sequence (CLVS) of the bitstream.

In another example aspect, a video processing method is disclosed. The method includes performing a conversion between a video comprising video pictures and a bitstream of the video according to a rule, wherein the rule specifies that a picture parameter set (PPS) includes one or more syntax element that indicates whether a video picture of the video is divided into tile rows or columns with a first number of tile rows or columns having a same height and a second number of tile rows or columns having different heights or widths, and wherein the first number of tile rows or columns are located in the video picture before the second number of tile rows or columns.

In another example aspect, a video processing method is disclosed. The method includes performing a conversion between a video comprising a video region and a bitstream of the video according to a rule, wherein the rule specifies that an adaptive loop filtering operation is allowed for the video region in response to an absence of one or more adaptation parameter set (APS) network abstraction layer (NAL) units that include adaptive loop filtering data.

In another example aspect, a video processing method is disclosed. The method includes performing a conversion between a video comprising a video region and a bitstream of the video according to a rule, wherein the rule specifies that an adaptive loop filtering operation is not allowed for the video region in response to an absence of one or more adaptation parameter set (APS) network abstraction layer (NAL) units that include adaptive loop filtering data.

In another example aspect, a video processing method is disclosed. The method includes performing a conversion between a video comprising video pictures and a bitstream of the video according to a rule, wherein the rule specifies that an adaptive loop filtering operation or a cross-component adaptive loop filtering operation is disallowed in response to a first value of a first syntax element having a value of 1 that indicates that that a second value of a second syntax element is equal to 0, wherein the rule specifies that a general constraint information syntax structure includes the first syntax element, and wherein the rule specifies that the second syntax element in a sequence parameter set (SPS)

having a value of 0 indicates that the cross-component adaptive loop filtering operation is disabled for all video pictures of the video.

In another example aspect, a video processing method is disclosed. The method includes performing a conversion between a video comprising one or more video pictures and a bitstream of the video according to a rule, wherein the rule specifies that whether to include one or more syntax elements that indicate a number of adaptation parameter sets (APSs) that includes adaptive loop filtering data and/or one or more syntax elements that indicate APS identifiers for an adaptive loop filtering operation or a cross-component adaptive loop filtering operation is based on a presence of a first syntax element that indicates whether an APS network abstraction layer (NAL) unit that includes the adaptive loop filtering data is present in the bitstream.

In another example aspect, a video processing method is disclosed. The method includes performing a conversion between a video and a bitstream of the video according to a rule, wherein the rule specifies that one or more syntax elements are indicated in a parameter set or a header or a syntax structure to indicate that any one or more of the following is disabled: an adaptive loop filtering operation, a cross-component adaptive loop filtering operation, a luma mapping with chroma scaling (LMCS) operation, or one or more user-defined scaling lists.

In another example aspect, a video processing method is disclosed. The method includes performing a conversion between a video comprising video pictures and a bitstream of the video according to a rule, wherein the rule specifies that a set of conformance window parameters are omitted from a picture parameter set (PPS) in response to: a width of each video picture referring to the PPS in units of luma samples being equal to a maximum picture width indicated in a sequence parameter set (SPS) in units of luma samples referred to by the each video picture, and a height of each video picture referring to the PPS in units of luma samples being equal to a maximum picture height indicated in the SPS in units of luma samples.

In another example aspect, a video processing method is disclosed. The method includes performing a conversion between a video region of a video and a coded representation of the video; wherein the coded representation conforms to a format rule; wherein the format rule specifies that a flag indicating whether a scaling list for a color component in the video is included in an adaptation parameter set independently of syntax field values in a sequence parameter set.

In another example aspect, another video processing method is disclosed. The method includes performing a conversion between a video region of a video and a coded representation of the video region; wherein the coded representation conforms to a format rule; wherein the format rule specifies that one or more adaptation parameter sets are included in the coded representation such that, for each adaptation parameter set, chroma related syntax elements are omitted due to a chroma constraint on the video.

In another example aspect, another video processing method is disclosed. The method includes performing a conversion between a video comprising one or more video regions comprising one or more video units and a coded representation of the video; wherein the coded representation conforms to a format rule; wherein the format rule specifies that whether a first transform coding syntax field is included in the coded representation at a level of a video unit of a video region and/or a value thereof depends on a value of a second transform coding syntax field at a level of the video region.

In another example aspect, another video processing method is disclosed. The method includes performing a conversion between a video comprising one or mode video regions, each video region comprising one or more video units and a coded representation of the video; wherein the coded representation conforms to a format rule; wherein the format rule specifies that a flag at a video unit level controls whether a differential signaling of quantization parameter is enabled for the conversion.

In another example aspect, another video processing method is disclosed. The method includes performing a conversion between a video comprising one or mode video regions, each video region comprising one or more video units and a coded representation of the video; wherein the coded representation conforms to a format rule; wherein the format rule specifies interpretation of a first flag at picture level indicative of number of subpictures and a second flag at subpicture level indicative of a number of slices in a subpicture.

In another example aspect, another video processing method is disclosed. The method includes performing a conversion between a video comprising one or more video pictures, each video picture comprising one or more slices and/or one or more tiles and a coded representation of the video; wherein the coded representation conforms to a format rule; wherein the format rule specifies that a field in a picture parameter set associated with a video picture indicates whether video picture is divided into multiple tile rows or columns of different heights or widths.

In another example aspect, another video processing method is disclosed. The method includes performing a conversion between a video comprising one or more video pictures, each video picture comprising one or more slices and/or one or more tiles and a coded representation of the video; wherein the coded representation conforms to a format rule; wherein the format rule specifies that applicability of adaptive loop filtering to a video region in case that an adaptation parameter set excludes indication of adaptive loop filtering is based on a second rule.

In another example aspect, another video processing method is disclosed. The method includes performing a conversion between a video comprising one or more video pictures, each video picture comprising one or more slices and/or one or more tiles and a coded representation of the video; wherein the coded representation conforms to a format rule; wherein the format rule specifies that explicit signaling of conformance window parameters in a picture parameter set is skipped for pictures that have a width and a height a maximum width and a maximum height of the video.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

DETAILED DESCRIPTION

Figure 1:
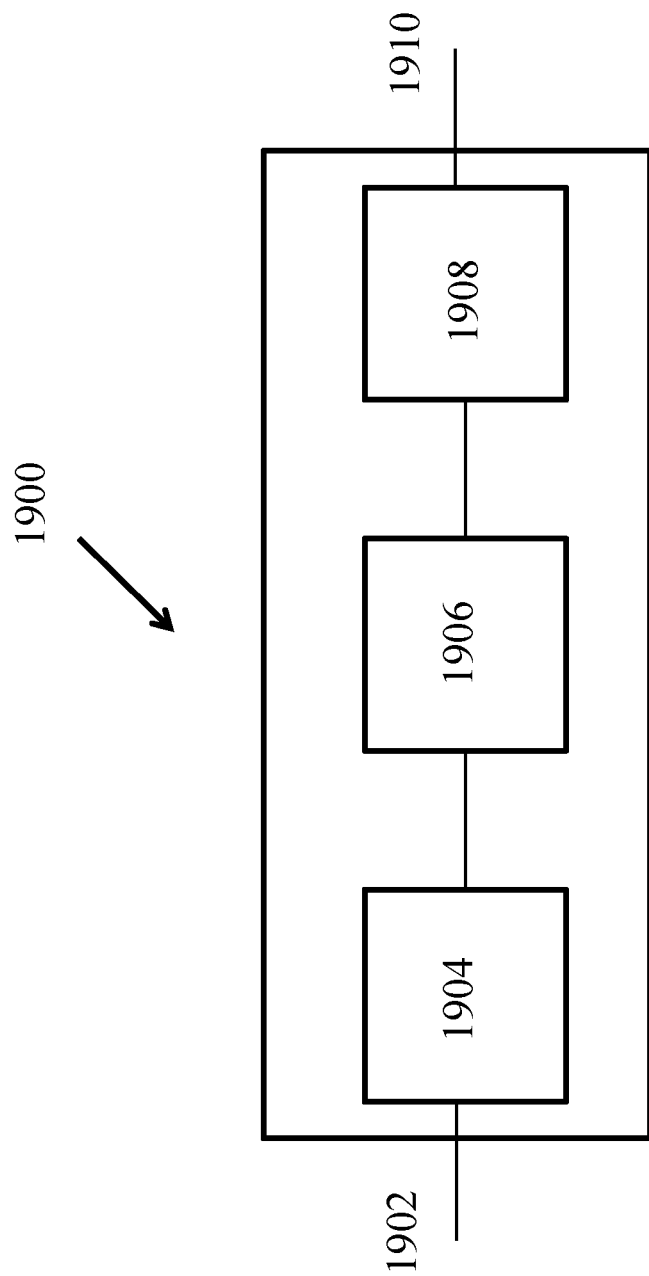
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Introduction

This document is related to video coding technologies. Specifically, it is about the design of slice header (SH), picture parameter set (PPS), adaptation parameter set (APS), and general constraint information (GCI) syntax elements in video coding. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DPB Decoded Picture Buffer
DPS Decoding Parameter Set
EOB End Of Bitstream
EOS End Of Sequence
GCI General Constraint Information
GDR Gradual Decoding Refresh
HEVC High Efficiency Video Coding
HRD Hypothetical Reference Decoder
IDR Instantaneous Decoding Refresh
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RBSP Raw Byte Sequence Payload
SEI Supplemental Enhancement Information
SH Slice Header
SPS Sequence Parameter Set
SVC Scalable Video Coding
VCL Video Coding Layer
VPS Video Parameter Set
VTM VVC Test Model
VUI Video Usability Information
VVC Versatile Video Coding 3. Initial Discussion Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint ExplorationModel (JEM). The JVET meeting is concurrently held once every quarter, and the new coding standard is targeting at 500 bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion, Final Draft International Standard (FDIS), at the July 2020 meeting.

3.1. GCI Syntax and Semantics

In the latest VVC draft text, the GCI syntax and semantics are as follows:

|  | Descriptor |
|---|---|
| general_constraint_info( ) { |  |
|   general_progressive_source_flag | u(1) |
|   general_interlaced_source_flag | u(1) |
|   general_non_packed_constraint_flag | u(1) |
|   general_frame_only_constraint_flag | u(1) |
|   general_non_projected_constraint_flag | u(1) |
|   intra_only_constraint_flag | u(1) |
|   max_bitdepth_constraint_idc | u(4) |
|   max_chroma_format_constraint_idc | u(2) |
|   no_res_change_in_clvs_constraint_flag | u(1) |
|   one_tile_per_pic_constraint_flag | u(1) |
|   one_slice_per_pic_constraint_flag | u(1) |
|   one_subpic_per_pic_constraint_flag | u(1) |
|   no_qtbtt_dual_tree_intra_constraint_flag | u(1) |
|   no_partition_constraints_override_constraint_flag | u(1) |
|   no_sao_constraint_flag | u(1) |
|   no_alf_constraint_flag | u(1) |
|   no_ccalf_constraint_flag | u(1) |
|   no_joint_cbcr_constraint_flag | u(1) |
|   no_ref_wraparound_constraint_flag | u(1) |

-continued

| | Descriptor |
|---|---|
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_gpm_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| no_mixed_nalu_types_in_pic_constraint_flag | u(1) |
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| while( !byte_aligned( ) ) | |
|    gci_alignment_zero_bit | f(1) |
| num_reserved_constraint_bytes | u(8) |
| for( i = 0; i < num_reserved_constraint_bytes; i++ ) | |
|    gci_reserved_constraint_byte[ i ] | u(8) |
| } | | general_progressive_source_flag and general_interlaced_source_flag are interpreted as follows:
  If general_progressive_source_flag is equal to 1 and general_interlaced_source_flag is equal to 0, the source scan type of the pictures in OlsInScope should be interpreted as progressive only.
  Otherwise, if general_progressive_source_flag is equal to 0 and general_interlaced_source_flag is equal to 1, the source scan type of the pictures in OlsInScope should be interpreted as interlaced only.
  Otherwise, if general_progressive_source_flag is equal to 0 and general_interlaced_source_flag is equal to 0, the source scan type of the pictures in OlsInScope should be interpreted as unknown or unspecified.
  Otherwise (general_progressive_source_flag is equal to 1 and general_interlaced_source_flag is equal to 1), the source scan type of each picture in OlsInScope is indicated at the picture level using the syntax element source_scan_type in a frame-field information supplemental enhancement information (SEI) message. It is a requirement of bitstream conformance that when general_progressive_source_flag is equal to 1 and general_interlaced_source_flag is equal to 1, a frame-field information SEI message shall be present in each access unit (AU).
  NOTE 1—Decoders may ignore the values of general_progressive_source_flag and general_interlaced_source_flag. Moreover, the actual source scan type of the pictures is outside the scope of this Specification and the method by which the encoder selects the values of general_progressive_source_flag and general_interlaced_source_flag is unspecified.
general_non_packed_constraint_flag equal to 1 specifies that there shall not be any frame packing arrangement SEI messages present in the bitstream of the OlsInScope. general_non_packed_constraint_flag equal to 0 does not impose such a constraint.
  NOTE 2—Decoders may ignore the value of general_non_packed_constraint_flag, as there are no decoding process requirements associated with the presence or interpretation of frame packing arrangement SEI messages.
general_frame_only_constraint_flag equal to 1 specifies that OlsInScope conveys pictures that represent frames. general_frame_only_constraint_flag equal to 0 specifies that OlsInScope conveys pictures that may or may not represent frames.
  NOTE 3—Decoders may ignore the value of general_frame_only_constraint_flag, as there are no decoding process requirements associated with it.
general_non_projected_constraint_flag equal to 1 specifies that there shall not be any equirectangular projection SEI messages or generalized cubemap projection SEI messages present in the bitstream of the OlsInScope. general_non_projected_constraint_flag equal to 0 does not impose such a constraint.
  NOTE 4—Decoders may ignore the value of general_non_projected_constraint_flag, as there are no decoding process requirements associated with the presence or interpretation of equirectangular projection SEI messages and generalized cubemap projection SEI messages.
intra_only_constraint_flag equal to 1 specifies that slice_type shall be equal to I. intra_only_constraint_flag equal to 0 does not impose such a constraint.
max_bitdepth_constraint_idc specifies that bit_depth_minus8 shall be in the range of 0 to max_bitdepth_constraint_idc, inclusive.
max_chroma_format_constraint_idc specifies that chroma_format_idc shall be in the range of 0 to max_chroma_format_constraint_idc, inclusive.
no_res_change_in_clvs_constraint_flag equal to 1 specifies that res_change_in_clvs_allowed_flag shall be equal to 0. no_res_change_in_clvs_constraint_flag equal to 0 does not impose such a constraint.
one_tile_per_pic_constraint_flag equal to 1 specifies that each picture shall contain only one tile. one_tile_per_pic_constraint_flag equal to 0 does not impose such a constraint.
one_slice_per_pic_constraint_flag equal to 1 specifies that each picture shall contain only one slice. one_slice_per_pic_constraint_flag equal to 0 does not impose such a constraint.
one_subpic_per_pic_constraint_flag equal to 1 specifies that each picture shall contain only one subpicture. one_subpic_per_pic_constraint_flag equal to 0 does not impose such a constraint. When one_slice_per_pic_constraint_flag is equal to 1, the value of one_subpic_per_pic_constraint_flag shall be equal to 1.
no_qtbtt_dual_tree_intra_constraint_flag equal to 1 specifies that qtbtt_dual_tree_intra_flag shall be equal to 0. no_qtbtt_dual_tree_intra_constraint_flag equal to 0 does not impose such a constraint.
no_partition_constraints_override_constraint_flag equal to 1 specifies that partition_constraints_override_enabled_flag shall be equal to 0. no_partition_constraints_override_constraint_flag equal to 0 does not impose such a constraint.
no_sao_constraint_flag equal to 1 specifies that sps_sao_enabled_flag shall be equal to 0. no_sao_constraint_flag equal to 0 does not impose such a constraint.

no_alf_constraint_flag equal to 1 specifies that sps_alf_enabled_flag shall be equal to 0. no_alf_constraint_flag equal to 0 does not impose such a constraint.

no_ccalf_constraint_flag equal to 1 specifies that sps_ccalf_enabled_flag shall be equal to 0. no_ccalf_constraint_flag equal to 0 does not impose such a constraint.

no_joint_cbcr_constraint_flag equal to 1 specifies that sps_joint_cbcr_enabled_flag shall be equal to 0. no_joint_cbcr_constraint_flag equal to 0 does not impose such a constraint.

no_ref_wraparound_constraint_flag equal to 1 specifies that sps_ref_wraparound_enabled_flag shall be equal to 0. no_ref_wraparound_constraint_flag equal to 0 does not impose such a constraint.

no_temporal_mvp_constraint_flag equal to 1 specifies that sps_temporal_mvp_enabled_flag shall be equal to 0. no_temporal_mvp_constraint_flag equal to 0 does not impose such a constraint.

no_sbtmvp_constraint_flag equal to 1 specifies that sps_sbtmvp_enabled_flag shall be equal to 0. no_sbtmvp_constraint_flag equal to 0 does not impose such a constraint.

no_amvr_constraint_flag equal to 1 specifies that sps_amvr_enabled_flag shall be equal to 0. no_amvr_constraint_flag equal to 0 does not impose such a constraint.

no_bdof_constraint_flag equal to 1 specifies that sps_bdof_enabled_flag shall be equal to 0. no_bdof_constraint_flag equal to 0 does not impose such a constraint.

no_dmvr_constraint_flag equal to 1 specifies that sps_dmvr_enabled_flag shall be equal to 0. no_dmvr_constraint_flag equal to 0 does not impose such a constraint.

no_cclm_constraint_flag equal to 1 specifies that sps_cclm_enabled_flag shall be equal to 0. no_cclm_constraint_flag equal to 0 does not impose such a constraint.

no_mts_constraint_flag equal to 1 specifies that sps_mts_enabled_flag shall be equal to 0. no_mts_constraint_flag equal to 0 does not impose such a constraint.

no_sbt_constraint_flag equal to 1 specifies that sps_sbt_enabled_flag shall be equal to 0. no_sbt_constraint_flag equal to 0 does not impose such a constraint.

no_affine_motion_constraint_flag equal to 1 specifies that sps_affine_enabled_flag shall be equal to 0. no_affine_motion_constraint_flag equal to 0 does not impose such a constraint.

no_bcw_constraint_flag equal to 1 specifies that sps_bcw_enabled_flag shall be equal to 0. no_bcw_constraint_flag equal to 0 does not impose such a constraint.

no_ibc_constraint_flag equal to 1 specifies that sps_ibc_enabled_flag shall be equal to 0. no_ibc_constraint_flag equal to 0 does not impose such a constraint.

no_ciip_constraint_flag equal to 1 specifies that sps_ciip_enabled_flag shall be equal to 0. no_cipp_constraint_flag equal to 0 does not impose such a constraint.

no_fpel_mmvd_constraint_flag equal to 1 specifies that sps_fpel_mmvd_enabled_flag shall be equal to 0. no_fpel_mmvd_constraint_flag equal to 0 does not impose such a constraint.

no_gpm_constraint_flag equal to 1 specifies that sps_gpm_enabled_flag shall be equal to 0. no_gpm_constraint_flag equal to 0 does not impose such a constraint.

no_ladf_constraint_flag equal to 1 specifies that sps_ladf_enabled_flag shall be equal to 0. no_ladf_constraint_flag equal to 0 does not impose such a constraint.

no_transform_skip_constraint_flag equal to 1 specifies that sps_transfrom_skip_enabled_flag shall be equal to 0. no_transform_skip_constraint_flag equal to 0 does not impose such a constraint.

no_bdpcm_constraint_flag equal to 1 specifies that sps_bdpcm_enabled_flag shall be equal to 0. no_bdpcm_constraint_flag equal to 0 does not impose such a constraint.

no_qp_delta_constraint_flag equal to 1 specifies that it is a requirement of bitstream conformance that cu_qp_delta_enabled_flag shall be equal to 0. no_qp_delta_constraint_flag equal to 0 does not impose such a constraint.

no_dep_quant_constraint_flag equal to 1 specifies that it is a requirement of bitstream conformance that sps_dep_quant_enabled_flag shall be equal to 0. no_dep_quant_constraint_flag equal to 0 does not impose such a constraint.

no_sign_data_hiding_constraint_flag equal to 1 specifies that it is a requirement of bitstream conformance that sps_sign_data_hiding_enabled_flag shall be equal to 0. no_sign_data_hiding_constraint_flag equal to 0 does not impose such a constraint.

no_mixed_nalu_types_in_pic_constraint_flag equal to 1 specifies that it is a requirement of bitstream conformance that mixed_nalu_types_in_pic_flag shall be equal to 0. no_mixed_nalu_types_in_pic_constraint_flag equal to 0 does not impose such a constraint.

no_trail_constraint_flag equal to 1 specifies that there shall be no NAL unit with nuh_unit_type equal to TRAIL_NUT present in OlsInScope. no_trail_constraint_flag equal to 0 does not impose such a constraint.

no_stsa_constraint_flag equal to 1 specifies that there shall be no NAL unit with nuh_unit_type equal to STSA_NUT present in OlsInScope. no_stsa_constraint_flag equal to 0 does not impose such a constraint.

no_rasl_constraint_flag equal to 1 specifies that there shall be no NAL unit with nuh_unit_type equal to RASL_NUT present in OlsInScope. no_rasl_constraint_flag equal to 0 does not impose such a constraint.

no_radl_constraint_flag equal to 1 specifies that there shall be no NAL unit with nuh_unit_type equal to RADL_NUT present in OlsInScope. no_radl_constraint_flag equal to 0 does not impose such a constraint.

no_idr_constraint_flag equal to 1 specifies that there shall be no NAL unit with nuh_unit_type equal to IDR_W_RADL or IDR_N_LP present in OlsInScope. no_idr_constraint_flag equal to 0 does not impose such a constraint.

no_cra_constraint_flag equal to 1 specifies that there shall be no NAL unit with nuh_unit_type equal to CRA_NUT present in OlsInScope. no_cra_constraint_flag equal to 0 does not impose such a constraint.

no_gdr_constraint_flag equal to 1 specifies that there shall be no NAL unit with nuh_unit_type equal to GDR_NUT present in OlsInScope. no_gdr_constraint_flag equal to 0 does not impose such a constraint.

no_aps_constraint_flag equal to 1 specifies that there shall be no NAL unit with nuh_unit_type equal to PREFIX_APS_NUT or SUFFIX_APS_NUT present in OlsInScope. no_aps_constraint_flag equal to 0 does not impose such a constraint.

gci_alignment_zero_bits shall be equal to 0.

num_reserved_constraint_bytes specifies the number of the reserved constraint bytes. The value of num_reserved_constraint_bytes shall be 0. Other values of num_reserved_constraint_bytes are reserved for future use by ITU-T|ISO/IEC and shall not be present in bitstreams conforming to this version of this Specification.

gci_reserved_constraint_byte[i] may have any value. Its presence and value do not affect decoder conformance to profiles specified in this version of this Specification. Decoders conforming to this version of this Specification shall ignore the values of all the gci_reserved_constraint_byte[i] syntax elements.

3.2. SPS Syntax and Semantics

In the latest VVC draft text, the SPS syntax and semantics are as follows:

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   chroma_format_idc | u(2) |
|   if( chroma_format_idc = = 3 ) | |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag) { | |
|         subpic_treated_as_pic_flag[ i ] | u(1) |
|         loop_filter_across_subpic_enabled_flag[ i ] | u(1) |
|       } | |
|     } | |
|     sps_subpic_id_len_minus1 | ue(v) |
|     subpic_id_mapping_explicitly_signalled_flag | u(1) |
|     if( subpic_id_mapping_explicitly_signalled_flag ) { | |
|       subpic_id_mapping_in_sps_flag | u(1) |
|       if( subpic_id_mapping_in_sps_flag ) | |
|         for( i = 0; i <= sps_num_subpics_minus1; i++ ) | |
|           sps_subpic_id[ i ] | u(v) |
|     } | |
|   } | |
|   bit_depth_minus8 | ue(v) |
|   sps_entropy_coding_sync_enabled_flag | u(1) |
|   if( sps_entropy_coding_sync_enabled_flag ) | |
|     sps_wpp_entry_point_offsets_present_flag | u(1) |
|   sps_weighted_pred_flag | u(1) |
|   sps_weighted_bipred_flag | u(1) |
|   log2_max_pic_order_cnt_lsb_minus4 | u(4) |
|   sps_poc_msb_flag | u(1) |
|   if( sps_poc_msb_flag ) | |
|     poc_msb_len_minus1 | ue(v) |
|   num_extra_ph_bits_bytes | u(2) |
|     extra_ph_bits_struct( num_extra_ph_bits_bytes ) | |
|   num_extra_sh_bits_bytes | u(2) |
|     extra_sh_bits_struct( num_extra_sh_bits_bytes ) | |
|   if( sps_max_sublayers_minus1 > 0 ) | |
|     sps_sublayer_dpb_params_flag | u(1) |
|   if( sps_ptl_dpb_hrd_params_present_flag ) | |
|     dpb_parameters( sps_max_sublayers_minus1, sps_sublayer_dpb_params_flag ) | |
|   long_term_ref_pics_flag | u(1) |
|   inter_layer_ref_pics_present_flag | u(1) |

-continued

| | Descriptor |
|---|---|
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   log2_transform_skip_max_size_minus2 | ue(v) |
|   sps_bdpcm_enabled_flag | u(1) |
| } | |
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( chroma_format_idc == 1 ) { | |
|   sps_chroma_horizontal_collocated_flag | u(1) |
|   sps_chroma_vertical_collocated_flag | u(1) |
| } | |

-continued

|  | Descriptor |
|---|---|
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| six_minus_max_num_merge_cand | ue(v) |
| sps_sbt_enabled_flag | u(1) |
| sps_affine_enabled_flag | u(1) |
| if( sps_affine_enabled_flag ) { | |
|   five_minus_max_num_subblock_merge_cand | ue(v) |
|   sps_affine_type_flag | u(1) |
|   if( sps_amvr_enabled_flag ) | |
|     sps_affine_amvr_enabled_flag | u(1) |
|   sps_affine_prof_enabled_flag | u(1) |
|   if( sps_affine_prof_enabled_flag ) | |
|     sps_prof_pic_present_flag | u(1) |
| } | |
| sps_palette_enabled_flag | u(1) |
| if( ChromaArrayType == 3 && !sps_max_luma_transform_size_64_flag ) | |
|   sps_act_enabled_flag | u(1) |
| if( sps_transform_skip_enabled_flag \|\| sps_palette_enabled_flag ) | |
|   min_qp_prime_ts_minus4 | ue(v) |
| sps_bcw_enabled_flag | u(1) |
| sps_ibc_enabled_flag | u(1) |
| if( sps_ibc_enabled_flag ) | |
|   six_minus_max_num_ibc_merge_cand | ue(v) |
| sps_ciip_enabled_flag | u(1) |
| if( sps_mmvd_enabled_flag ) | |
|   sps_fpel_mmvd_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     max_num_merge_cand_minus_max_num_gpm_cand | ue(v) |
| } | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| log2_parallel_merge_level_minus2 | ue(v) |
| sps_scaling_list_enabled_flag | u(1) |
| sps_dep_quant_enabled_flag | u(1) |
| if( !sps_dep_quant_enabled_flag ) | |
|   sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : | |
|       sps_max_sublayers_minus1 | |
|     ols_hrd_parameters( firstSubLayer, sps_max_sublayers_minus1 ) | |
|   } | |
| } | |
| field_seq_flag | u(1) |
| vui_parameters_present_flag | u(1) |
| if( vui_parameters_present_flag ) | |
|   vui_parameters( ) /* Specified in ITU-T H.SEI \| ISO/IEC 23002-7 */ | |

| | Descriptor |
|---|---|
| sps_extension_flag | u(1) |
| if( sps_extension_flag ) | |
|    while( more_rbsp_data( ) ) | |
|      sps_extension_data_flag | u(1) |
| rbsp_trailing_bits( ) | |
| } | |

An SPS raw byte sequence payload (RBSP) shall be available to the decoding process prior to it being referenced, included in at least one AU with TemporalId equal to 0 or provided through external means.

All SPS NAL units with a particular value of sps_seq_parameter_set_id in a coded video sequence (CVS) shall have the same content.

sps_seq_parameter_set_id provides an identifier for the SPS for reference by other syntax elements.

SPS NAL units, regardless of the nuh_layer_id values, share the same value space of sps_seq_parameter_set_id.

Let spsLayerId be the value of the nuh_layer_id of a particular SPS NAL unit, and vclLayerId be the value of the nuh_layer_id of a particular video coding layer (VCL) NAL unit. The particular VCL NAL unit shall not refer to the particular SPS NAL unit unless spsLayerId is less than or equal to vclLayerId and the layer with nuh_layer_id equal to spsLayerId is included in at least one OLS that includes the layer with nuh_layer_id equal to vclLayerId.

sps_video_parameter_set_id, when greater than 0, specifies the value of vps_video_parameter_set_id for the VPS referred to by the SPS.

When sps_video_parameter_set_id is equal to 0, the following applies:
   The SPS does not refer to a VPS.
   No VPS is referred to when decoding each CLVS referring to the SPS.
   The value of vps_max_layers_minus1 is inferred to be equal to 0.
   The CVS shall contain only one layer (i.e., all VCL NAL unit in the CVS shall have the same value of nuh_layer_id).
   The value of GeneralLayerIdx[nuh_layer_id] is inferred to be equal to 0.
   The value of vps_independent_layer_flag[GeneralLayerIdx[nuh_layer_id]] is inferred to be equal to 1.

When vps_independent_layer_flag[GeneralLayerIdx[nuh_layer_id]] is equal to 1, the SPS referred to by a CLVS with a particular nuh_layer_id value nuhLayerId shall have nuh_layer_id equal to nuhLayerId.

The value of sps_video_parameter_set_id shall be the same in all SPSs that are referred to by CLVSs in a CVS.

sps_max_sublayers_minus1 plus 1 specifies the maximum number of temporal sublayers that may be present in each CLVS referring to the SPS. The value of sps_max_sublayers_minus1 shall be in the range of 0 to vps_max_sublayers_minus1, inclusive.

sps_reserved_zero_4 bits shall be equal to 0 in bitstreams conforming to this version of this Specification. Other values for sps_reserved_zero_4 bits are reserved for future use by ITU-T|ISO/IEC.

sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these four syntax structures is present in the SPS. The value of sps_ptl_dpb_hrd_params_present_flag shall be equal to vps_independent_layer_flag[GeneralLayerIdx[nuh_layer_id]].

gdr_enabled_flag equal to 1 specifies that gradual decoding refresh (GDR) pictures may be present in CLVSs referring to the SPS. gdr_enabled_flag equal to 0 specifies that GDR pictures are not present in CLVSs referring to the SPS.

chroma_format_idc specifies the chroma sampling relative to the luma sampling as specified in clause 6.2.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE 1—There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate_colour_plane_flag, the value of the variable ChromaArrayType is assigned as follows:
   If separate_colour_plane_flag is equal to 0, ChromaArrayType is set equal to chroma_format_idc.
   Otherwise (separate_colour_plane_flag is equal to 1), ChromaArrayType is set equal to 0.

res_change_in_clvs_allowed_flag equal to 1 specifies that the picture spatial resolution may change within a CLVS referring to the SPS. res_change_in_clvs_allowed_flag equal to 0 specifies that the picture spatial resolution does not change within any CLVS referring to the SPS.

pic_width_max_in_luma_samples specifies the maximum width, in units of luma samples, of each decoded picture referring to the SPS. pic_width_max_in_luma_samples shall not be equal to 0 and shall be an integer multiple of Max(8, MinCbSizeY).

It is a requirement of bitstream conformance that, for any output layer set (OLS) with OLS index i that contains one or more layers that refers to the SPS, the value of pic_width_max_in_luma_samples shall be less than or equal to the value of ols_dpb_pic_width[i].

pic_height_max_in_luma_samples specifies the maximum height, in units of luma samples, of each decoded picture referring to the SPS. pic_height_max_in_luma_samples shall not be equal to 0 and shall be an integer multiple of Max(8, MinCbSizeY).

It is a requirement of bitstream conformance that, for any OLS with OLS index i that contains one or more layers that refers to the SPS, the value of pic_height_max_in_luma_samples shall be less than or equal to the value of ols_dpb_pic_height[i].

sps_conformance_window_flag equal to 1 indicates that the conformance cropping window offset parameters follow next in the SPS. sps_conformance_window_flag equal to 0 indicates that the conformance cropping window offset parameters are not present in the SPS.

sps_conf_win_left_offset, sps_conf_win_right_offset, sps_conf_win_top_offset, and sps_conf_win_bottom_offset specify the cropping window that is applied to pictures with pic_width_in_luma_samples equal to pic_width_max_in_luma_samples and pic_height_in_luma_samples equal to pic_height_max_in_luma_samples. When sps_conformance_window_flag is equal to 0, the values of sps_conf_win_left_offset, sps_conf_win_right_offset, sps_conf_win_top_offset, and sps_conf_win_bottom_offset are inferred to be equal to 0.

The conformance cropping window contains the luma samples with horizontal picture coordinates from SubWidthC*sps_conf_win_left_offset to pic_width_max_in_luma_samples−(SubWidthC*sps_conf_win_right_offset+1) and vertical picture coordinates from SubHeightC*sps_conf_win_top_offset to pic_height_max_in_luma_samples−(SubHeightC*sps_conf_win_bottom_offset+1), inclusive.

The value of SubWidthC*(sps_conf_win_left_offset+sps_conf_win_right_offset) shall be less than pic_width_max_in_luma_samples, and the value of SubHeightC*(sps_conf_win_top_offset+sps_conf_win_bottom_offset) shall be less than pic_height_max_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE 2—The conformance cropping window offset parameters are only applied at the output. All internal decoding processes are applied to the uncropped picture size.

sps_log 2_ctu_size_minus5 plus 5 specifies the luma coding tree block size of each CTU. The value of sps_log 2_ctu_size_minus5 shall be in the range of 0 to 2, inclusive. The value 3 for sps_log 2_ctu_size_minus5 is reserved for future use by ITU-T|ISO/IEC.

The variables Ctb Log 2SizeY and CtbSizeY are derived as follows:

$$Ctb\ Log\ 2SizeY = sps\_log\ 2\_ctu\_size\_minus5 + 5 \quad (43)$$

$$CtbSizeY = 1 << Ctb\ Log\ 2SizeY \quad (44)$$

subpic_info_present_flag equal to 1 specifies that subpicture information is present for the CLVS and there may be one or more than one subpicture in each picture of the CLVS. subpic_info_present_flag equal to 0 specifies that subpicture information is not present for the CLVS and there is only one subpicture in each picture of the CLVS.

When res_change_in_clvs_allowed_flag is equal to 1, the value of subpic_info_present_flag shall be equal to 0.

NOTE 3—When a bitstream is the result of a sub-bitstream extraction process and contains only a subset of the subpictures of the input bitstream to the sub-bitstream extraction process, it might be required to set the value of subpic_info_present_flag equal to 1 in the RBSP of the SPSs.

sps_num_subpics_minus1 plus 1 specifies the number of subpictures in each picture in the CLVS. The value of sps_num_subpics_minus1 shall be in the range of 0 to Ceil(pic_width_max_in_luma_samples÷CtbSizeY)*Ceil(pic_height_max_in_luma_samples÷CtbSizeY)−1, inclusive. When not present, the value of sps_num_subpics_minus1 is inferred to be equal to 0.

sps_independent_subpics_flag equal to 1 specifies that no intra prediction, no inter prediction and no in-loop filtering operations may be performed across any subpicture boundary in the CLVS. sps_independent_subpics_flag equal to 0 specifies that inter prediction or in-loop filtering operations across the subpicture boundaries in the CLVS may be allowed. When not present, the value of sps_independent_subpics_flag is inferred to be equal to 0.

subpic_ctu_top_left_x[i] specifies horizontal position of top left CTU of i-th subpicture in unit of CtbSizeY. The length of the syntax element is Ceil(Log 2((pic_width_max_in_luma_samples+CtbSizeY−1)>>Ctb Log 2SizeY)) bits. When not present, the value of subpic_ctu_top_left_x[i] is inferred to be equal to 0.

subpic_ctu_top_left_y[i] specifies vertical position of top left CTU of i-th subpicture in unit of CtbSizeY. The length of the syntax element is Ceil(Log 2((pic_height_max_in_luma_samples+CtbSizeY−1)>>Ctb Log 2SizeY)) bits. When not present, the value of subpic_ctu_top_left_y[i] is inferred to be equal to 0.

subpic_width_minus1[i] plus 1 specifies the width of the i-th subpicture in units of CtbSizeY. The length of the syntax element is Ceil(Log 2((pic_width_max_in_luma_samples+CtbSizeY−1)>>Ctb Log 2SizeY)) bits. When not present, the value of subpic_width_minus1[i] is inferred to be equal to ((pic_width_max_in_luma_samples+CtbSizeY−1)>>Ctb Log 2SizeY)−subpic_ctu_top_left_x[i]−1.

subpic_height_minus1[i] plus 1 specifies the height of the i-th subpicture in units of CtbSizeY. The length of the syntax element is Ceil(Log 2((pic_height_max_in_luma_samples+CtbSizeY−1)>>Ctb Log 2SizeY)) bits. When not present, the value of subpic_height_minus1[i] is inferred to be equal to ((pic_height_max_in_luma_samples+CtbSizeY−1)>>Ctb Log 2SizeY)−subpic_ctu_top_left_y[i]−1.

subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to sps_independent_subpics_flag.

When subpic_treated_as_pic_flag[i] is equal to 1, it is a requirement of bitstream conformance that all of the following conditions are true for each output layer and its reference layers in an OLS that includes the layer containing the i-th subpicture as an output layer:

All pictures in the output layer and its reference layers shall have the same value of pic_width_in_luma_samples and the same value of pic_height_in_luma_samples.

All the SPSs referred to by the output layer and its reference layers shall have the same value of sps_num_subpics_minus1 and shall have the same values of subpic_ctu_top_left_x[j], subpic_ctu_top_left_y[j], subpic_width_minus1[j], subpic_height_minus1[j], and loop_filter_across_subpic_enabled_flag[j], respectively, for each value of j in the range of 0 to sps_num_subpics_minus1, inclusive.

All pictures in each access unit in the output layer and its reference layers shall have the same value of SubpicIdVal[j] for each value of j in the range of 0 to sps_num_subpics_minus1, inclusive.

loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to 1−sps_independent_subpics_flag. It is a requirement of bitstream conformance that the shapes of the subpictures shall be such that each subpicture, when decoded, shall have its entire left boundary and entire top boundary consisting of picture boundaries or consisting of boundaries of previously decoded subpictures.

sps_subpic_id_len_minus1 plus 1 specifies the number of bits used to represent the syntax element sps_subpic_id[i], the syntax elements pps_subpic_id[i], when present, and the syntax element slice_subpic_id, when present. The value of sps_subpic_id_len_minus1 shall be in the range of 0 to 15, inclusive. The value of 1<<(sps_subpic_id_len_minus1+1) shall be greater than or equal to sps_num_subpics_minus1+1.

subpic_id_mapping_explicitly_signalled_flag equal to 1 specifies that the subpicture ID mapping is explicitly signalled, either in the SPS or in the PPSs referred to by coded pictures of the CLVS. subpic_id_mapping_explicitly_signalled_flag equal to 0 specifies that the subpicture ID mapping is not explicitly signalled for the CLVS. When not present, the value of subpic_id_mapping_explicitly_signalled_flag is inferred to be equal to 0.

subpic_id_mapping_in_sps_flag equal to 1 specifies that the subpicture ID mapping is signalled in the SPS when subpic_id_mapping_explicitly_signalled_flag is equal to 1. subpic_id_mapping_in_sps_flag equal to 0 specifies that subpicture ID mapping is signalled in the PPSs referred to by coded pictures of the CLVS when subpic_id_mapping_explicitly_signalled_flag is equal to 1.

sps_subpic_id[i] specifies the subpicture ID of the i-th subpicture. The length of the sps_subpic_id[i] syntax element is sps_subpic_id_len_minus1+1 bits.

bit_depth_minus8 specifies the bit depth of the samples of the luma and chroma arrays, BitDepth, and the value of the luma and chroma quantization parameter range offset, QpBdOffset, as follows:

$$\text{BitDepth} = 8 + \text{bit\_depth\_minus8} \tag{45}$$

$$QpBd\text{Offset} = 6 * \text{bit\_depth\_minus8} \tag{46}$$

bit_depth_minus8 shall be in the range of 0 to 8, inclusive.

sps_entropy_coding_sync_enabled_flag equal to 1 specifies that a specific synchronization process for context variables is invoked before decoding the CTU that includes the first CTB of a row of CTBs in each tile in each picture referring to the SPS, and a specific storage process for context variables is invoked after decoding the CTU that includes the first CTB of a row of CTBs in each tile in each picture referring to the SPS. sps_entropy_coding_sync_enabled_flag equal to 0 specifies that no specific synchronization process for context variables is required to be invoked before decoding the CTU that includes the first CTB of a row of CTBs in each tile in each picture referring to the SPS, and no specific storage process for context variables is required to be invoked after decoding the CTU that includes the first CTB of a row of CTBs in each tile in each picture referring to the SPS.

sps_wpp_entry_point_offsets_present_flag equal to 1 specifies that signalling for entry point offsets for CTU rows may be present in the slice headers of pictures referring to the SPS when sps_entropy_coding_sync_enabled_flag is equal to 1. sps_wpp_entry_point_offsets_present_flag equal to 0 specifies that signalling for entry point offsets for CTU rows are not present in the slice headers of pictures referring to the SPS. When not present, the value of sps_wpp_entry_point_offsets_present_flag is inferred to be equal to 0.

sps_weighted_pred_flag equal to 1 specifies that weighted prediction may be applied to P slices referring to the SPS. sps_weighted_pred_flag equal to 0 specifies that weighted prediction is not applied to P slices referring to the SPS.

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.

log 2_max_pic_order_cnt_lsb_minus4 specifies the value of the variable MaxPicOrderCntLsb that is used in the decoding process for picture order count as follows:

$$\text{MaxPicOrder}CntLsb = 2^{(log\ 2\_max\_pic\_order\_cnt\_lsb\_minus4+4)} \tag{47}$$

The value of log 2_max_pic_order_cnt_lsb_minus4 shall be in the range of 0 to 12, inclusive.

sps_poc_msb_flag equal to 1 specifies that the ph_poc_msb_present_flag syntax element is present in PHs referring to the SPS. sps_poc_msb_flag equal to 0 specifies that the ph_poc_msb_present_flag syntax element is not present in PHs referring to the SPS.

poc_msb_len_minus1 plus 1 specifies the length, in bits, of the poc_msb_val syntax elements, when present in the PHs referring to the SPS. The value of poc_msb_len_minus1 shall be in the range of 0 to 32−log 2_max_pic_order_cnt_lsb_minus4−5, inclusive.

num_extra_ph_bits_bytes specifies the number of bytes of extra bits in the PH syntax structure for coded pictures referring to the SPS. The value of num_extra_ph_bits_bytes shall be equal to 0 in bitstreams conforming to this version of this Specification. Although the value of num_extra_ph_bits_bytes is required to be equal to 0 in this version of this Specification, decoder conforming to this version of this Specification shall allow the value of num_extra_ph_bits_bytes equal to 1 or 2 to appear in the syntax.

num_extra_sh_bits_bytes specifies the number of bytes of extra bits in the slice headers for coded pictures referring to the SPS. The value of num_extra_sh_bits_bytes shall be equal to 0 in bitstreams conforming to this version of this Specification. Although the value of num_extra_sh_bits_bytes is required to be equal to 0 in this version of this Specification, decoder conforming to this version of this Specification shall allow the value of num_extra_sh_bits_bytes equal to 1 or 2 to appear in the syntax.

sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS. When not present, the value of sps_sub_dpb_params_info_present_flag is inferred to be equal to 0.

long_term_ref_pics_flag equal to 0 specifies that no loLTRP is used for inter prediction of any coded picture in the CLVS.

long_term_ref_pics_flag equal to 1 specifies that long term reference pictures (LTRPs) may be used for inter prediction of one or more coded pictures in the CLVS.

inter_layer_ref_pics_present_flag equal to 0 specifies that no inter layer reference pictures (ILRP) is used for inter prediction of any coded picture in the CLVS. inter_layer_ref_pic_flag equal to 1 specifies that ILRPs may be used for inter prediction of one or more coded pictures in the CLVS. When sps_video_parameter_set_id is equal to 0, the value of inter_layer_ref_pics_present_flag is inferred to be equal to 0. When vps_independent_layer_flag[GeneralLayerIdx[nuh_layer_id]] is equal to 1, the value of inter_layer_ref_pics_present_flag shall be equal to 0. [Ed. (YK): Check whether there is a better name for this syntax element.]

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of instantaneous decoding refresh (IDR) pictures.

rpl1_same_as_rpl0_flag equal to 1 specifies that the syntax element num_ref_pic_lists_in_sps[1] and the syntax structure ref_pic_list_struct(1, rplsIdx) are not present and the following applies:

The value of num_ref_pic_lists_in_sps[1] is inferred to be equal to the value of num_ref_pic_lists_in_sps[0].
 The value of each of syntax elements in refpic_list_struct(1, rplsIdx) is inferred to be equal to the value of corresponding syntax element in ref_pic_list_struct(0, rplsIdx) for rplsIdx ranging from 0 to num_ref_pic_lists_in_sps[0]−1.

num_ref_pic_lists_in_sps[i] specifies the number of the ref_pic_list_struct(listIdx, rplsIdx) syntax structures with listIdx equal to i included in the SPS. The value of num_ref_pic_lists_in_sps[i] shall be in the range of 0 to 64, inclusive.

NOTE 4—For each value of listIdx (equal to 0 or 1), a decoder should allocate memory for a total number of num_ref_pic_lists_in_sps[i]+1 ref_pic_list_struct(listIdx, rplsIdx) syntax structures since there may be one ref_pic_list_struct(listIdx, rplsIdx) syntax structure directly signalled in the slice headers of a current picture.

qtbtt_dual_tree_intra_flag equal to 1 specifies that, for I slices, each CTU is split into coding units with 64×64 luma samples using an implicit quadtree split, and these coding units are the root of two separate coding tree syntax structure for luma and chroma.

qtbtt_dual_tree_intra_flag equal to 0 specifies separate coding_tree syntax structure is not used for I slices. When qtbtt_dual_tree_intra_flag is not present, it is inferred to be equal to 0.

log 2_min_luma_coding_block_size_minus2 plus 2 specifies the minimum luma coding block size. The value range of log 2_min_luma_coding_block_size_minus2 shall be in the range of 0 to Min(4, sps_log 2_ctu_size_minus5+3), inclusive.

The variables MinCb Log 2SizeY, MinCbSizeY, IbcBufWidthY, IbcBufWidthC and Vsize are derived as follows:

$$Min\mathit{Cb} \text{ Log } 2SizeY = \log 2\_min\_luma\_coding\_block\_size\_minus2+2 \quad (48)$$

$$Min\mathit{Cb}SizeY = 1 < Min\mathit{Cb} \text{ Log } 2SizeY \quad (49)$$

$$Ibc\text{BufWidth}Y = 256*128/Ctb\text{Size}Y \quad (50)$$

$$Ibc\text{BufWidth}C = Ibc\text{BufWidth}Y/\text{SubWidth}C \quad (51)$$

$$V\text{Size} = \text{Min}(64, Ctb\text{Size}Y) \quad (52)$$

The value of MinCbSizeY shall less than or equal to VSize. The variables CtbWidthC and CtbHeightC, which specify the width and height, respectively, of the array for each chroma CTB, are derived as follows:

If chroma_format_idc is equal to 0 (monochrome) or separate_colour_plane_flag is equal to 1, CtbWidthC and CtbHeightC are both equal to 0.
 Otherwise, CtbWidthC and CtbHeightC are derived as follows:

$$Ctb\text{Width}C = Ctb\text{Size}Y/\text{SubWidth}C \quad (53)$$

$$Ctb\text{Height}C = Ctb\text{Size}Y/\text{SubHeight}C \quad (54)$$

For log 2BlockWidth ranging from 0 to 4 and for log 2BlockHeight ranging from 0 to 4, inclusive, the up-right diagonal scan order array initialization process as specified in clause 6.5.2 is invoked with 1<<log 2BlockWidth and 1<<log 2BlockHeight as inputs, and the output is assigned to DiagScanOrder[log 2BlockWidth][log 2BlockHeight].

For log 2BlockWidth ranging from 0 to 6 and for log 2BlockHeight ranging from 0 to 6, inclusive, the horizontal and vertical traverse scan order array initialization process as specified in clause 6.5.3 is invoked with 1<<log 2BlockWidth and 1<<log 2BlockHeight as inputs, and the output is assigned to HorTravScanOrder[log 2BlockWidth][log 2BlockHeight] and VerTravScanOrder[log 2BlockWidth][log 2BlockHeight].

partition_constraints_override_enabled_flag equal to 1 specifies the presence of partition_constraints_override_flag in PHs referring to the SPS. partition_constraints_override_enabled_flag equal to 0 specifies the absence of partition_constraints_override_flag in PHs referring to the SPS.

sps_log 2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When partition_constraints_override_enabled_flag is equal to 1, the default difference can be overridden by ph_log 2_diff_min_qt_min_cb_luma present in PHs referring to the SPS. The value of sps_log 2_diff_min_qt_min_cb_intra_slice_luma shall be in the range of 0 to Ctb Log 2SizeY−MinCb Log 2SizeY, inclusive. The base 2 logarithm of the minimum size in luma samples of a luma leaf block resulting from quadtree splitting of a CTU is derived as follows:

$$MinQt \text{ Log } 2SizeIntraY = sps\_log 2\_diff\_min\_qt\_min\_cb\_intra\_slice\_luma + MinCb \text{ Log } 2SizeY \quad (55)$$

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_enabled_flag is equal to 1, the default maximum hierarchy depth can be overridden by ph_max_mtt_hierarchy_depth_intra_slice_luma present in PHs referring to the SPS. The value of sps_max_mtt_hierarchy_depth_intra_slice_luma shall be in the range of 0 to 2*(Ctb Log 2SizeY−MinCb Log 2SizeY), inclusive.

sps_log 2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by ph_log 2_diff_max_bt_min_qt_luma present in PHs referring to the SPS. The value of sps_log 2_diff_max_bt_min_qt_intra_slice_luma shall be in the range of 0 to Ctb Log 2SizeY−MinQt Log 2SizeIntraY, inclusive. When sps_log 2_diff_max_bt_min_qt_intra_slice_luma is not present, the value of sps_log 2_diff_max_bt_min_qt_intra_slice_luma is inferred to be equal to 0.

sps_log 2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by ph_log 2_diff_max_tt_min_qt_luma present in PHs referring to the SPS. The value of sps_log 2_diff_max_tt_min_qt_intra_slice_luma shall be in the range of 0 to Ctb Log 2SizeY−MinQt Log 2SizeIntraY, inclusive. When sps_log 2_diff_max_tt_mm_qt_intra_slice_luma is not present, the value of sps_log 2_diff_max_tt_mm_qt_intra_slice_luma is inferred to be equal to 0.

sps_log 2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When partition_constraints_override_enabled_flag is equal to 1, the default difference can be overridden by ph_log 2_diff_min_qt_min_cb_luma present in PHs referring to the SPS. The value of sps_log 2_diff_min_qt_min_cb_inter_slice shall be in the range of 0 to Ctb Log 2SizeY−MinCb Log 2SizeY, inclusive. The base 2 logarithm of the minimum size in luma samples of a luma leaf block resulting from quadtree splitting of a CTU is derived as follows:

$$\text{Min}Qt \text{ Log 2SizeInter}Y = sps\_\text{log 2\_diff\_min\_}qt\_min\_cb\_\text{inter\_slice} + \text{Min}Cb \text{ Log 2Size}Y \quad (56)$$

sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_enabled_flag is equal to 1, the default maximum hierarchy depth can be overridden by ph_max_mtt_hierarchy_depth_inter_slice present in PHs referring to the SPS. The value of sps_max_mtt_hierarchy_depth_inter_slice shall be in the range of 0 to 2*(Ctb Log 2SizeY−MinCb Log 2SizeY), inclusive.

sps_log 2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by ph_log 2_diff_max_bt_min_qt_luma present in PHs referring to the SPS. The value of sps_log 2_diff_max_bt_min_qt_inter_slice shall be in the range of 0 to Ctb Log 2SizeY−MinQt Log 2SizeInterY, inclusive. When sps_log 2_diff_max_bt_min_qt_inter_slice is not present, the value of sps_log 2_diff_max_bt_min_qt_inter_slice is inferred to be equal to 0.

sps_log 2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by ph_log 2_diff_max_tt_min_qt_luma present in PHs referring to the SPS. The value of sps_log 2_diff_max_tt_min_qt_inter_slice shall be in the range of 0 to Ctb Log 2SizeY−MinQt Log 2SizeInterY, inclusive. When sps_log 2_diff_max_tt_min_qt_inter_slice is not present, the value of sps_log 2_diff_max_tt_min_qt_inter_slice is inferred to be equal to 0.

sps_log 2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) referring to the SPS. When partition_constraints_override_enabled_flag is equal to 1, the default difference can be overridden by ph_log 2_diff_min_qt_min_cb_chroma present in PHs referring to the SPS. The value of sps_log 2_diff_min_qt_min_cb_intra_slice_chroma shall be in the range of 0 to Ctb Log 2SizeY−MinCb Log 2SizeY, inclusive. When not present, the value of sps_log 2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

$$\text{Min}Qt \text{ Log 2SizeIntra}C = sps\_\text{log 2\_diff\_min\_}qt\_min\_cb\_\text{intra\_slice\_chroma} + \text{Min}Cb \text{ Log 2Size}Y \quad (57)$$

sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When partition_constraints_override_enabled_flag is equal to 1, the default maximum hierarchy depth can be overridden by ph_max_mtt_hierarchy_depth_chroma present in PHs referring to the SPS. The value of sps_max_mtt_hierarchy_depth_intra_slice_chroma shall be in the range of 0 to 2*(Ctb Log 2SizeY−MinCb Log 2SizeY), inclusive. When not present, the value of sps_max_mtt_hierarchy_depth_intra_slice_chroma is inferred to be equal to 0.

sps_log 2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I)

referring to the SPS. When partition_constraints_override_enabled_flag is equal to 1, the default difference can be overridden by ph_log 2_diff_max_bt_min_qt_chroma present in PHs referring to the SPS. The value of sps_log 2_diff_max_bt_min_qt_intra_slice_chroma shall be in the range of 0 to Ctb Log 2SizeY−MinQt Log 2SizeIntraC, inclusive. When sps_log 2_diff_max_bt_min_qt_intra_slice_chroma is not present, the value of sps_log 2_diff_max_bt_min_qt_intra_slice_chroma is inferred to be equal to 0.

sps_log 2_diff_max_tt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_enabled_flag is equal to 1, the default difference can be overridden by ph_log 2_diff_max_tt_min_qt_chroma present in PHs referring to the SPS. The value of sps_log 2_diff_max_tt_min_qt_intra_slice_chroma shall be in the range of 0 to Ctb Log 2SizeY−MinQt Log 2SizeIntraC, inclusive. When sps_log 2_diff_max_tt_mm_qt_intra_slice_chroma is not present, the value of sps_log 2_diff_max_tt_mm_qt_intra_slice_chroma is inferred to be equal to 0.

sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.

When CtbSizeY is less than 64, the value of sps_max_luma_transform_size_64_flag shall be equal to 0. The variables MinTb Log 2SizeY, MaxTb Log 2SizeY, MinTbSizeY, and MaxTbSizeY are derived as follows:

$$Min Tb\ Log\ 2SizeY=2 \tag{58}$$

$$Max Tb\ Log\ 2SizeY=sps\_max\_luma\_transform\_size\_64\_flag\ ?\ 6:5 \tag{59}$$

$$Min TbSizeY=1<Min Tb\ Log\ 2SizeY \tag{60}$$

$$Max TbSizeY=1<Max Tb\ Log\ 2SizeY \tag{61}$$

spsjoint_cbcr_enabled_flag equal to 0 specifies that the joint coding of chroma residuals is disabled. sps_joint_cbcr_enabled_flag equal to 1 specifies that the joint coding of chroma residuals is enabled. When not present, the value of sps_joint_cbcr_enabled_flag is inferred to be equal to 0.

same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.

qp_table_start_minus26[i] plus 26 specifies the starting luma and chroma QP used to describe the i-th chroma QP mapping table. The value of qp_table_start_minus26[i] shall be in the range of −26−QpBdOffset to 36 inclusive. When qp_table_start_minus26[i] is not present in the bitstream, the value of qp_table_start_minus26[i] is inferred to be equal to 0.

num_points_in_qp_table_minus1[i] plus 1 specifies the number of points used to describe the i-th chroma QP mapping table. The value of num_points_in_qp_table_minus1[i] shall be in the range of 0 to 63+QpBdOffset, inclusive. When num_points_in_qp_table_minus1[0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.

delta_qp_diff_val[i][j] specifies a delta value used to derive the output coordinate of the j-th pivot point of the i-th chroma QP mapping table.

The i-th chroma QP mapping table ChromaQpTable[i] for i=0 . . . numQpTables−1 is derived as follows:

```
qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
    qpInVal[ i ][ j + 1 ] = qpInVal[ i ][ j ] +
delta_qp_in_val_minus1[ i ][ j ] + 1
    qpOutVal[ i ][ j + 1 ] = qpOutVal[ i ][ j ] +
( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1; k >= −QpBdOffset; k − − )
    ChromaQpTable[ i ][ k ] = Clip3( −QpBdOffset, 63,
ChromaQpTable[ i ][ k + 1 ] − 1 )    (62)
for( j = 0; j <= num_points_in_qp_table_minus1[ i ]; j++ ) {
    sh = ( delta_qp_in_val_minus1[ i ][j ] + 1 ) >> 1
    for( k = qpInVal[ i ][ j ] + 1, m = 1; k <= qpInval[ i ][ j + 1 ]; k++,
m++ )
        ChromaQpTable[ i ][ k ] = ChromaQpTable[ i ][ qpInVal[ i ][ j ] ] +
        ( ( qpOutVal[ i ] [j + 1] − qpOutVal[ i ] [j ] ) * m + sh ) /
( delta_qp_in_val_minus1[ i ][j] + 1 )
}
for( k = qpInVal[ i ][ num_points_in_qp_table_minus1[ i ] + 1 ] + 1;
k <= 63; k++ )
    ChromaQpTable[ i ][ k ] = Clip3( −QpBdOffset, 63,
ChromaQpTable[ i ][ k − 1 ] + 1)
```

When same_qp_table_for_chroma is equal to 1, ChromaQpTable[1][k] and ChromaQpTable[2][k] are set equal to ChromaQpTable[0][k] for k in the range of −QpBdOffset to 63, inclusive.

It is a requirement of bitstream conformance that the values of qpInVal[i][j] and qpOutVal[i][j] shall be in the range of −QpBdOffset to 63, inclusive for i in the range of 0 to numQpTables−1, inclusive, and j in the range of 0 to num_points_in_qp_table_minus1[i]+1, inclusive.

sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

sps_alf_enabled_flag equal to 0 specifies that the adaptive loop filter is disabled. sps_alf_enabled_flag equal to 1 specifies that the adaptive loop filter is enabled.

sps_ccalf_enabled_flag equal to 0 specifies that the cross-component adaptive loop filter is disabled. sps_ccalf_enabled_flag equal to 1 specifies that the cross-component adaptive loop filter may be enabled.

sps_transform_skip_enabled_flag equa to 1 specifies that transform_skip_flag may be present in the transform unit syntax. sps_transform_skip_enabled_flag equal to 0 specifies that transform_skip_flag is not present in the transform unit syntax.

log 2_transform_skip_max_size_minus2 specifies the maximum block size used for transform skip, and shall be in the range of 0 to 3, inclusive.

The variable MaxTsSize is set equal to 1<<(log 2_transform_skip_max_size_minus2+2).

sps_bdpcm_enabled_flag equal to 1 specifies that intra_bdpcm_luma_flag and intra_bdpcm_chroma_flag may be present in the coding unit syntax for intra coding units. sps_bdpcm_enabled_flag equal to 0 specifies that intra_bdpcm_luma_flag and intra_bdpcm_chroma_flag are not present in the coding unit syntax for intra coding units. When not present, the value of sps_bdpcm_enabled_flag is inferred to be equal to 0.

sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. When the value of (CtbSizeY/MinCbSizeY+1) is greater than (pic_width_in_luma_samples/MinCbSizeY−1), where pic_width_in_luma_samples is the value of pic_width_in_luma_samples in any PPS that refers to the SPS, the value of sps_ref_wraparound_enabled_flag shall be equal to 0. [Ed. (YK): The semantics here still depends on PPS syntax elements.]

sps_temporal_mvp_enabled_flag equal to 1 specifies that temporal motion vector predictors may be used in the CLVS. sps_temporal_mvp_enabled_flag equal to 0 specifies that temporal motion vector predictors are not used in the CLVS.

sps_sbtmvp_enabled_flag equal to 1 specifies that subblock-based temporal motion vector predictors may be used in decoding of pictures with all slices having slice_type not equal to I in the CLVS. sps_sbtmvp_enabled_flag equal to 0 specifies that subblock-based temporal motion vector predictors are not used in the CLVS. When sps_sbtmvp_enabled_flag is not present, it is inferred to be equal to 0.

sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.

sps_bdof_enabled_flag equal to 0 specifies that the bi-directional optical flow inter prediction is disabled. sps_bdof_enabled_flag equal to 1 specifies that the bi-directional optical flow inter prediction is enabled.

sps_bdof_pic_present_flag equal to 1 specifies that ph_disable_bdof_flag is present in PHs referring to the SPS. sps_bdof_pic_present_flag equal to 0 specifies that ph_disable_bdof_flag is not present in PHs referring to the SPS. When sps_bdof_pic_present_flag is not present, the value of sps_bdof_pic_present_flag is inferred to be equal to 0.

sps_smvd_enabled_flag equal to 1 specifies that symmetric motion vector difference may be used in motion vector decoding. sps_smvd_enabled_flag equal to 0 specifies that symmetric motion vector difference is not used in motion vector coding.

sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled.

sps_dmvr_pic_present_flag equal to 1 specifies that ph_disable_dmvr_flag is present in PHs referring to the SPS. sps_dmvr_pic_present_flag equal to 0 specifies that ph_disable_dmvr_flag is not present in PHs referring to the SPS. When sps_dmvr_pic_present_flag is not present, the value of sps_dmvr_pic_present_flag is inferred to be equal to 0.

sps_mmvd_enabled_flag equal to 1 specifies that merge mode with motion vector difference is enabled. sps_mmvd_enabled_flag equal to 0 specifies that merge mode with motion vector difference is disabled.

sps_isp_enabled_flag equal to 1 specifies that intra prediction with subpartitions is enabled. sps_isp_enabled_flag equal to 0 specifies that intra prediction with subpartitions is disabled.

sps_mrl_enabled_flag equal to 1 specifies that intra prediction with multiple reference lines is enabled. sps_mrl_enabled_flag equal to 0 specifies that intra prediction with multiple reference lines is disabled.

sps_mip_enabled_flag equal to 1 specifies that matrix-based intra prediction is enabled. sps_mip_enabled_flag equal to 0 specifies that matrix-based intra prediction is disabled.

sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma component is enabled. When sps_cclm_enabled_flag is not present, it is inferred to be equal to 0.

sps_chroma_horizontal_collocated_flag equal to 1 specifies that prediction processes operate in a manner designed for chroma sample positions that are not horizontally shifted relative to corresponding luma sample positions. sps_chroma_horizontal_collocated_flag equal to 0 specifies that prediction processes operate in a manner designed for chroma sample positions that are shifted to the right by 0.5 in units of luma samples relative to corresponding luma sample positions. When sps_chroma_horizontal_collocated_flag is not present, it is inferred to be equal to 1.

sps_chroma_vertical_collocated_flag equal to 1 specifies that prediction processes operate in a manner designed for chroma sample positions that are not vertically shifted relative to corresponding luma sample positions. sps_chroma_vertical_collocated_flag equal to 0 specifies that prediction processes operate in a manner designed for chroma sample positions that are shifted downward by 0.5 in units of luma samples relative to corresponding luma sample positions. When sps_chroma_vertical_collocated_flag is not present, it is inferred to be equal to 1.

sps_mts_enabled_flag equal to 1 specifies that sps_explicit_mts_intra_enabled_flag is present in the sequence parameter set RBSP syntax and sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and sps_explicit_mts_inter_enabled_flag is not present in the sequence parameter set RBSP syntax.

sps_explicit_mts_intra_enabled_flag equal to 1 specifies that mts_idx may be present in intra coding unit syntax. sps_explicit_mts_intra_enabled_flag equal to 0 specifies that mts_idx is not present in intra coding unit syntax. When not present, the value of sps_explicit_mts_intra_enabled_flag is inferred to be equal to 0.

sps_explicit_mts_inter_enabled_flag equal to 1 specifies that mts_idx may be present in inter coding unit syntax. sps_explicit_mts_inter_enabled_flag equal to 0 specifies that mts_idx is not present in inter coding unit syntax. When not present, the value of sps_explicit_mts_inter_enabled_flag is inferred to be equal to 0.

six_minus_max_num_merge_cand specifies the maximum number of merging motion vector prediction (MVP) candidates supported in the SPS subtracted from 6. The value of six_minus_max_num_merge_cand shall be in the range of 0 to 5, inclusive.

The maximum number of merging MVP candidates, MaxNumMergeCand, is derived as follows:

MaxNumMergeCand=6−six_minus_max_num_merge_cand (63)

sps_sbt_enabled_flag equal to 0 specifies that subblock transform for inter-predicted CUs is disabled. sps_sbt_enabled_flag equal to 1 specifies that subblock transform for inter-predicteds coding unit (CU) is enabled.

sps_affine_enabled_flag specifies whether affine model based motion compensation can be used for inter prediction. If sps_affine_enabled_flag is equal to 0, the syntax shall be constrained such that no affine model based motion compensation is used in the CLVS, and inter_affine_flag and cu_affine_type_flag are not present in coding unit syntax of the CLVS. Otherwise (sps_affine_enabled_flag is equal to 1), affine model based motion compensation can be used in the CLVS.

five_minus_max_num_subblock_merge_cand specifies the maximum number of subblock-based merging motion vector prediction candidates supported in the SPS subtracted from 5.

sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CLVS, and cu_affine_type_flag is not present in coding unit syntax in the CLVS. Otherwise (sps_affine_type_flag is equal to 1), 6-parameter affine model based motion compensation can be used in the CLVS. When not present, the value of sps_affine_type_flag is inferred to be equal to 0.

sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode. When not present, the value of sps_affine_amvr_enabled_flag is inferred to be equal to 0.

sps_affine_prof_enabled_flag specifies whether the prediction refinement with optical flow can be used for affine motion compensation. If sps_affine_prof_enabled_flag is equal to 0, the affine motion compensation shall not be refined with optical flow. Otherwise (sps_affine_prof_enabled_flag is equal to 1), the affine motion compensation can be refined with optical flow. When not present, the value of sps_affine_prof_enabled_flag is inferred to be equal to 0.

sps_prof_pic_present_flag equal to 1 specifies that ph_disable_prof_flag is present in PHs referring to the SPS. sps_prof_pic_present_flag equal to 0 specifies that ph_disable_prof_flag is not present in PHs referring to the SPS. When sps_prof_pic_present_flag is not present, the value of sps_prof_pic_present_flag is inferred to be equal to 0.

sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.

sps_act_enabled_flag equal to 1 specifies that adaptive colour transform may be used and the cu_act_enabled_flag may be present in the coding unit syntax. sps_act_enabled_flag equal to 0 specifies that adaptive colour transform is not used and cu_act_enabled_flag is not present in the coding unit syntax. When sps_act_enabled_flag is not present, it is inferred to be equal to 0.

min_qp_prime_ts_minus4 specifies the minimum allowed quantization parameter for transform skip mode as follows:

$Qp$PrimeTsMin=4+min_$qp$_prime_ts_minus4 (64)

The value of min_qp_prime_ts_minus4 shall be in the range of 0 to 48, inclusive.

sps_bcw_enabled_flag specifies whether bi-prediction with CU weights can be used for inter prediction. If sps_bcw_enabled_flag is equal to 0, the syntax shall be constrained such that no bi-prediction with CU weights is used in the CLVS, and bcw_idx is not present in coding unit syntax of the CLVS. Otherwise (sps_bcw_enabled_flag is equal to 1), bi-prediction with CU weights can be used in the CLVS.

sps_ibc_enabled_flag equal to 1 specifies that the IBC prediction mode may be used in decoding of pictures in the CLVS. sps_ibc_enabled_flag equal to 0 specifies that the IBC prediction mode is not used in the CLVS. When sps_ibc_enabled_flag is not present, it is inferred to be equal to 0.

six_minus_max_num_ibc_merge_cand specifies the maximum number of IBC merging block vector prediction (BVP) candidates supported in the SPS subtracted from 6. The value of six_minus_max_num_ibc_merge_cand shall be in the range of 0 to 5, inclusive.

The maximum number of IBC merging BVP candidates, MaxNumIbcMergeCand, is derived as follows:

```
if( sps_ibc_enabled_flag )
    MaxNumIbcMergeCand = 6 −
        six_minus_max_num_ibc_merge_cand   (65)
else
    MaxNumIbcMergeCand = 0
``` sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.

sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.

sps_gpm_enabled_flag specifies whether geometric partition based motion compensation can be used for inter prediction. sps_gpm_enabled_flag equal to 0 specifies that the syntax shall be constrained such that no geometric partition based motion compensation is used in the CLVS, and merge_gpm_partition_idx, merge_gpm_idx0, and merge_gpm_idx1 are not present in coding unit syntax of the CLVS. sps_gpm_enabled_flag equal to 1 specifies that geometric partition based motion compensation can be used in the CLVS. When not present, the value of sps_gpm_enabled_flag is inferred to be equal to 0.

max_num_merge_cand_minus_max_num_gpm_cand specifies the maximum number of geometric partitioning merge mode candidates supported in the SPS subtracted from MaxNumMergeCand.

The maximum number of geometric partitioning merge mode candidates, MaxNumGpmMergeCand, is derived as follows:

```
if( sps_gpm_enabled_flag && MaxNumMergeCand >= 3 )
    MaxNumGpmMergeCand = MaxNumMergeCand −
```

-continued

```
    max_num_merge_cand_minus_max_num_gpm_cand    (66)
else if( sps_gpm_enabled_flag && MaxNumMergeCand = = 2 )
    MaxNumMergeCand = 2
else
    MaxNumGpmMergeCand = 0
```

The value of MaxNumGpmMergeCand shall be in the range of 2 to MaxNumMergeCand, inclusive.

sps_lmcs_enabled_flag equal to 1 specifies that luma mapping with chroma scaling is used in the CLVS. sps_lmcs_enabled_flag equal to 0 specifies that luma mapping with chroma scaling is not used in the CLVS.

sps_lfnst_enabled_flag equal to 1 specifies that lfnst_idx may be present in intra coding unit syntax. sps_lfnst_enabled_flag equal to 0 specifies that lfnst_idx is not present in intra coding unit syntax.

sps_ladf_enabled_flag equal to 1, specifies that sps_num_ladf_intervals_minus2, sps_ladf_lowest_interval_qp_offset, sps_ladf_qp_offset[i], and sps_ladf_delta_threshold_minus1[i] are present in the SPS.

sps_num_ladf_intervals_minus2 plus 1 specifies the number of sps_ladf_delta_threshold_minus1[i] and sps_ladf_qp_offset[i] syntax elements that are present in the SPS. The value of sps_num_ladf_intervals_minus2 shall be in the range of 0 to 3, inclusive.

sps_ladf_lowest_interval_qp_offset specifies the offset used to derive the variable qP as specified in clause 8.8.3.6.1. The value of sps_ladf_lowest_interval_qp_offset shall be in the range of −63 to 63, inclusive.

sps_ladf_qp_offset[i] specifies the offset array used to derive the variable qP as specified in clause 8.8.3.6.1. The value of sps_ladf_qp_offset[i] shall be in the range of −63 to 63, inclusive.

sps_ladf_delta_threshold_minus1[i] is used to compute the values of SpsLadfIntervalLowerBound[i], which specifies the lower bound of the i-th luma intensity level interval. The value of sps_ladf_delta_threshold_minus1[i] shall be in the range of 0 to $2^{BitDepth}-3$, inclusive.

The value of SpsLadfIntervalLowerBound[0] is set equal to 0.

For each value of i in the range of 0 to sps_num_ladf_intervals_minus2, inclusive, the variable SpsLadfIntervalLowerBound[i+1] is derived as follows:

$$SpsLadfIntervalLowerBound[i+1]=SpsLadfInterval\text{-}LowerBound[i]+sps\_ladf\_delta\_threshold\_minus1[i]+1 \quad (67)$$

log 2_parallel_merge_level_minus2 plus 2 specifies the value of the variable Log 2ParMrgLevel, which is used in the derivation process for spatial merging candidates as specified in clause 8.5.2.3, the derivation process for motion vectors and reference indices in subblock merge mode as specified in clause 8.5.5.2, and to control the invocation of the updating process for the history-based motion vector predictor list in clause 8.5.2.1. The value of log 2_parallel_merge_level_minus2 shall be in the range of 0 to Ctb Log 2SizeY−2, inclusive. The variable Log 2ParMrgLevel is derived as follows:

$$\text{Log 2ParMrgLevel=log 2\_parallel\_merge\_level\_minus2+2} \quad (68)$$

sps_scaling_list_enabled_flag equal to 1 specifies that a scaling list is used for the scaling process for transform coefficients. sps_scaling_list_enabled_flag equal to 0 specifies that scaling list is not used for the scaling process for transform coefficients.

sps_dep_quant_enabled_flag equal to 0 specifies that dependent quantization is disabled for pictures referring to the SPS. sps_dep_quant_enabled_flag equal to 1 specifies that dependent quantization may be enabled for pictures referring to the SPS.

sps_sign_data_hiding_enabled_flag equal to 0 specifies that sign bit hiding is disabled for pictures referring to the SPS. sps_sign_data_hiding_enabled_flag equal to 1 specifies that sign bit hiding may be enabled for pictures referring to the SPS. When sps_sign_data_hiding_enabled_flag is not present, it is inferred to be equal to 0.

sps_virtual_boundaries_enabled_flag equal to 1 specifies that disabling in-loop filtering across virtual boundaries may be applied in the coded pictures in the CLVS. sps_virtual_boundaries_enabled_flag equal to 0 specifies that disabling in-loop filtering across virtual boundaries is not applied in the coded pictures in the CLVS. In-loop filtering operations include the deblocking filter, sample adaptive offset filter, and adaptive loop filter operations.

sps_virtual_boundaries_present_flag equal to 1 specifies that information of virtual boundaries is signalled in the SPS. sps_virtual_boundaries_present_flag equal to 0 specifies that information of virtual boundaries is not signalled in the SPS. When there is one or more than one virtual boundaries signalled in the SPS, the in-loop filtering operations are disabled across the virtual boundaries in pictures referring to the SPS. In-loop filtering operations include the deblocking filter, sample adaptive offset filter, and adaptive loop filter operations.

It is a requirement of bitstream conformance that when the value of res_change_in_clvs_allowed_flag is equal to 1, the value of sps_virtual_boundaries_present_flag shall be equal to 0.

sps_num_ver_virtual_boundaries specifies the number of sps_virtual_boundaries_pos_x[i] syntax elements that are present in the SPS. When sps_num_ver_virtual_boundaries is not present, it is inferred to be equal to 0.

sps_virtual_boundaries_pos_x[i] specifies the location of the i-th vertical virtual boundary in units of luma samples divided by 8. The value of sps_virtual_boundaries_pos_x[i] shall be in the range of 1 to Ceil(pic_width_in_luma_samples÷8)−1, inclusive. [Ed. (VD): pic_width_in_luma_samples is in the PPS, not in the SPS.]

sps_num_hor_virtual_boundaries specifies the number of sps_virtual_boundaries_pos_y[i] syntax elements that are present in the SPS. When sps_num_hor_virtual_boundaries is not present, it is inferred to be equal to 0.

When sps_virtual_boundaries_enabled_flag is equal to 1 and sps_virtual_boundaries_present_flag is equal to 1, the sum of sps_num_ver_virtual_boundaries and sps_num_hor_virtual_boundaries shall be greater than 0.

sps_virtual_boundaries_pos_y[i] specifies the location of the i-th horizontal virtual boundary in units of luma samples divided by 8. The value of sps_virtual_boundaries_pos_y[i] shall be in the range of 1 to Ceil(pic_height_in_luma_samples÷8)−1, inclusive. [Ed. (VD): pic_height_in_luma_samples is in the PPS, not in the SPS.]

sps_general_hrd_params_present_flag equal to 1 specifies that the syntax structure general_hrd_parameters( ) is present in the SPS RBSP syntax structure. sps_general_hrd_params_present_flag equal to 0 specifies that the syntax structure general_hrd_parameters( ) is not present in the SPS RBSP syntax structure.

sps_sublayer_cpb_params_present_flag equal to 1 specifies that the syntax structure old_hrd_parameters( ) in the SPS RBSP includes hypothetical reference decoder (HRD) parameters for sublayer representations with TemporalId in the range of 0 to sps_max_sublayers_minus1, inclusive. sps_sublayer_cpb_params_present_flag equal to 0 specifies that the syntax structure ols_hrd_parameters( ) in the SPS RBSP includes HRD parameters for the sublayer representation with TemporalId equal to sps_max_sublayers_minus1 only. When sps_max_sublayers_minus1 is equal to 0, the value of sps_sublayer_cpb_params_present_flag is inferred to be equal to 0.

When sps_sublayer_cpb_params_present_flag is equal to 0, the HRD parameters for the sublayer representations with TemporalId in the range of 0 to sps_max_sublayers_minus1−1, inclusive, are inferred to be the same as that for the sublayer representation with TemporalId equal to sps_max_sublayers_minus1. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_hrd_parameters syntax structure.

field_seq_flag equal to 1 indicates that the CLVS conveys pictures that represent fields.

field_seq_flag equal to 0 indicates that the CLVS conveys pictures that represent frames. When general_frame_only_constraint_flag is equal to 1, the value of field_seq_flag shall be equal to 0.

When field_seq_flag is equal to 1, a frame-field information SEI message shall be present for every coded picture in the CLVS.

NOTE 5—The specified decoding process does not treat pictures that represent fields or frames differently. A sequence of pictures that represent fields would therefore be coded with the picture dimensions of an individual field. For example, pictures that represent 1080i fields would commonly have cropped output dimensions of 1920×540, while the sequence picture rate would commonly express the rate of the source fields (typically between 50 and 60 Hz), instead of the source frame rate (typically between 25 and 30 Hz).

vui_parameters_present_flag equal to 1 specifies that the syntax structure vui_parameters( ) is present in the SPS RBSP syntax structure. vui_parameters_present_flag equal to 0 specifies that the syntax structure vui_parameters( ) is not present in the SPS RBSP syntax structure.

sps_extension_flag equal to 0 specifies that no sps_extension_data_flag syntax elements are present in the SPS RBSP syntax structure. sps_extension_flag equal to 1 specifies that there are sps_extension_data_flag syntax elements present in the SPS RBSP syntax structure.

sps_extension_data_flag may have any value. Its presence and value do not affect decoder conformance to profiles specified in this version of this Specification. Decoders conforming to this version of this Specification shall ignore all sps_extension_data_flag syntax elements.

3.3. PPS Syntax and Semantics

In the latest VVC draft text, the PPS syntax and semantics are as follows:

|  | Descriptor |
| --- | --- |
| pic_parameter_set_rbsp( ) { |  |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { |  |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } |  |
|   scaling_window_explicit_signalling_flag | u(1) |
|   if( scaling_window_explicit_signalling_flag ) { |  |
|     scaling_win_left_offset | ue(v) |
|     scaling_win_right_offset | ue(v) |
|     scaling_win_top_offset | ue(v) |
|     scaling_win_bottom_offset | ue(v) |
|   } |  |
|   output_flag_present_flag | u(1) |
|   subpic_id_mapping_in_pps_flag | u(1) |
|   if( subpic_id_mapping_in_pps_flag ) { |  |
|     pps_num_subpics_minus1 | ue(v) |
|     pps_subpic_id_len_minus1 | ue(v) |
|     for( i = 0; i <= pps_num_subpic_minus1; i++ ) |  |
|       pps_subpic_id[ i ] | u(v) |
|   } |  |
|   no_pic_partition_flag | u(1) |
|   if( !no_pic_partition_flag ) { |  |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) |  |
|       tile_column_width_minus1[ i ] | ue(v) |
|     for( i = 0; i <= num_exp_tile_rows_minus1; i++ ) |  |
|       tile_row_height_minus1[ i ] | ue(v) |
|     if( NumTilesInPic > 1 ) |  |
|       rect_slice_flag | u(1) |
|     if( rect_slice_flag ) |  |
|       single_slice_per_subpic_flag | u(1) |
|     if( rect_slice_flag && !single_slice_per_subpic_flag |  |
|     ) { |  |

-continued

| | Descriptor |
|---|---|
|     num_slices_in_pic_minus1 | ue(v) |
|     if( num_slices_in_pic_minus1 > 0 ) | |
|       tile_idx_delta_present_flag | u(1) |
|     for( i = 0; i < num_slices_in_pic_minus1; i++ ) { | |
|       if( NumTileColumns > 1 ) | |
|         slice_width_in_tiles_minus1[ i ] | ue(v) |
|       if( NumTileRows > 1 &&<br>        ( tile_idx_delta_present_flag \|\| tileIdx % NumTileColumns == 0 ) ) | |
|         slice_height_in_tiles_minus1[ i ] | ue(v) |
|       if( slice_width_in_tiles_minus1[ i ] = = 0 &&<br>        slice_height_in_tiles_minus1[ i ] = = 0 &&<br>        RowHeight[ SliceTopLeftTileIdx[ i ] / NumTileColumns ] > 1<br>      ) { | |
|         num_exp_slices_in_tile[ i ] | ue(v) |
|         for( j = 0; j < num_exp_slices_in_tile[ i ]; j++ ) | |
|           exp_slice_height_in_ctus_minus1[ j ] | ue(v) |
|         i += NumSlicesInTile[ i ] − 1 | |
|       } | |
|       if( tile_idx_delta_present_flag && i < num_slices_in_pic_minus1 ) | |
|         tile_idx_delta[ i ] | se(v) |
|     } | |
|   } | |
|   loop_filter_across_tiles_enabled_flag | u(1) |
|   loop_filter_across_slices_enabled_flag | u(1) |
| } | |
| cabac_init_present_flag | u(1) |
| for( i = 0; i < 2; i++ ) | |
|   num_ref_idx_default_active_minus1[ i ] | ue(v) |
| rpl1_idx_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| rpl_info_in_ph_flag | u(1) |
| if( deblocking_filter_override_enabled_flag ) | |
|   dbf_info_in_ph_flag | u(1) |
| sao_info_in_ph_flag | u(1) |
| alf_info_in_ph_flag | u(1) |
| if( ( pps_weighted_pred_flag \|\| pps_weighted_bipred_flag ) && rpl_info_in_ph_flag ) | |
|   wp_info_in_ph_flag | u(1) |
| qp_delta_info_in_ph_flag | u(1) |
| pps_ref_wraparound_enabled_flag | u(1) |

-continued

| | Descriptor |
|---|---|
| if( pps_ref_wraparound_enabled_flag ) | |
|    pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

A PPS RBSP shall be available to the decoding process prior to it being referenced, included in at least one AU with TemporalId less than or equal to the TemporalId of the PPS NAL unit or provided through external means.

All PPS NAL units with a particular value of pps_pic_parameter_set_id within a prediction unit (PU) shall have the same content.

pps_pic_parameter_set_id identifies the PPS for reference by other syntax elements. The value of pps_pic_parameter_set_id shall be in the range of 0 to 63, inclusive.

PPS NAL units, regardless of the nuh_layer_id values, share the same value space of pps_pic_parameter_set_id.

Let ppsLayerId be the value of the nuh_layer_id of a particular PPS NAL unit, and vclLayerId be the value of the nuh_layer_id of a particular VCL NAL unit. The particular VCL NAL unit shall not refer to the particular PPS NAL unit unless ppsLayerId is less than or equal to vclLayerId and the layer with nuh_layer_id equal to ppsLayerId is included in at least one OLS that includes the layer with nuh_layer_id equal to vclLayerId.

pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.

mixed_nalu_types_in_pic_flag equal to 1 specifies that each picture referring to the PPS has more than one VCL NAL unit, the VCL NAL units do not have the same value of nal_unit_type, and the picture is not an intra random access pictures (IRAP) picture. mixed_nalu_types_in_pic_flag equal to 0 specifies that each picture referring to the PPS has one or more VCL NAL units and the VCL NAL units of each picture referring to the PPS have the same value of nal_unit_type.

When no_mixed_nalu_types_in_pic_constraint_flag is equal to 1, the value of mixed_nalu_types_in_pic_flag shall be equal to 0.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

The slice shall belong to a subpicture subpicA for which the value of the corresponding subpic_treated_as_pic_flag[i] is equal to 1.

The slice shall not belong to a subpicture of picA containing VCL NAL units with nal_unit_type not equal to nalUnitTypeA.

If nalUnitTypeA is equal to clean random access (CRA), for all the following PUs following the current picture in the CLVS in decoding order and in output order, neither RefPicList[0] nor RefPicList[1] of a slice in subpicA in those PUs shall include any picture preceding picA in decoding order in an active entry.

Otherwise (i.e., nalUnitTypeA is equal to IDR_W_RADL or IDR_N_LP), for all the PUs in the CLVS following the current picture in decoding order, neither RefPicList[0] nor RefPicList[1] of a slice in subpicA in those PUs shall include any picture preceding picA in decoding order in an active entry.

NOTE 1—mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_flag is equal to 0 and mixed_nalu_types_in_pic_flag is equal to 1, a picture referring to the PPS cannot have slices with nal_unit_type equal to IDR_W_RADL or IDR_N_LP.

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When res_change_in_clvs_allowed_flag equal to 0, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When res_change_in_clvs_allowed_flag equal to 0, the value of pic_height_in_luma_samples shall be equal to pic_height_max_in_luma_samples.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$\text{PicWidthInCtbsY} = \text{Ceil}(pic\_width\_in\_luma\_samples \div CtbSizeY) \quad (69)$$

$$\text{PicHeightInCtbsY} = \text{Ceil}(pic\_height\_in\_luma\_samples \div CtbSizeY) \quad (70)$$

$$\text{PicSizeInCtbsY} = \text{PicWidthInCtbsY} * \text{PicHeightInCtbsY} \quad (71)$$

$$\text{PicWidthInMinCbsY} = pic\_width\_in\_luma\_samples / MinCbSizeY \quad (72)$$

$$\text{PicHeightInMin}CbsY = \text{pic\_height\_in\_luma\_samples} / \text{Min}CbSizeY \quad (73)$$

$$\text{PicSizeInMin}CbsY = \text{PicWidthInMin}CbsY * \text{PicHeightInMin}CbsY \quad (74)$$

$$\text{PicSizeInSamples}Y = \text{pic\_width\_in\_luma\_samples} * \text{pic\_height\_in\_luma\_samples} \quad (75)$$

$$\text{PicWidthInSamples}C = \text{pic\_width\_in\_luma\_samples} / \text{SubWidth}C \quad (76)$$

$$\text{PicHeightInSamples}C = \text{pic\_height\_in\_luma\_samples} / \text{SubHeight}C \quad (77)$$

pps_conformance_window_flag equal to 1 indicates that the conformance cropping window offset parameters follow next in the PPS. pps_conformance_window_flag equal to 0 indicates that the conformance cropping window offset parameters are not present in the PPS.

pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output. When pps_conformance_window_flag is equal to 0, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to pic_width_in_luma_samples−(SubWidthC*pps_conf_win_right_offset+1) and vertical picture coordinates from SubHeightC*pps_conf_win_top_offset to pic_height_in_luma_samples−(SubHeightC*pps_conf_win_bottom_offset+1), inclusive. The value of SubWidthC*(pps_conf_win_left_offset+pps_conf_win_right_offset) shall be less than pic_width_in_luma_samples, and the value of SubHeightC*(pps_conf_win_top_offset+pps_conf_win_bottom_offset) shall be less than pic_height_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE 2—The conformance cropping window offset parameters are only applied at the output. All internal decoding processes are applied to the uncropped picture size.

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of pps_conf_win_left_offset, pps_conf_win_right_offset, pps_conf_win_top_offset, and pps_conf_win_bottom_offset, respectively.

When pic_width_in_luma_samples is equal to pic_width_max_in_luma_samples and pic_height_in_luma_samples is equal to pic_height_max_in_luma_samples, it is a requirement of bitstream conformance that pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively.

scaling_window_explicit_signalling_flag equal to 1 specifies that the scaling window offset parameters are present in the PPS. scaling_window_explicit_signalling_flag equal to 0 specifies that the scaling window offset parameters are not present in the PPS. When res_change_in_clvs_allowed_flag is equal to 0, the value of scaling_window_explicit_signalling_flag shall be equal to 0.

scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf_win_right_offset, pps_conf_win_top_offset, and pps_conf_win_bottom_offset, respectively.

The value of SubWidthC*(scaling_win_left_offset+scaling_win_right_offset) shall be less than pic_width_in_luma_samples, and the value of SubHeightC*(scaling_win_top_offset+scaling_win_bottom_offset) shall be less than pic_height_in_luma_samples.

The variables PicOutputWidthL and PicOutputHeightL are derived as follows:

$$\text{PicOutputWidth}L = \text{pic\_width\_in\_luma\_samples} - \text{SubWidth}C*(\text{scaling\_win\_right\_offset} + \text{scaling\_win\_left\_offset}) \quad (78)$$

$$\text{PicOutputHeight}L = \text{pic\_height\_in\_luma\_samples} - \text{SubWidth}C*(\text{scaling\_win\_bottom\_offset} + \text{scaling\_win\_top\_offset}) \quad (79)$$

Let refPicOutputWidthL and refPicOutputHeightL be the PicOutputWidthL and PicOutputHeightL, respectively, of a reference picture of a current picture referring to this PPS. Is a requirement of bitstream conformance that all of the following conditions are satisfied:

PicOutputWidthL*2 shall be greater than or equal to refPicWidthInLumaSamples.

PicOutputHeightL*2 shall be greater than or equal to refPicHeightInLumaSamples.

PicOutputWidthL shall be less than or equal to refPicWidthInLumaSamples*8.

PicOutputHeightL shall be less than or equal to refPicHeightInLumaSamples*8.

PicOutputWidthL*pic_width_max_in_luma_samples shall be greater than or equal to refPicOutputWidthL*(pic_width_in_luma_samples−Max(8, MinCbSizeY)).

PicOutputHeightL*pic_height_max_in_luma_samples shall be greater than or equal to refPicOutputHeightL*(pic_height_in_luma_samples−Max(8, MinCbSizeY)).

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS.

subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag shall be equal to 0. Otherwise (subpic_id_mapping_explicitly_signalled_flag is equal to 1 and subpic_id_mapping_in_sps_flag is equal to 0), the value of subpic_id_mapping_in_pps_flag shall be equal to 1.

pps_num_subpics_minus1 shall be equal to sps_num_subpics_minus1.

pps_subpic_id_len_minus1 shall be equal to sps_subpic_id_len_minus1.

pps_subpic_id[i] specifies the subpicture ID of the i-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:

```
for( i = 0; i <= sps_num_subpics_minus1; i++ )
   if( subpic_id_mapping_explicitly_signalled_flag )
      SubpicIdVal[ i ] = subpic_id_mapping_in_pps_flag ?
         pps_subpic_id[ i ] :
   sps_subpic_id[ i ]   (80)
   else
      SubpicIdVal[ i ] = i
```

It is a requirement of bitstream conformance that both of the following constraints apply:
  For any two differently values of i and j in the range of 0 to sps_num_subpics_minus1, inclusive, SubpicIdVal[i] shall not be equal to SubpicIdVal[j].
  When the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, the nal_unit_type for all coded slice NAL units of the subpicture in the current picture with subpicture index i shall be equal to a particular value in the range of IDR_W_RADL to CRA_NUT, inclusive.

no_pic_partition_flag equal to 1 specifies that no picture partitioning is applied to each picture referring to the PPS. no_pic_partition_flag equal to 0 specifies each picture referring to the PPS may be partitioned into more than one tile or slice.

It is a requirement of bitstream conformance that the value of no_pic_partition_flag shall be the same for all PPSs that are referred to by coded pictures within a CLVS.

It is a requirement of bitstream conformance that the value of no_pic_partition_flag shall not be equal to 1 when the value of sps_num_subpics_minus1+1 is greater than 1.

pps_log 2_ctu_size_minus5 plus 5 specifies the luma coding tree block size of each CTU. pps_log 2_ctu_size_minus5 shall be equal to sps_log 2_ctu_size_minus5.

num_exp_tile_columns_minus1 plus 1 specifies the number of explicitly provided tile column widths. The value of num_exp_tile_columns_minus1 shall be in the range of 0 to PicWidthInCtbsY−1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp_tile_rows_minus1 shall be in the range of 0 to PicHeightInCtbsY−1, inclusive. When no_pic_partition_flag is equal to 1, the value of num_tile_rows_minus1 is inferred to be equal to 0.

tile_column_width_minus1[i] plus 1 specifies the width of the i-th tile column in units of coding tree blocks (CTBs) for i in the range of 0 to num_exp_tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. The value of tile_column_width_minus1[i] shall be in the range of 0 to PicWidthInCtbsY−1, inclusive. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive.

tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] shall be in the range of 0 to PicHeightInCtbsY−1, inclusive. When not present, the value of tile_row_height_minus1[0] is inferred to be equal to PicHeightInCtbsY−1.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1.

single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0.

num_slices_in_pic_minus1 plus 1 specifies the number of rectangular slices in each picture referring to the PPS. The value of num_slices_in_pic_minus1 shall be in the range of 0 to MaxSlicesPerPicture−1, inclusive, where MaxSlicesPerPicture is specified in Annex A. When no_pic_partition_flag is equal to 1, the value of num_slices_in_pic_minus1 is inferred to be equal to 0.

tile_idx_delta_present_flag equal to 0 specifies that tile_idx_delta values are not present in the PPS and all rectangular slices in pictures referring to the PPS are specified in raster order according to the process defined in clause 6.5.1. tile_idx_delta_present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to 0.

slice_width_in_tiles_minus1[i] plus 1 specifies the width of the i-th rectangular slice in units of tile columns. The value of slice_width_in_tiles_minus1[i] shall be in the range of 0 to NumTileColumns−1, inclusive.

When slice_width_in_tiles_minus1[i] is not present, the following applies:
  If NumTileColumns is equal to 1, the value of slice_width_in_tiles_minus1[i] is inferred to be equal to 0.
  Otherwise, the value of slice_width_in_tiles_minus1[i] is inferred as specified in clause 6.5.1.

slice_height_in_tiles_minus1[i] plus 1 specifies the height of the i-th rectangular slice in units of tile rows. The value of slice_height_in_tiles_minus1[i] shall be in the range of 0 to NumTileRows−1, inclusive.

When slice_height_in_tiles_minus1[i] is not present, the following applies:
  If NumTileRows is equal to 1, or tile_idx_delta_present_flag is equal to 0 and tileIdx % NumTileColumns is greater than 0), the value of slice_height_in_tiles_minus1[i] is inferred to be equal to 0.
  Otherwise (NumTileRows is not equal to 1, and tile_idx_delta_present_flag is equal to 1 or tileIdx % NumTileColumns is equal to 0), when tile_idx_delta_present_flag is equal to 1 or tileIdx % NumTileColumns is equal to 0, the value of slice_height_in_tiles_minus1[i] is inferred to be equal to slice_height_in_tiles_minus1[i−1].

num_exp_slices_in_tile[i] specifies the number of explicitly provided slice heights in the current tile that contains more than one rectangular slices. The value of num_exp_slices_in_tile[i] shall be in the range of 0 to RowHeight[tileY]−1, inclusive, where tileY is the tile row index containing the i-th slice. When not present, the value of num_exp_slices_in_tile[i] is inferred to be equal to 0. When num_exp_slices_in_tile[i] is equal to 0, the value of the variable NumSlicesInTile[i] is derived to be equal to 1.

exp_slice_height_in_ctus_minus1[j] plus 1 specifies the height of the j-th rectangular slice in the current tile in units of coding_tree unit (CTU) rows. The value of exp_slice_height_in_ctus_minus1[j] shall be in the range of 0 to RowHeight[tileY]−1, inclusive, where tileY is the tile row index of the current tile.

When num_exp_slices_in_tile[i] is greater than 0, the variable NumSlicesInTile[i] and SliceHeightInCtusMinus1[i+k] for k in the range of 0 to NumSlicesInTile[i]−1 are derived as follows:

```
remainingHeightInCtbsY = RowHeight[ SliceTopLeftTileIdx[ i ] / NumTileColumns ]
numExpSliceInTile = num_exp_slices_in_tile[ i ]
for( j = 0; j < numExpSliceInTile − 1; j++ ) {
    SliceHeightInCtusMinus1[ i++ ] =
    exp_slice_height_in_ctu_minus1[ j ]
    remainingHeightInCtbsY −= SliceHeightInCtusMinus1[ j ]
}
uniformSliceHeightMinus1 = SliceHeightInCtusMinus1[ i − 1 ]   (81)
while( remainingHeightInCtbsY >= (uniformSliceHeightMinus1 + 1) ) {
    SliceHeightInCtusMinus1[ i++ ] = uniformSliceHeightMinus1
    remainingHeightInCtbsY −= (uniformSliceHeightMinus1 + 1)
    j++
}
if( remainingHeightInCtbsY > 0 ) {
    SliceHeightInCtusMinus1[ i++ ] = remainingHeightInCtbsY
    j++
}
NumSlicesInTile[ i ] = j
``` tile_idx_delta[i] specifies the difference between the tile index of the first tile in the i-th rectangular slice and the tile index of the first tile in the (i+1)-th rectangular slice. The value of tile_idx_delta[i] shall be in the range of −NumTilesInPic+1 to NumTilesInPic−1, inclusive. When not present, the value of tile_idx_delta[i] is inferred to be equal to 0. When present, the value of tile_idx_delta[i] shall not be equal to 0.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

cabac_init_present_flag equal to 1 specifies that cabac_init_flag is present in slice headers referring to the PPS. cabac_init_present_flag equal to 0 specifies that cabac_init_flag is not present in slice headers referring to the PPS.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

rpl1_idx_present_flag equal to 0 specifies that ref_pic_list_sps_flag[1] and ref_pic_list_idx[1] are not present in the PH syntax structures or the slice headers for pictures referring to the PPS. rpl1_idx_present_flag equal to 1 specifies that ref_pic_list_sps_flag[1] and ref_pic_list_idx[1] may be present in the PH syntax structures or the slice headers for pictures referring to the PPS.

init_qp_minus26 plus 26 specifies the initial value of SliceQp$_Y$ for each slice referring to the PPS. The initial value of SliceQp$_Y$ is modified at the picture level when a non-zero value of ph_qp_delta is decoded or at the slice level when a non-zero value of slice_qp_delta is decoded. The value of init_qp_minus26 shall be in the range of −(26+QpBdOffset) to +37, inclusive.

cu_qp_delta_enabled_flag equal to 1 specifies that the ph_cu_qp_delta_subdiv_intra_slice and ph_cu_qp_delta_subdiv_inter_slice syntax elements are present in PHs referring to the PPS and cu_qp_delta_abs may be present in the transform unit syntax. cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS and cu_qp_delta_abs is not present in the transform unit syntax.

pps_chroma_tool_offsets_present_flag equal to 1 specifies that chroma tool offsets related syntax elements are present in the PPS RBSP syntax structure. pps_chroma_tool_offsets_present_flag equal to 0 specifies that chroma tool offsets related syntax elements are not present in in the PPS RBSP syntax structure. When ChromaArrayType is equal to 0, the value of pps_chroma_tool_offsets_present_flag shall be equal to 0.

pps_cb_qp_offset and pps_cr_qp_offset specify the offsets to the luma quantization parameter Qp'$_Y$ used for deriving Qp'$_{Cb}$ and Qp'$_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value. When not present, the values of pps_cb_qp_offset and pps_cr_qp_offset are inferred to be equal to 0.

pps_joint_cbcr_qp_offset_present_flag equal to 1 specifies that pps_joint_cbcr_qp_offset_value and joint_cbcr_qp_offset_list[i] are present in the PPS RBSP syntax structure. pps_joint_cbcr_qp_offset_present_flag equal to 0 specifies that pps_joint_cbcr_qp_offset_value and joint_cbcr_qp_offset_list[i] are not present in the PPS RBSP syntax structure. When ChromaArrayType is equal to 0 or sps_joint_cbcr_enabled_flag is equal to 0, the value of pps_joint_cbcr_qp_offset_present_flag shall be equal to 0. When not present, the value of pps_joint_cbcr_qp_offset_present_flag is inferred to be equal to 0.

pps_joint_cbcr_qp_offset_value specifies the offset to the luma quantization parameter Qp'$_Y$ used for deriving Qp'$_{CbCr}$. The value of pps_joint_cbcr_qp_offset_value shall be in the range of −12 to +12, inclusive. When ChromaArrayType is equal to 0 or sps_joint_cbcr_enabled_flag is equal to 0, pps_joint_cbcr_qp_offset_value is not used in the decoding process and decoders shall ignore its value. When pps_joint_cbcr_qp_offset_present_flag is equal to 0, pps_joint_cbcr_qp_offset_value is not present and is inferred to be equal to 0.

pps_slice_chroma_qp_offsets_present_flag equal to 1 specifies that the slice_cb_qp_offset and slice_cr_qp_offset syntax elements are present in the associated slice headers. pps_slice_chroma_qp_offsets_present_flag equal to 0 specifies that the slice_cb_qp_offset and slice_cr_qp_offset syntax elements are not present in the associated slice headers. When not present, the value of pps_slice_chroma_qp_offsets_present_flag is inferred to be equal to 0.

pps_cu_chroma_qp_offset_list_enabled_flag equal to 1 specifies that the ph_cu_chroma_qp_offset_subdiv_intra_slice and ph_cu_chroma_qp_offset_subdiv_inter_slice syntax elements are present in PHs referring to the PPS and cu_chroma_qp_offset_flag may be present in the transform unit syntax and the palette coding syntax. pps_cu_chroma_qp_offset_list_enabled_flag equal to 0 specifies that the ph_cu_chroma_qp_offset_subdiv_intra_slice and ph_cu_chroma_qp_offset_subdiv_inter_slice syntax elements are not present in PHs referring to the PPS and the cu_chroma_qp_offset_flag is not present in the transform unit syntax and the palette coding syntax. When not present, the value of pps_cu_chroma_qp_offset_list_enabled_flag is inferred to be equal to 0.

chroma_qp_offset_list_len_minus1 plus 1 specifies the number of cb_qp_offset_list[i], cr_qp_offset_list[i], and joint_cbcr_qp_offset_list[i], syntax elements that are present in the PPS RBSP syntax structure. The value of chroma_qp_offset_list_len_minus1 shall be in the range of 0 to 5, inclusive.

cb_qp_offset_list[i], cr_qp_offset_list[i], and joint_cbcr_qp_offset_list[i], specify offsets used in the derivation of $Qp'_{Cb}$, $Qp'_{Cr}$, and $Qp'_{CbCr}$, respectively. The values of cb_qp_offset_list[i], cr_qp_offset_list[i], and joint_cbcr_qp_offset_list[i] shall be in the range of −12 to +12, inclusive. When pps_joint_cbcr_qp_offset_present_flag is equal to 0, joint_cbcr_qp_offset_list[i] is not present and it is inferred to be equal to 0.

pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0.

rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure.

dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. When not present, the value of dbf_info_in_ph_flag is inferred to be equal to 0.

sao_info_in_ph_flag equal to 1 specifies that sample adaptive offset (SAO) filter information is present in the PH syntax structure and not present in slice headers referring to the PPS that do not contain a PH syntax structure. sao_info_in_ph_flag equal to 0 specifies that SAO filter information is not present in the PH syntax structure and may be present in slice headers referring to the PPS that do not contain a PH syntax structure.

alf_info_in_ph_flag equal to 1 specifies that adaptive loop filter (ALF) information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure.

wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_inph_flag is inferred to be equal to 0.

qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure.

pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When the value of CtbSizeY/MinCbSizeY+1 is greater than pic_width_in_luma_samples/MinCbSizeY−1, the value of pps_ref_wraparound_enabled_flag shall be equal to 0. When sps_ref_wraparound_enabled_flag is equal to 0, the value of pps_ref_wraparound_enabled_flag shall be equal to 0.

pps_ref_wraparound_offset plus (CtbSizeY/MinCbSizeY)+2 specifies the offset used for computing the horizontal wrap-around position in units of MinCbSizeY luma samples. The value of pps_ref_wraparound_offset shall be in the range of 0 to (pic_width_in_luma_samples/MinCbSizeY)−(CtbSizeY/MinCbSizeY)−2, inclusive. The variable PpsRefWraparoundOffset is set equal to pps_ref_wraparound_offset+(CtbSizeY/MinCbSizeY)+2.

picture_header_extension_present_flag equal to 0 specifies that no PH extension syntax elements are present in PHs referring to the PPS. picture_header_extension_present_flag equal to 1 specifies that PH extension syntax elements are present in PHs referring to the PPS. picture_header_extension_present_flag shall be equal to 0 in bitstreams conforming to this version of this Specification.

slice_header_extension_present_flag equal to 0 specifies that no slice header extension syntax elements are present in the slice headers for coded pictures referring to the PPS. slice_header_extension_present_flag equal to 1 specifies that slice header extension syntax elements are present in the slice headers for coded pictures referring to the PPS. slice_header_extension_present_flag shall be equal to 0 in bitstreams conforming to this version of this Specification.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification shall ignore all pps_extension_data_flag syntax elements.

3.4. APS Syntax and Semantics

In the latest VVC draft text, the APS syntax and semantics are as follows:

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |
|     scaling_list_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

The APS RBSP contains a ALF syntax structure, i.e., alf_data( ).

| | Descriptor |
|---|---|
| alf_data( ) { | |
|   alf_luma_filter_signal_flag | u(1) |
|   alf_chroma_filter_signal_flag | u(1) |
|   alf_cc_cb_filter_signal_flag | u(1) |
|   alf_cc_cr_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) | |
|       for( filtIdx = 0; filtIdx < NumAlfFilters; filtIdx++ ) | |
|         alf_luma_coeff_delta_idx[ filtIdx ] | u(v) |
|     for( sfIdx = 0; sfIdx <= alf_luma_num_filters_signalled_minus1; sfIdx++ ) | |
|       for( j = 0; j < 12; j++ ) { | |
|         alf_luma_coeff_abs[ sfIdx ][ j ] | ue(v) |
|         if( alf_luma_coeff_abs[ sfIdx ][ j ] ) | |
|           alf_luma_coeff_sign[ sfIdx ][ j ] | u(1) |
|       } | |
|     if( alf_luma_clip_flag ) | |
|       for( sfIdx = 0; sfIdx <= alf_luma_num_filters_signalled_minus1; sfIdx++ ) | |

-continued

| | Descriptor |
|---|---|
| ``` |  |
|     for( j = 0; j < 12; j++ ) | |
|         alf_luma_clip_idx[ sfIdx ][ j ] | u(2) |
|   } | |
|   if( alf_chroma_filter_signal_flag ) { | |
|     alf_chroma_clip_flag | u(1) |
|     alf_chroma_num_alt_filters_minus1 | ue(v) |
|     for( altIdx = 0; altIdx <= alf_chroma_num_alt_filters_minus1; altIdx++ ) { | |
|       for( j = 0; j < 6; j++ ) { | |
|         alf_chroma_coeff_abs[ altIdx ][ j ] | ue(v) |
|         if( alf_chroma_coeff_abs[ altIdx ][ j ] > 0 ) | |
|           alf_chroma_coeff_sign[ altIdx ][ j ] | u(1) |
|       } | |
|       if( alf_chroma_clip_flag ) | |
|         for( j = 0; j < 6; j++ ) | |
|           alf_chroma_clip_idx[ altIdx ][ j ] | u(2) |
|     } | |
|   } | |
|   if( alf_cc_cb_filter_signal_flag ) { | |
|     alf_cc_cb_filters_signalled_minus1 | ue(v) |
|     for( k = 0; k < alf_cc_cb_filters_signalled_minus1 + 1; k++ ) { | |
|       for( j = 0; j < 7; j++ ) { | |
|         alf_cc_cb_mapped_coeff_abs[ k ][ j ] | u(3) |
|         if( alf_cc_cb_mapped_coeff_abs[ k ][ j ] ) | |
|           alf_cc_cb_coeff_sign[ k ][ j ] | u(1) |
|       } | |
|     } | |
|   } | |
|   if( alf_cc_cr_filter_signal_flag ) { | |
|     alf_cc_cr_filters_signalled_minus1 | ue(v) |
|     for( k = 0; k < alf_cc_cr_filters_signalled_minus1 + 1; k++ ) { | |
|       for( j = 0; j < 7; j++ ) { | |
|         alf_cc_cr_mapped_coeff_abs[ k ][ j ] | u(3) |
|         if( alf_cc_cr_mapped_coeff_abs[ k ][ j ] ) | |
|           alf_cc_cr_coeff_sign[ k ][ j ] | u(1) |
|       } | |
|     } | |
|   } | |
| } | |

The APS RBSP contains a LMCS syntax structure, i.e. lmcs_data( ).

| | Descriptor |
|---|---|
| lmcs_data( ) { | |
|   lmcs_min_bin_idx | ue(v) |
|   lmcs_delta_max_bin_idx | ue(v) |
|   lmcs_delta_cw_prec_minus1 | ue(v) |
|   for( i = lmcs_min_bin_idx; i <= LmcsMaxBinIdx; i++ ) { | |
|     lmcs_delta_abs_cw[ i ] | u(v) |
|     if( lmcs_delta_abs_cw[ i ] > 0 ) | |

-continued

| | Descriptor |
|---|---|
|       lmcs_delta_sign_cw_flag[ i ] | u(1) |
|   } | |
|   lmcs_delta_abs_crs | u(3) |
|   if( lmcs_delta_abs_crs > 0 ) | |
|     lmcs_delta_sign_crs_flag | u(1) |
| } | |

The APS RBSP contains a scaling list data syntax structure, i.e., scaling_list_data( ).

| | Descriptor |
|---|---|
| scaling_list_data( ) { | |
|   scaling_matrix_for_lfnst_disabled_flag | u(1) |
|   scaling_list_chroma_present_flag | u(1) |
|   for( id = 0; id < 28; id ++ ) { | |
|     matrixSize = (id < 2 ) ? 2 : ( ( id < 8 ) ? 4 : 8 ) | |
|     if( scaling_list_chroma_present_flag | | ( id % 3 = = 2 ) | | ( id = = 27 ) ) { | |
|       scaling_list_copy_mode_flag[ id ] | u(1) |
|       if( !scaling_list_copy_mode_flag[ id ] ) | |
|         scaling_list_pred_mode_flag[ id ] | u(1) |
|       if( ( scaling_list_copy_mode_flag[ id ] | | scaling_list_pred_mode_flag[ id ] ) && id != 0 && id != 2 && id != 8 ) | |
|         scaling_list_pred_id_delta[ id ] | ue(v) |
|       if( !scaling_list_copy_mode_flag[ id ] ) { | |
|         nextCoef = 0 | |

-continued

| | Descriptor |
|---|---|
| ```
      if( id > 13 ) {
        scaling_list_dc_coef[ id − 14 ]
        nextCoef += scaling_list_dc_coef[ id − 14 ]
      }
      for( i = 0; i < matrixSize * matrixSize; i++ ) {
        x = DiagScanOrder[ 3 ][ 3 ][ i ][ 0 ]
        y = DiagScanOrder[ 3 ][ 3 ][ i ][ 1 ]
        if( !( id > 25 && x >= 4 && y >= 4 ) ) {
          scaling_list_delta_coef[ id ][ i ]
          nextCoef += scaling_list_delta_coef[ id ][ i ]
        }
        ScalingList[ id ][ i ] = nextCoef
      }
    }
  }
 }
}
``` | se(v)<br><br><br><br><br><br><br>se(v) |

Each APS RBSP shall be available to the decoding process prior to it being referenced, included in at least one AU with TemporalId less than or equal to the TemporalId of the coded slice NAL unit that refers it or provided through external means.

All APS NAL units with a particular value of adaptation_parameter_set_id and a particular value of aps_params_type within a PU, regardless of whether they are prefix or suffix APS NAL units, shall have the same content.

adaptation_parameter_set_id provides an identifier for the APS for reference by other syntax elements.

When aps_params_type is equal to ALF_APS or SCALING_APS, the value of adaptation_parameter_set_id shall be in the range of 0 to 7, inclusive.

When aps_params_type is equal to LMCS_APS, the value of adaptation_parameter_set_id shall be in the range of 0 to 3, inclusive.

Let apsLayerId be the value of the nuh_layer_id of a particular APS NAL unit, and vclLayerId be the value of the nuh_layer_id of a particular VCL NAL unit. The particular VCL NAL unit shall not refer to the particular APS NAL unit unless apsLayerId is less than or equal to vclLayerId and the layer with nuh_layer_id equal to apsLayerId is included in at least one OLS that includes the layer with nuh_layer_id equal to vclLayerId.

aps_params_type specifies the type of APS parameters carried in the APS as specified in Table 6.

TABLE 6

APS parameters type codes and types of APS parameters

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | Scaling list parameters |
| 3 . . . 7 | Reserved | Reserved |

All APS NAL units with a particular value of aps_params_type, regardless of the nuh_layer_id values, share the same value space for adaptation_parameter_set_id. APS NAL units with different values of aps_params_type use separate values spaces for adaptation_parameter_set_id.

NOTE 1—An APS NAL unit (with a particular value of adaptation_parameter_set_id and a particular value of aps_params_type) can be shared across pictures, and different slices within a picture can refer to different ALF APSs.

NOTE 2—A suffix APS NAL unit associated with a particular VCL NAL unit (this VCL NAL unit precedes the suffix APS NAL unit in decoding order) is not for use by the particular VCL NAL unit, but for use by VCL NAL units following the suffix APS NAL unit in decoding order.

aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.

aps_extension_data_flag may have any value. Its presence and value do not affect decoder conformance to profiles specified in this version of this Specification. Decoders conforming to this version of this Specification shall ignore all aps_extension_data_flag syntax elements.

alf_luma_filter_signal_flag equal to 1 specifies that a luma filter set is signalled. alf_luma_filter_signal_flag equal to 0 specifies that a luma filter set is not signalled.

alf_chroma_filter_signal_flag equal to 1 specifies that a chroma filter is signalled. alf_chroma_filter_signal_flag equal to 0 specifies that a chroma filter is not signalled. When ChromaArrayType is equal to 0, alf_chroma_filter_signal_flag shall be equal to 0.

At least one of the values of alf_luma_filter_signal_flag, alf_chroma_filter_signal_flag, alf_cc_cb_filter_signal_flag and alf_cc_cr_filter_signal_flag shall be equal to 1.

The variable NumAlfFilters specifying the number of different adaptive loop filters is set equal to 25.

alf_luma_clip_flag equal to 0 specifies that linear adaptive loop filtering is applied on luma component. alf_luma_clip_flag equal to 1 specifies that non-linear adaptive loop filtering may be applied on luma component.

alf_luma_num_filters_signalled_minus1 plus 1 specifies the number of adaptive loop filter classes for which luma coefficients can be signalled. The value of alf_luma_num_filters_signalled_minus1 shall be in the range of 0 to NumAlfFilters−1, inclusive.

alf_luma_coeff_delta_idx[filtIdx] specifies the indices of the signalled adaptive loop filter luma coefficient deltas for the filter class indicated by filtIdx ranging from 0 to NumAlfFilters−1. When alf_luma_coeff_delta_idx[filtIdx] is not present, it is inferred to be equal to 0. The length of alf_luma_coeff_delta_idx[filtIdx] is Ceil(Log 2(alf_luma_num_filters_signalled_minus1+1)) bits. The value of alf_luma_coeff_delta_idx[filtIdx] shall be in the range of 0 to alf_luma_num_filters_signalled_minus1, inclusive.

alf_luma_coeff_abs[sfIdx][j] specifies the absolute value of the j-th coefficient of the signalled luma filter indicated by sfIdx. When alf_luma_coeff_abs[sfIdx][j] is not present, it is inferred to be equal 0. The value of alf_luma_coeff_abs [sfIdx][j] shall be in the range of 0 to 128, inclusive.

alf_luma_coeff_sign[sfIdx][j] specifies the sign of the j-th luma coefficient of the filter indicated by sfIdx as follows:

If alf_luma_coeff_sign[sfIdx][j] is equal to 0, the corresponding luma filter coefficient has a positive value.

Otherwise (alf_luma_coeff_sign[sfIdx][j] is equal to 1), the corresponding luma filter coefficient has a negative value.

When alf_luma_coeff_sign[sfIdx][j] is not present, it is inferred to be equal to 0.

The variable filtCoeff[sfIdx][j] with sfIdx=0 . . . alf_luma_num_filters_signalled_minus1, j=0 . . . 11 is initialized as follows:

$$\text{filtCoeff}[sfIdx][j] = \text{alf\_luma\_coeff\_abs}[sfIdx][j]*(1-2*\text{alf\_luma\_coeff\_sign}[sfIdx][j]) \quad (93)$$

The luma filter coefficients $\text{AlfCoeff}_L$[adaptation_parameter_set_id] with elements $\text{AlfCoeff}_L$[adaptation_parameter_set_id][filtIdx][j], with filtIdx=0 . . . NumAlfFilters−1 and j=0 . . . 11 are derived as follows:

$$\text{AlfCoeff}_L[\text{adaptation\_parameter\_set\_id}][\text{filt}Idx][j] = \text{filtCoeff}[\text{alf\_luma\_coeff\_delta\_idx}[\text{filt}Idx]][j] \quad (94)$$

The fixed filter coefficients AlfFixFiltCoeff[i][j] with i=0 . . . 64, j=0 . . . 11 and the class to filter mapping AlfClassToFiltMap[m][n] with m=0 . . . 15 and n=0 . . . 24 are derived as follows:

```
AlfFixFiltCoeff =    (95)
{
{ 0, 0, 2, -3, 1, -4, 1, 7, -1, 1, -1, 5}
{ 0, 0, 0, 0, 0, -1, 0, 1, 0, 0, -1, 2}
{ 0, 0, 0, 0, 0, 0, 0, 1, 0, 0, 0, 0}
{ 0, 0, 0, 0, 0, 0, 0, 0, 0, 0, -1, 1}
{ 2, 2, -7, -3, 0, -5, 13, 22, 12, -3, -3, 17}
{-1, 0, 6, -8, 1, -5, 1, 23, 0, 2, -5, 10}
{ 0, 0, -1, -1, 0, -1, 2, 1, 0, 0, -1, 4}
{ 0, 0, 3, -11, 1, 0, -1, 35, 5, 2, -9, 9}
{ 0, 0, 8, -8, -2, -7, 4, 4, 2, 1, -1, 25}
{ 0, 0, 1, -1, 0, -3, 1, 3, -1, 1, -1, 3}
{ 0, 0, 3, -3, 0, -6, 5, -1, 2, 1, -4, 21}
{-7, 1, 5, 4, -3, 5, 11, 13, 12, -8, 11, 12}
{-5, -3, 6, -2, -3, 8, 14, 15, 2, -7, 11, 16}
{ 2, -1, -6, -5, -2, -2, 20, 14, -4, 0, -3, 25}
{ 3, 1, -8, -4, 0, -8, 22, 5, -3, 2, -10, 29}
{ 2, 1, -7, -1, 2, -11, 23, -5, 0, 2, -10, 29}
{-6, -3, 8, 9, -4, 8, 9, 7, 14, -2, 8, 9}
{ 2, 1, -4, -7, 0, -8, 17, 22, 1, -1, -4, 23}
{ 3, 0, -5, -7, 0, -7, 15, 18, -5, 0, -5, 27}
{ 2, 0, 0, -7, 1, -10, 13, 13, -4, 2, -7, 24}
{ 3, 3, -13, 4, -2, -5, 9, 21, 25, -2, -3, 12}
{-5, -2, 7, -3, -7, 9, 8, 9, 16, -2, 15, 12}
{ 0, -1, 0, -7, -5, 4, 11, 11, 8, -6, 12, 21}
{ 3, -2, -3, -8, -4, -1, 16, 15, -2, -3, 3, 26}
{ 2, 1, -5, -4, -1, -8, 16, 4, -2, 1, -7, 33}
{ 2, 1, -4, -2, 1, -10, 17, -2, 0, 2, -11, 33}
{ 1, -2, 7, -15, -16, 10, 8, 8, 20, 11, 14, 11}
{ 2, 2, 3, -13, -13, 4, 8, 12, 2, -3, 16, 24}
{ 1, 4, 0, -7, -8, -4, 9, 9, -2, -2, 8, 29}
{ 1, 1, 2, -4, -1, -6, 6, 3, -1, -1, -3, 30}
{-7, 3, 2, 10, -2, 3, 7, 11, 19, -7, 8, 10}
{ 0, -2, -5, -3, -2, 4, 20, 15, -1, -3, -1, 22}
{ 3, -1, -8, -4, -1, -4, 22, 8, -4, 2, -8, 28}
{ 0, 3, -14, 3, 0, 1, 19, 17, 8, -3, -7, 20}
{ 0, 2, -1, -8, 3, -6, 5, 21, 1, 1, -9, 13}
{-4, -2, 8, 20, -2, 2, 3, 5, 21, 4, 6, 1}
{ 2, -2, -3, -9, -4, 2, 14, 16, 3, -6, 8, 24}
{ 2, 1, 5, -16, -7, 2, 3, 11, 15, -3, 11, 22}
{ 1, 2, 3, -11, -2, -5, 4, 8, 9, -3, -2, 26}
{ 0, -1, 10, -9, -1, -8, 2, 3, 4, 0, 0, 29}
{ 1, 2, 0, -5, 1, -9, 9, 3, 0, 1, -7, 20}
{-2, 8, -6, -4, 3, -9, -8, 45, 14, 2, -13, 7}
{ 1, -1, 16, -19, -8, -4, -3, 2, 19, 0, 4, 30}
{ 1, 1, -3, 0, 2, -11, 15, -5, 1, 2, -9, 24}
{ 0, 1, -2, 0, 1, -4, 4, 0, 0, 1, -4, 7}
{ 0, 1, 2, -5, 1, -6, 4, 10, -2, 1, -4, 10}
{ 3, 0, -3, -6, -2, -6, 14, 8, -1, -1, -3, 31}
{ 0, 1, 0, -2, 1, -6, 5, 1, 0, 1, -5, 13}
{ 3, 1, 9, -19, -21, 9, 7, 6, 13, 5, 15, 21}
{ 2, 4, 3, -12, -13, 1, 7, 8, 3, 0, 12, 26}
{ 3, 1, -8, -2, 0, -6, 18, 2, -2, 3, -10, 23}
{ 1, 1, -4, -1, 1, -5, 8, 1, -1, 2, -5, 10}
{ 0, 1, -1, 0, 0, -2, 2, 0, 0, 1, -2, 3}
{ 1, 1, -2, -7, 1, -7, 14, 18, 0, 0, -7, 21}
{ 0, 1, 0, -2, 0, -7, 8, 1, -2, 0, -3, 24}
{ 0, 1, 1, -2, 2, -10, 10, 0, -2, 1, -7, 23}
{ 0, 2, 2, -11, 2, -4, -3, 39, 7, 1, -10, 9}
{ 1, 0, 13, -16, -5, -6, -1, 8, 6, 0, 6, 29}
{ 1, 3, 1, -6, -4, -7, 9, 6, -3, -2, 3, 33}
```

```
{ 4, 0, -17, -1, -1, 5, 26, 8, -2, 3, -15, 30}
{ 0, 1, -2, 0, 2, -8, 12, -6, 1, 1, -6, 16}
{ 0, 0, 0, -1, 1, -4, 4, 0, 0, 0, -3, 11}
{ 0, 1, 2, -8, 2, -6, 5, 15, 0, 2, -7, 9}
{ 1, -1, 12, -15, -7, -2, 3, 6, 6, -1, 7, 30}
},
AlfClassToFiltMap = (96)
{
{ 8, 2, 2, 2, 3, 4, 53, 9, 9, 52, 4, 4, 5, 9, 2,
8, 10, 9, 1, 3, 39, 39, 10, 9, 52 }
{ 11, 12, 13, 14, 15, 30, 11, 17, 18, 19, 16, 20, 20, 4, 53, 21, 22, 23, 14, 25, 26, 26, 27,
28, 10 }
{ 16, 12, 31, 32, 14, 16, 30, 33, 53, 34, 35, 16, 20, 4, 7, 16, 21, 36, 18, 19, 21, 26, 37,
38, 39 }
{ 35, 11, 13, 14, 43, 35, 16, 4, 34, 62, 35, 35, 30, 56, 7, 35, 21, 38, 24, 40, 16, 21, 48,
57, 39 }
{ 11, 31, 32, 43, 44, 16, 4, 17, 34, 45, 30, 20, 20, 7, 5, 21, 22, 46, 40, 47, 26, 48, 63,
58, 10 }
{ 12, 13, 50, 51, 52, 11, 17, 53, 45, 9, 30, 4, 53, 19, 0, 22, 23, 25, 43, 44, 37, 27, 28,
10, 55 }
{ 30, 33, 62, 51, 44, 20, 41, 56, 34, 45, 20, 41, 41, 56, 5, 30, 56, 38, 40, 47, 11, 37, 42,
57, 8 }
{ 35, 11, 23, 32, 14, 35, 20, 4, 17, 18, 21, 20, 20, 20, 4, 16, 21, 36, 46, 25, 41, 26, 48,
49, 58 }
{ 12, 31, 59, 59, 3, 33, 33, 59, 59, 52, 4, 33, 17, 59, 55, 22, 36, 59, 59, 60, 22, 36, 59,
25, 55 }
{ 31, 25, 15, 60, 60, 22, 17, 19, 55, 55, 20, 20, 53, 19, 55, 22, 46, 25, 43, 60, 37, 28, 10,
55, 52 }
{ 12, 31, 32, 50, 51, 11, 33, 53, 19, 45, 16, 4, 4, 53, 5, 22, 36, 18, 25, 43, 26, 27, 27,
28, 10 }
{ 5, 2, 44, 52, 3, 4, 53, 45, 9, 3, 4, 56, 5, 0, 2, 5, 10, 47, 52, 3, 63, 39, 10, 9, 52 }
{ 12, 34, 44, 44, 3, 56, 56, 62, 45, 9, 56, 56, 7, 5, 0, 22, 38, 40, 47, 52, 48, 57, 39, 10,
9 }
{ 35, 11, 23, 14, 51, 35, 20, 41, 56, 62, 16, 20, 41, 56, 7, 16, 21, 38, 24, 40, 26, 26, 42,
57, 39 }
{ 33, 34, 51, 51, 52, 41, 41, 34, 62, 0, 41, 41, 56, 7, 5, 56, 38, 38, 40, 44, 37, 42, 57,
39, 10 }
{ 16, 31, 32, 15, 60, 30, 4, 17, 19, 25, 22, 20, 4, 53, 19, 21, 22, 46, 25, 55, 26, 48, 63,
58, 55 }
},
```

It is a requirement of bitstream conformance that the values of AlfCoeff$_L$[adaptation_parameter_set_id][filtIdx][j] with filtIdx=0 . . . NumAlfFilters−1, j=0 . . . 11 shall be in the range of −2$^7$ to 2$^7$−1, inclusive.

alf_luma_clip_idx[sfIdx][j] specifies the clipping index of the clipping value to use before multiplying by the j-th coefficient of the signalled luma filter indicated by sfIdx. It is a requirement of bitstream conformance that the values of alf_luma_clip_idx[sfIdx][j] with sfIdx=0 . . . alf_luma_num_filters_signalled_minus1 and j=0 . . . 11 shall be in the range of 0 to 3, inclusive.

The luma filter clipping values AlfClip$_L$[adaptation_parameter_set_id] with elements AlfClip$_L$[adaptation_parameter_set_id][filtIdx][j], with filtIdx=0 . . . NumAlfFilters−1 and j=0 . . . 11 are derived as specified in Table 8 depending on BitDepth and clipIdx set equal to alf_luma_clip_idx[alf_luma_coeff_delta_idx[filtIdx]][j].

alf_chroma_clip_flag equal to 0 specifies that linear adaptive loop filtering is applied on chroma components; alf_chroma_clip_flag equal to 1 specifies that non-linear adaptive loop filtering is applied on chroma components. When not present, alf_chroma_clip_flag is inferred to be equal to 0.

alf_chroma_num_alt_filters_minus1 plus 1 specifies the number of alternative filters for chroma components. The value of alf_chroma_num_alt_filters_minus1 shall be in the range of 0 to 7, inclusive.

alf_chroma_coeff_abs[altIdx][j] specifies the absolute value of the j-th chroma filter coefficient for the alternative chroma filter with index altIdx. When alf_chroma_coeff_abs[altIdx][j] is not present, it is inferred to be equal 0. The value of alf_chroma_coeff_abs[sfIdx][j] shall be in the range of 0 to 128, inclusive.

alf_chroma_coeff_sign[altIdx][j] specifies the sign of the j-th chroma filter coefficient for the alternative chroma filter with index altIdx as follows:
  If alf_chroma_coeff_sign[altIdx][j] is equal to 0, the corresponding chroma filter coefficient has a positive value.
  Otherwise (alf_chroma_coeff_sign[altIdx][j] is equal to 1), the corresponding chroma filter coefficient has a negative value.

When alf_chroma_coeff_sign[altIdx][j] is not present, it is inferred to be equal to 0.

The chroma filter coefficients AlfCoeff$_C$[adaptation_parameter_set_id][altIdx] with elements AlfCoeff$_C$[adaptation_parameter_set_id][altIdx][j], with altIdx=0 . . . alf_chroma_num_alt_filters_minus1, j=0 . . . 5 are derived as follows:

$$\text{AlfCoeff}_C[\text{adaptation\_parameter\_set\_id}][\text{altIdx}][j] = \text{alf\_chroma\_coeff\_abs}[\text{altIdx}][j]*(1-2*\text{alf\_chroma\_coeff\_sign}[\text{altIdx}][j]) \quad (97)$$

It is a requirement of bitstream conformance that the values of AlfCoeff$_C$[adaptation_parameter_set_id][altIdx][j] with altIdx=0 . . . alf_chroma_num_alt_filters_minus1, j=0 . . . 5 shall be in the range of −2$^7$ to 2$^7$−1, inclusive.

alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. When ChromaArrayType is equal to 0, alf_cc_cb_filter_signal_flag shall be equal to 0.

alf_cc_cb_filters_signalled_minus1 plus 1 specifies the number of cross-component filters for the Cb colour component signalled in the current ALF APS. The value of alf_cc_cb_filters_signalled_minus1 shall be in the range of 0 to 3, inclusive.

alf_cc_cb_mapped_coeff_abs[k][j] specifies the absolute value of the j-th mapped coefficient of the signalled k-th cross-component filter for the Cb colour component. When alf_cc_cb_mapped_coeff_abs[k][j] is not present, it is inferred to be equal to 0.

alf_cc_cb_coeff_sign[k][j] specifies the sign of the j-th coefficient of the signalled k-th cross-component filter for the Cb colour component as follows:
- If alf_cc_cb_coeff_sign[k][j] is equal to 0, the corresponding cross-component filter coefficient has a positive value.
- Otherwise (alf_cc_cb_sign[k][j] is equal to 1), the corresponding cross-component filter coefficient has a negative value.

When alf_cc_cb_coeff_sign[k][j] is not present, it is inferred to be equal to 0.

The signalled k-th cross-component filter coefficients for the Cb colour component CcAlfApsCoeff$_{Cb}$[adaptation_parameter_set_id][k][j], with j=0 . . . 6 are derived as follows:
- If alf_cc_cb_mapped_coeff_abs[k][j] is equal to 0, CcAlfApsCoeff$_{Cb}$[adaptation_parameter_set_id][k][j] is set equal to 0.
- Otherwise, CcAlfApsCoeff$_{Cb}$[adaptation_parameter_set_id][k][j] is set equal to $(1-2*\text{alf\_cc\_cb\_coeff\_sign}[k][j])*2^{alf\_cc\_cb\_mapped\_coeff\_abs[k][j]-1}$.

alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. When ChromaArrayType is equal to 0, alf_cc_cr_filter_signal_flag shall be equal to 0.

alf_cc_cr_filters_signalled_minus1 plus 1 specifies the number of cross-component filters for the Cr colour component signalled in the current ALF APS. The value of alf_cc_cr_filters_signalled_minus1 shall be in the range of 0 to 3, inclusive.

alf_cc_cr_mapped_coeff_abs[k][j] specifies the absolute value of the j-th mapped coefficient of the signalled k-th cross-component filter for the Cr colour component. When alf_cc_cr_mapped_coeff_abs[k][j] is not present, it is inferred to be equal to 0.

alf_cc_cr_coeff_sign[k][j] specifies the sign of the j-th coefficient of the signalled k-th cross-component filter for the Cr colour component as follows:
- If alf_cc_cr_coeff_sign[k][j] is equal to 0, the corresponding cross-component filter coefficient has a positive value.
- Otherwise (alf_cc_cr_sign[k][j] is equal to 1), the corresponding cross-component filter coefficient has a negative value.

When alf_cc_cr_coeff_sign[k][j] is not present, it is inferred to be equal to 0.

The signalled k-th cross-component filter coefficients for the Cr colour component CcAlfApsCoeff$_{Cr}$[adaptation_parameter_set_id][k][j], with j=0 . . . 6 are derived as follows:
- If alf_cc_cr_mapped_coeff_abs[k][j] is equal to 0, CcAlfApsCoeff$_{Cr}$[adaptation_parameter_set_id][k][j] is set equal to 0.
- Otherwise, CcAlfApsCoeff$_{Cr}$[adaptation_parameter_set_id][k][j] is set equal to $(1-2*\text{alf\_cc\_cr\_coeff\_sign}[k][j])*2^{alf\_cc\_cr\_mapped\_coeff\_abs[k][j]-1}$.

alf_chroma_clip_idx[altIdx][j] specifies the clipping index of the clipping value to use before multiplying by the j-th coefficient of the alternative chroma filter with index altIdx. It is a requirement of bitstream conformance that the values of alf_chroma_clip_idx[altIdx][j] with altIdx=0 . . . alf_chroma_num_alt_filters_minus1, j=0 . . . 5 shall be in the range of 0 to 3, inclusive.

The chroma filter clipping values AlfClip$_C$[adaptation_parameter_set_id][altIdx] with elements AlfClip$_C$[adaptation_parameter_set_id][altIdx][j], with altIdx=0 . . . alf_chroma_num_alt_filters_minus1, j=0 . . . 5 are derived as specified in Table 8 depending on BitDepth and clipIdx set equal to alf_chroma_clip_idx[altIdx][j].

TABLE 8

Specification AlfClip depending on BitDepth and clipIdx

| BitDepth | clipIdx | | | |
| --- | --- | --- | --- | --- |
| | 0 | 1 | 2 | 3 |
| 8  | $2^8$  | $2^5$  | $2^3$  | $2^1$ |
| 9  | $2^9$  | $2^6$  | $2^4$  | $2^2$ |
| 10 | $2^{10}$ | $2^7$  | $2^5$  | $2^3$ |
| 11 | $2^{11}$ | $2^8$  | $2^6$  | $2^4$ |
| 12 | $2^{12}$ | $2^9$  | $2^7$  | $2^5$ |
| 13 | $2^{13}$ | $2^{10}$ | $2^8$  | $2^6$ |
| 14 | $2^{14}$ | $2^{11}$ | $2^9$  | $2^7$ |
| 15 | $2^{15}$ | $2^{12}$ | $2^{10}$ | $2^8$ |
| 16 | $2^{16}$ | $2^{13}$ | $2^{11}$ | $2^9$ | lmcs_min_bin_idx specifies the minimum bin index used in the luma mapping with chroma scaling construction process. The value of lmcs_min_bin_idx shall be in the range of 0 to 15, inclusive.

lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15−lmcs_delta_max_bin_idx. The value of LmcsMaxBinIdx shall be greater than or equal to lmcs_min_bin_idx.

lmcs_delta_cw_prec_minus1 plus 1 specifies the number of bits used for the representation of the syntax lmcs_delta_abs_cw[i]. The value of lmcs_delta_cw_prec_minus1 shall be in the range of 0 to BitDepth−2, inclusive.

lmcs_delta_abs_cw[i] specifies the absolute delta codeword value for the ith bin.

lmcs_delta_sign_cw_flag[i] specifies the sign of the variable lmcsDeltaCW[i] as follows:
- If lmcs_delta_sign_cw_flag[i] is equal to 0, lmcsDeltaCW[i] is a positive value.
- Otherwise (lmcs_delta_sign_cw_flag[i] is not equal to 0), lmcsDeltaCW[i] is a negative value.

When lmcs_delta_sign_cw_flag[i] is not present, it is inferred to be equal to 0.

The variable OrgCW is derived as follows:

$$OrgCW=(1<<BitDepth)/16 \qquad (98)$$

The variable lmcsDeltaCW[i], with i=lmcs_min_bin_idx . . . LmcsMaxBinIdx, is derived as follows:

$$lmcsDeltaCW[i]=(1-2*lmcs\_delta\_sign\_cw\_flag[i])*lmcsdelta\_abs\_cw[i] \qquad (99)$$

The variable lmcsCW[i] is derived as follows:
- For i=0 . . . lmcs_min_bin_idx−1, lmcsCW[i] is set equal 0.
- For i=lmcs_min_bin_idx . . . LmcsMaxBinIdx, the following applies:

$$lmcsCW[i]=OrgCW+lmcsDeltaCW[i] \qquad (100)$$

The value of lmcsCW[i] shall be in the range of (OrgCW>>3) to (OrgCW<<3-1), inclusive.
For i=LmcsMaxBinIdx+1 . . . 15, lmcsCW[i] is set equal 0.

It is a requirement of bitstream conformance that the following condition is true:

$$\Sigma_{i=0}^{15} lsmcsCW[i] <= (1<<BitDepth)-1 \qquad (101)$$

The variable InputPivot[i], with i=0 . . . 16, is derived as follows:

$$InputPivot[i]=i*OrgCW \qquad (102)$$

The variable LmcsPivot[i] with i=0 . . . 16, the variables ScaleCoeff[i] and InvScaleCoeff[i] with i=0 . . . 15, are derived as follows:

```
LmcsPivot[ 0 ] = 0;
for( i = 0; i <= 15; i++ ) {
  LmcsPivot[ i + 1 ] = LmcsPivot[ i ] + lmcsCW[ i ]
  ScaleCoeff[ i ] = ( lmcsCW[ i ] * ( 1 << 11 ) + ( 1 << ( Log2( OrgCW
  ) − 1 ) ) ) >> ( Log2( OrgCW ) )
  if( lmcsCW[ i ] = = 0 )   (103)
    InvScaleCoeff[ i ] = 0
  else
    InvScaleCoeff[ i ] = OrgCW * ( 1 << 11 ) / lmcsCW[ i ]
}
```

It is a requirement of bitstream conformance that, for i=lmcs_min_bin_idx . . . LmcsMaxBinIdx, when the value of LmcsPivot[i] is not a multiple of 1<<(BitDepth−5), the value of (LmcsPivot[i]>>(BitDepth−5)) shall not be equal to the value of (LmcsPivot[i+1]>>(BitDepth−5)).

lmcs_delta_abs_crs specifies the absolute codeword value of the variable lmcsDeltaCrs. The value of lmcs_delta_abs_crs shall be in the range of 0 and 7, inclusive. When not present, lmcs_delta_abs_crs is inferred to be equal to 0.

lmcs_delta_sign_crs_flag specifies the sign of the variable lmcsDeltaCrs. When not present, lmcs_delta_sign_crs_flag is inferred to be equal to 0.

The variable lmcsDeltaCrs is derived as follows:

$$lmcsDeltaCrs=(1-2*lmcs\_delta\_sign\_crs\_flag)*lmcs\_delta\_abs\_crs \qquad (104)$$

It is a requirement of bitstream conformance that, when lmcsCW[i] is not equal to 0, (lmcsCW[i]+lmcsDeltaCrs) shall be in the range of (OrgCW>>3) to ((OrgCW<<3)−1), inclusive.

The variable ChromaScaleCoeff[i], with i=0 . . . 15, is derived as follows:

```
if( lmcsCW[ i ] = = 0 )
  ChromaScaleCoeff[ i ] = ( 1 << 11 )
else
  ChromaScaleCoeff[ i ] = OrgCW * ( 1 << 11 ) /
    ( lmcsCW[ i ] + lmcsDeltaCrs )
``` scaling_matrix_for_lfnst_disabled_flag equal to 1 specifies that scaling matrices are not applied to blocks coded with low-frequency non-separable transform (LFNST). scaling_matrix_for_lfnst_disabled_flag equal to 0 specifies that the scaling matrices may apply to the blocks coded with LFNST.

scaling_list_chroma_present_flag equal to 1 specifies that chroma scaling lists are present in scaling_list_data( ). scaling_list_chroma_present_flag equal to 0 specifies that chroma scaling lists are not present in scaling_list_data( ). It is a requirement of bitstream conformance that scaling_list_chroma_present_flag shall be equal to 0 when ChromaArrayType is equal to 0, and shall be equal to 1 when ChromaArrayType is not equal to 0.

scaling_list_copy_mode_flag[id] equal to 1 specifies that the values of the scaling list are the same as the values of a reference scaling list. The reference scaling list is specified by scaling_list_pred_id_delta[id]. scaling_list_copy_mode_flag[id] equal to 0 specifies that scaling_list_pred_mode_flag is present.

scaling_list_pred_mode_flag[id] equal to 1 specifies that the values of the scaling list can be predicted from a reference scaling list. The reference scaling list is specified by scaling_list_pred_id_delta[id]. scaling_list_pred_mode_flag[id] equal to 0 specifies that the values of the scaling list are explicitly signalled. When not present, the value of scaling_list_pred_mode_flag[id] is inferred to be equal to 0.

scaling_list_pred_id_delta[id] specifies the reference scaling list used to derive the predicted scaling matrix ScalingMatrixPred[id]. When not present, the value of scaling_list_pred_id_delta[id] is inferred to be equal to 0. The value of scaling_list_pred_id_delta[id] shall be in the range of 0 to maxIdDelta with maxIdDelta derived depending on id as follows:

$$maxIdDelta=(id<2)?id:((id<8)?(id-2):(id-8)) \qquad (106)$$

The variables refid and matrixSize are derived as follows:

$$refid=id-scaling\_list\_pred\_id\_delta[id] \qquad (107)$$

$$matrixSize=(id<2)?2:((id<8)?4:8) \qquad (108)$$

The (matrixSize)×(matrixSize) array ScalingMatrixPred[x][y] with x=0 . . . matrixSize−1, y=0 . . . matrixSize−1 and the variable ScalingMatrixDCPred are derived as follows:
  When both scaling_list_copy_mode_flag[id] and scaling_list_pred_mode_flag[id] are equal to 0, all elements of ScalingMatrixPred are set equal to 8, and the value of ScalingMatrixDCPred is set equal to 8.
  Otherwise, when scaling_list_pred_id_delta[id] is equal to 0, all elements of ScalingMatrixPred are set equal to 16, and ScalingMatrixDCPred is set equal to 16.
  Otherwise (either scaling_list_copy_mode_flag[id] or scaling_list_pred_mode_flag[id] is equal to 1 and scaling_list_pred_id_delta[id] is greater than 0), ScalingMatrixPred is set equal to ScalingMatrixRec[refId], and the following applies for ScalingMatrixDCPred:
    If refId is greater than 13, ScalingMatrixDCPred is set equal to ScalingMatrixDCRec[refId−14].
    Otherwise (refId is less than or equal to 13), ScalingMatrixDCPred is set equal to ScalingMatrixPred[0][0].

scaling_list_dc_coef[id−14] is used to derive the value of the variable ScalingMatrixDC[id−14] when id is greater than 13 as follows:

$$ScalingMatrixDCRec[id-14]=(ScalingMatrixDCPred+scaling\_list\_dc\_coef[id-14]) \& 255 \qquad (109)$$

When not present, the value of scaling_list_dc_coef[id−14] is inferred to be equal to 0. The value of scaling_list_dc_coef[id−14] shall be in the range of −128 to 127, inclusive. The value of ScalingMatrixDCRec[id−14] shall be greater than 0.

scaling_list_delta_coef[id][i] specifies the difference between the current matrix coefficient ScalingList[id][i] and the previous matrix coefficient ScalingList[id][i−1], when scaling_list_copy_mode_flag[id] is equal to 0. The value of scaling_list_delta_coef[id][i] shall be in the range of −128 to 127, inclusive. When scaling_list_copy_mode_flag[id] is equal to 1, all elements of ScalingList[id] are set equal to 0.

The (matrixSize)×(matrixSize) array ScalingMatrixRec[id] is derived as follows:

$$\text{ScalingMatrixRec}[id][x][y] = (\text{ScalingMatrixPred}[x][y] + \text{ScalingList}[id][k]) \& 255 \quad (110)$$

with k=0 . . . (matrixSize*matrixSize−1), x=DiagScanOrder[Log 2(matrixSize)][Log 2(matrixSize)][k][0] and y=DiagScanOrder[Log 2(matrixSize)][Log 2(matrixSize)][k][1]

The value of ScalingMatrixRec[id][x][y] shall be greater than 0.

3.5. PH Syntax and Semantics

In the latest VVC draft text, the PH syntax and semantics are as follows:

| | Descriptor |
|---|---|
| picture_header_rbsp( ) { | |
|   picture_header_structure( ) | |
|   rbsp_trailing_bits( ) | |
| } | |

The PH RB SP contains a PH syntax structure, i.e., picture_header_structure( ).

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc > 0 ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
|   if( sps_scaling_list_enabled_flag ) { | |
|     ph_scaling_list_present_flag | u(1) |
|     if( ph_scaling_list_present_flag ) | |
|       ph_scaling_list_aps_id | u(3) |
|   } | |
|   if( sps_virtual_boundaries_enabled_flag && !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |

-continued

| | Descriptor |
|---|---|
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|    } | |
| } | |
| if( output_flag_present_flag ) | |
|   pic_output_flag | u(1) |
| if( rpl_info_in_ph_flag ) | |
|   ref_pic_lists( ) | |
| if( partition_constraints_override_enabled_flag ) | |
|   partition_constraints_override_flag | u(1) |
| if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |
|       ph_log2_diff_max_tt_min_qt_intra_slice_luma | ue(v) |
|     } | |
|     if( qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|       } | |
|     } | |
|   } | |
|   if( cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( ( ph_collocated_from_l0_flag && | |
|         num_ref_entries[ 0 ][ RplsIdx[ 0 ] ] > 1 ) \|\| | |
|         ( !ph_collocated_from_l0_flag && | |
|         num_ref_entries[ 1 ][ RplsIdx[ 1 ] ] > 1 ) ) | |
|         ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag ) | |
|     ph_disable_dmvr_flag | u(1) |
|   if( sps_prof_pic_present_flag ) | |
|     ph_disable_prof_flag | u(1) |
|   if( ( pps_weighted_pred_flag \|\| pps_weighted_bipred_flag ) && wp_info_in_ph_flag ) | |
|     pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |

| | Descriptor |
|---|---|
|       ph_sao_chroma_enabled_flag | u(1) |
|    } | |
|   if( sps_dep_quant_enabled_flag ) | |
|     ph_dep_quant_enabled_flag | u(1) |
|   if( sps_sign_data_hiding_enabled_flag && !ph_dep_quant_enabled_flag ) | |
|     pic_sign_data_hiding_enabled_flag | u(1) |
|   if( deblocking_filter_override_enabled_flag && dbf_info_in_ph_flag ) { | |
|     ph_deblocking_filter_override_flag | u(1) |
|     if( ph_deblocking_filter_override_flag ) { | |
|       ph_deblocking_filter_disabled_flag | u(1) |
|       if( !ph_deblocking_filter_disabled_flag ) { | |
|         ph_beta_offset_div2 | se(v) |
|         ph_tc_offset_div2 | se(v) |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       } | |
|     } | |
|   } | |
|   if( picture_header_extension_present flag ) { | |
|     ph_extension_length | ue(v) |
|     for( i = 0; i < ph_extension_length; i++) | |
|       ph_extension_data_byte[ i ] | u(8) |
|   } | |
| } | |

The PH syntax structure contains information that is common for all slices of the coded picture associated with the PH syntax structure.

gdr_or_irap_pic_flag equal to 1 specifies that the current picture is a GDR or IRAP picture. gdr_or_irap_pic_flag equal to 0 specifies that the current picture may or may not be a GDR or IRAP picture.

gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.

ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.

ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to 1.

NOTE 1—For bitstreams that are supposed to work subpicture based bitstream merging without the need of changing PH NAL units, the encoder is expected to set the values of both ph_inter_slice_allowed_flag and ph_intra_slice_allowed_flag equal to 1.

non_reference_picture_flag equal to 1 specifies the picture associated with the PH is never used as a reference picture. non_reference_picture_flag equal to 0 specifies the picture associated with the PH may or may not be used as a reference picture.

ph_pic_parameter_set_id specifies the value of pps_pic_parameter_set_id for the PPS in use. The value of ph_pic_parameter_set_id shall be in the range of 0 to 63, inclusive.

It is a requirement of bitstream conformance that the value of TemporalId of the PH shall be greater than or equal to the value of TemporalId of the PPS that has pps_pic_parameter_set_id equal to ph_pic_parameter_set_id.

ph_pic_order_cnt_lsb specifies the picture order count modulo MaxPicOrderCntLsb for the current picture. The length of the ph_pic_order_cnt_lsb syntax element is log 2_max_pic_order_cnt_lsb_minus4+4 bits. The value of the ph_pic_order_cnt_lsb shall be in the range of 0 to MaxPicOrderCntLsb−1, inclusive.

no_output_of_prior_pics_flag affects the output of previously-decoded pictures in the decoded picture buffer (DPB) after the decoding of a CLVS start (CLVSS) picture that is not the first picture in the bitstream as specified in Annex C.

recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

When the current picture is a GDR picture, the variable RpPicOrderCntVal is derived as follows:

$$RpPicOrderCntVal = PicOrderCntVal + recovery\_poc\_cnt \qquad (82)$$

NOTE 2—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

ph_extra_bit[i] may be equal to 1 or 0. Decoders conforming to this version of this Specification shall ignore the value of ph_extra_bit[i]. Its value does not affect decoder conformance to profiles specified in this version of specification.

ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[GeneralLayerIdx[nuh_layer_id]] is equal to 0 and there is a picture in the current AU in a reference layer of the current layer, the value of ph_poc_msb_present_flag shall be equal to 0.

poc_msb_val specifies the picture order count (POC) most significant bit (MSB) value of the current picture. The length of the syntax element poc_msb_val is poc_msb_len_minus1+1 bits.

ph_alf_enabled_flag equal to 1 specifies that adaptive loop filter is enabled for all slices associated with the PH and may be applied to Y, Cb, or Cr colour component in the slices. ph_alf_enabled_flag equal to 0 specifies that adaptive loop filter may be disabled for one, or more, or all slices associated with the PH. When not present, ph_alf_enabled_flag is inferred to be equal to 0.

ph_num_alf_aps_ids_luma specifies the number of ALF APSs that the slices associated with the PH refers to.

ph_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to ph_alf_aps_id_luma[i] shall be equal to 1.

The TemporalId of the APS NAL unit having aps_params_type equal to ALF_APS and adaptation_parameter_set_id equal to ph_alf_aps_id_luma[i] shall be less than or equal to the TemporalId of the picture associated with the PH.

ph_alf_chroma_idc equal to 0 specifies that the adaptive loop filter is not applied to Cb and Cr colour components. ph_alf_chroma_idc equal to 1 indicates that the adaptive loop filter is applied to the Cb colour component. ph_alf_chroma_idc equal to 2 indicates that the adaptive loop filter is applied to the Cr colour component. ph_alf_chroma_idc equal to 3 indicates that the adaptive loop filter is applied to Cb and Cr colour components. When ph_alf_chroma_idc is not present, it is inferred to be equal to 0.

ph_alf_aps_id_chroma specifies the adaptation_parameter_set_id of the ALF APS that the chroma component of the slices associated with the PH refers to.

The value of alf_chroma_filter_signal_flag of the APS NAL unit having aps_params_type equal to ALF_APS and adaptation_parameter_set_id equal to ph_alf_aps_id_chroma shall be equal to 1.

The TemporalId of the APS NAL unit having aps_params_type equal to ALF_APS and adaptation_parameter_set_id equal to ph_alf_aps_id_chroma shall be less than or equal to the TemporalId of the picture associated with the PH.

ph_cc_alf_cb_enabled_flag equal to 1 specifies that cross-component filter for Cb colour component is enabled for all slices associated with the PH and may be applied to Cb colour component in the slices. ph_cc_alf_cb_enabled_flag equal to 0 specifies that cross-component filter for Cb colour component may be disabled for one, or more, or all slices associated with the PH. When not present, ph_cc_alf_cb_enabled_flag is inferred to be equal to 0.

ph_cc_alf_cb_aps_id specifies the adaptation_parameter_set_id of the ALF APS that the Cb colour component of the slices associated with the PH refers to.

The value of alf_cc_cb_filter_signal_flag of the APS NAL unit having aps_params_type equal to ALF_APS and adaptation_parameter_set_id equal to ph_cc_alf_cb_aps_id shall be equal to 1.

The TemporalId of the APS NAL unit having aps_params_type equal to ALF_APS and adaptation_parameter_set_id equal to ph_cc_alf_cb_aps_id shall be less than or equal to the TemporalId of the picture associated with the PH.

ph_cc_alf_cr_enabled_flag equal to 1 specifies that cross-component filter for Cr colour component is enabled for all slices associated with the PH and may be applied to Cr colour component in the slices. ph_cc_alf_cr_enabled_flag equal to 0 specifies that cross-component filter for Cr colour component may be disabled for one, or more, or all slices associated with the PH. When not present, ph_cc_alf_cr_enabled_flag is inferred to be equal to 0.

ph_cc_alf_cr_aps_id specifies the adaptation_parameter_set_id of the ALF APS that the Cr colour component of the slices associated with the PH refers to.

The value of alf_cc_cr_filter_signal_flag of the APS NAL unit having aps_params_type equal to ALF_APS and adaptation_parameter_set_id equal to ph_cc_alf_cr_aps_id shall be equal to 1.

The TemporalId of the APS NAL unit having aps_params_type equal to ALF_APS and adaptation_parameter_set_id equal to ph_cc_alf_cr_aps_id shall be less than or equal to the TemporalId of the picture associated with the PH.

ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.

ph_scaling_list_present_flag equal to 1 specifies that the scaling list data used for the slices associated with the PH is derived based on the scaling list data contained in the referenced scaling list APS. ph_scaling_list_present_flag equal to 0 specifies that the scaling list data used for the slices associated with the PH is set to be equal to 16. When not present, the value of ph_scaling_list_present_flag is inferred to be equal to 0.

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

ph_virtual_boundaries_present_flag equal to 1 specifies that information of virtual boundaries is signalled in the PH. ph_virtual_boundaries_present_flag equal to 0 specifies that information of virtual boundaries is not signalled in the PH. When there is one or more than one virtual boundaries signalled in the PH, the in-loop filtering operations are disabled across the virtual boundaries in the picture. The in-loop filtering operations include the deblocking filter, sample adaptive offset filter, and adaptive loop filter operations. When not present, the value of ph_virtual_boundaries_present_flag is inferred to be equal to 0.

It is a requirement of bitstream conformance that, when subpic_info_present_flag is equal to 1, the value of ph_virtual_boundaries_present_flag shall be equal to 0.

The variable VirtualBoundariesPresentFlag is derived as follows:

```
VirtualBoundariesPresentFlag = 0
if( sps_virtual_boundaries_enabled_flag )
    VirtualBoundariesPresentFlag =
        sps_virtual_boundaries_present_flag | |
        ph_virtual_boundaries_present_flag   (83)
``` ph_num_ver_virtual_boundaries specifies the number of ph_virtual_boundaries_pos_x[i] syntax elements that are present in the PH. When ph_num_ver_virtual_boundaries is not present, it is inferred to be equal to 0.

The variable NumVerVirtualBoundaries is derived as follows:

```
NumVerVirtualBoundaries = 0
if( sps_virtual_boundaries_enabled_flag )
    NumVerVirtualBoundaries = sps_virtual_boundaries_present_flag ?
        sps_num_ver_virtual_boundaries :
        ph_num_ver_virtual_boundaries   (84)
``` ph_virtual_boundaries_pos_x[i] specifies the location of the i-th vertical virtual boundary in units of luma samples divided by 8. The value of ph_virtual_boundaries_pos_x[i] shall be in the range of 1 to Ceil(pic_width_in_luma_samples+8)−1, inclusive.

The list VirtualBoundariesPosX[i] for i ranging from 0 to NumVerVirtualBoundaries−1, inclusive, in units of luma samples, specifying the locations of the vertical virtual boundaries, is derived as follows:

```
for( i = 0; i < NumVerVirtualBoundaries; i++)
    VirtualBoundariesPosX[ i ] = ( sps_virtual_boundaries_present_flag
    ?
        sps_virtual_boundaries_pos_x[ i ] :
        ph_virtual_boundaries_pos_x[ i ] ) * 8   (85)
```

The distance between any two vertical virtual boundaries shall be greater than or equal to CtbSizeY luma samples.
ph_num_hor_virtual_boundaries specifies the number of ph_virtual_boundaries_pos_y[i] syntax elements that are present in the PH. When ph_num_hor_virtual_boundaries is not present, it is inferred to be equal to 0.
The parameter NumHorVirtualBoundaries is derived as follows:
    NumHorVirtualBoundaries=0
    if(sps_virtual_boundaries_enabled_flag)
        NumHorVirtualBoundaries=sps_virtual_boundaries_present_flag?

$$sps\_num\_hor\_virtual\_boundaries:ph\_num\_hor\_virtual\_boundaries \quad (86)$$

When sps_virtual_boundaries_enabled_flag is equal to 1 and ph_virtual_boundaries_present_flag is equal to 1, the sum of ph_num_ver_virtual_boundaries and ph_num_hor_virtual_boundaries shall be greater than 0.

ph_virtual_boundaries_pos_y[i] specifies the location of the i-th horizontal virtual boundary in units of luma samples divided by 8. The value of ph_virtual_boundaries_pos_y[i] shall be in the range of 1 to Ceil(pic_height_in_luma_samples÷8)−1, inclusive.

The list VirtualBoundariesPosY[i] for i ranging from 0 to NumHorVirtualBoundaries−1, inclusive, in units of luma samples, specifying the locations of the horizontal virtual boundaries, is derived as follows:
    for(i=0; i<NumHorVirtualBoundaries; i++)
        VirtualBoundariesPosY[i]=(sps_virtual_boundaries_present_flag?

$$sps\_virtual\_boundaries\_pos\_y[i]:ph\_virtual\_boundaries\_pos\_y[i])*8 \quad (87)$$

The distance between any two horizontal virtual boundaries shall be greater than or equal to CtbSizeY luma samples.
pic_output_flag affects the decoded picture output and removal processes as specified in Annex C. When pic_output_flag is not present, it is inferred to be equal to 1.
partition_constraints_override_flag equal to 1 specifies that partition constraint parameters are present in the PH. partition_constraints_override_flag equal to 0 specifies that partition constraint parameters are not present in the PH. When not present, the value of partition_constraints_override_flag is inferred to be equal to 0.
ph_log 2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma CUs in the slices with slice_type equal to 2 (I) associated with the PH. The value of ph_log 2_diff_min_qt_min_cb_intra_slice_luma shall be in the range of 0 to Ctb Log 2SizeY−MinCb Log 2SizeY, inclusive. When not present, the value of ph_log 2_diff_min_qt_min_cb_luma is inferred to be equal to sps_log 2_diff_min_qt_min_cb_intra_slice_luma.
ph_max_mtt_hierarchy_depth_intra_slice_luma specifies the maximum hierarchy depth for coding units resulting from multi-type tree splitting of a quadtree leaf in slices with slice_type equal to 2 (I) associated with the PH. The value of ph_max_mtt_hierarchy_depth_intra_slice_luma shall be in the range of 0 to 2*(Ctb Log 2SizeY−MinCb Log 2SizeY), inclusive. When not present, the value of ph_max_mtt_hierarchy_depth_intra_slice_luma is inferred to be equal to sps_max_mtt_hierarchy_depth_intra_slice_luma.
ph_log 2_diff_max_bt_min_qt_intra_slice_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) associated with the PH. The value of ph_log 2_diff_max_bt_min_qt_intra_slice_luma shall be in the range of 0 to Ctb Log 2SizeY−MinQt Log 2SizeIntraY, inclusive. When not present, the value of ph_log 2_diff_max_bt_min_qt_intra_slice_luma is inferred to be equal to sps_log 2_diff_max_bt_min_qt_intra_slice_luma.
ph_log 2_diff_max_tt_min_qt_intra_slice_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) associated with the PH. The value of ph_log 2_diff_max_tt_min_qt_intra_slice_luma shall be in the range of 0 to Ctb Log 2SizeY−MinQt Log 2SizeIntraY, inclusive. When not present, the value of ph_log 2_diff_max_tt_min_qt_intra_slice_luma is inferred to be equal to sps_log 2_diff_max_tt_mm_qt_intra_slice_luma.

ph_log 2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) associated with the PH. The value of ph_log 2_diff_min_qt_min_cb_intra_slice_chroma shall be in the range of 0 to Ctb Log 2SizeY−MinCb Log 2SizeY, inclusive. When not present, the value of ph_log 2_diff_min_qt_min_cb_intra_slice_chroma is inferred to be equal to sps_log 2_diff_min_qt_min_cb_intra_slice_chroma.

ph_max_mtt_hierarchy_depth_intra_slice_chroma specifies the maximum hierarchy depth for chroma coding units resulting from multi-type tree splitting of a chroma quadtree leaf with treeType equal to DUAL_TREE_CHROMA in slices with slice_type equal to 2 (I) associated with the PH. The value of ph_max_mtt_hierarchy_depth_intra_slice_chroma shall be in the range of 0 to 2*(Ctb Log 2SizeY−MinCb Log 2SizeY), inclusive. When not present, the value of ph_max_mtt_hierarchy_depth_intra_slice_chroma is inferred to be equal to sps_max_mtt_hierarchy_depth_intra_slice_chroma.

ph_log 2_diff_max_bt_min_qt_intra_slice_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log 2_diff_max_bt_min_qt_intra_slice_chroma shall be in the range of 0 to Ctb Log 2SizeY−MinQt Log 2SizeIntraC, inclusive. When not present, the value of ph_log 2_diff_max_bt_min_qt_intra_slice_chroma is inferred to be equal to sps_log 2_diff_max_bt_min_qt_intra_slice_chroma.

ph_log 2_diff_max_tt_min_qt_intra_slice_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log 2_diff_max_tt_min_qt_intra_slice_chroma shall be in the range of 0 to Ctb Log 2SizeY−MinQt Log 2SizeIntraC, inclusive. When not present, the value of ph_log 2_diff_max_tt_mm_qt_intra_slice_chroma is inferred to be equal to sps_log 2_diff_max_tt_mm_qt_intra_slice_chroma ph_cu_qp_delta_subdiv_intra_slice specifies the maximum cbSubdiv value of coding units in intra slice that convey cu_qp_delta_abs and cu_qp_delta_sign_flag. The value of ph_cu_qp_delta_subdiv_intra_slice shall be in the range of 0 to 2*(Ctb Log 2SizeY−MinQt Log 2SizeIntraY+ph_max_mtt_hierarchy_depth_intra_slice_luma), inclusive. When not present, the value of ph_cu_qp_delta_subdiv_intra_slice is inferred to be equal to 0. ph_cu_chroma_qp_offset_subdiv_intra_slice specifies the maximum cbSubdiv value of coding units in intra slice that convey cu_chroma_qp_offset_flag. The value of ph_cu_chroma_qp_offset_subdiv_intra_slice shall be in the range of 0 to 2*(Ctb Log 2SizeY−MinQt Log 2SizeIntraY+ph_max_mtt_hierarchy_depth_intra_slice_luma), inclusive.

When not present, the value of ph_cu_chroma_qp_offset_subdiv_intra_slice is inferred to be equal to 0.

ph_log 2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH. The value of ph_log 2_diff_min_qt_min_cb_inter_slice shall be in the range of 0 to Ctb Log 2SizeY−MinCb Log 2SizeY, inclusive. When not present, the value of ph_log 2_diff_min_qt_min_cb_luma is inferred to be equal to sps_log 2_diff_min_qt_min_cb_inter_slice.

ph_max_mtt_hierarchy_depth_inter_slice specifies the maximum hierarchy depth for coding units resulting from multi-type tree splitting of a quadtree leaf in slices with slice_type equal to 0 (B) or 1 (P) associated with the PH. The value of ph_max_mtt_hierarchy_depth_inter_slice shall be in the range of 0 to 2*(Ctb Log 2SizeY−MinCb Log 2SizeY), inclusive. When not present, the value of ph_max_mtt_hierarchy_depth_inter_slice is inferred to be equal to sps_max_mtt_hierarchy_depth_inter_slice.

ph_log 2_diff_max_bt_min_qt_inter_slice specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the slices with slice_type equal to 0 (B) or 1 (P) associated with the PH. The value of ph_log 2_diff_max_bt_min_qt_inter_slice shall be in the range of 0 to Ctb Log 2SizeY−MinQt Log 2SizeInterY, inclusive. When not present, the value of ph_log 2_diff_max_bt_min_qt_inter_slice is inferred to be equal to sps_log 2_diff_max_bt_min_qt_inter_slice.

ph_log 2_diff_max_tt_min_qt_inter_slice specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) associated with the PH. The value of ph_log 2_diff_max_tt_min_qt_inter_slice shall be in the range of 0 to Ctb Log 2SizeY−MinQt Log 2SizeInterY, inclusive. When not present, the value of ph_log 2_diff_max_tt_min_qt_inter_slice is inferred to be equal to sps_log 2_diff_max_tt_min_qt_inter_slice.

ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice shall be in the range of 0 to 2*(Ctb Log 2SizeY−MinQt Log 2SizeInterY+ph_max_mtt_hierarchy_depth_inter_slice), inclusive.

When not present, the value of ph_cu_qp_delta_subdiv_inter_slice is inferred to be equal to 0. ph_cu_chroma_qp_offset_subdiv_inter_slice specifies the maximum cbSubdiv value of coding units in inter slice that convey cu_chroma_qp_offset_flag. The value of ph_cu_chroma_qp_offset_subdiv_inter_slice shall be in the range of 0 to 2*(Ctb Log 2SizeY−MinQt Log 2SizeInterY+ph_max_mtt_hierarchy_depth_inter_slice), inclusive.

When not present, the value of ph_cu_chroma_qp_offset_subdiv_inter_slice is inferred to be equal to 0.

ph_temporal_mvp_enabled_flag specifies whether temporal motion vector predictors can be used for inter prediction for slices associated with the PH. If ph_temporal_mvp_enabled_ flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0.

The maximum number of subblock-based merging MVP candidates, MaxNumSubblockMergeCand, is derived as follows:

```
if( sps_affine_enabled_flag )
    MaxNumSubblockMergeCand = 5 –
    five_minus_max_num_subblock_merge_cand
    (88)
else
    MaxNumSubblockMergeCand =
    sps_sbtmvp_enabled_flag && ph_temporal_mvp_enable_flag
```

The value of MaxNumSubblockMergeCand shall be in the range of 0 to 5, inclusive.

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.

ph_collocated_ref_idx specifies the reference index of the collocated picture used for temporal motion vector prediction.

When ph_collocated_from_l0_flag is equal to 1, ph_collocated_ref_idx refers to an entry in reference picture list 0, and the value of ph_collocated_ref_idx shall be in the range of 0 to num_ref_entries[0][RplsIdx[0]]−1, inclusive.

When ph_collocated_from_l0_flag is equal to 0, ph_collocated_ref_idx refers to an entry in reference picture list 1, and the value of ph_collocated_ref_idx shall be in the range of 0 to num_ref_entries[1][RplsIdx[1]]−1, inclusive.

When not present, the value of ph_collocated_ref_idx is inferred to be equal to 0.

mvd_l1_zero_flag equal to 1 indicates that the mvd_coding (x0, y0, 1) syntax structure is not parsed and MvdL1[x0][y0][compIdx] and MvdCpL1[x0][y0][cpIdx][compIdx] are set equal to 0 for compIdx=0 . . . 1 and cpIdx=0 . . . 2. mvd_l1_zero_flag equal to 0 indicates that the mvd_coding (x0, y0, 1) syntax structure is parsed.

ph_fpel_mmvd_enabled_flag equal to 1 specifies that merge mode with motion vector difference uses integer sample precision in the slices associated with the PH. ph_fpel_mmvd_enabled_flag equal to 0 specifies that merge mode with motion vector difference can use fractional sample precision in the slices associated with the PH. When not present, the value of ph_fpel_mmvd_enabled_flag is inferred to be 0.

ph_disable_bdof_flag equal to 1 specifies that bi-directional optical flow inter prediction based inter bi-prediction is disabled in the slices associated with the PH. ph_disable_bdof_flag equal to 0 specifies that bi-directional optical flow inter prediction based inter bi-prediction may or may not be enabled in the slices associated with the PH.

When ph_disable_bdof_flag is not present, the following applies:

If sps_bdof_enabled_flag is equal to 1, the value of ph_disable_bdof_flag is inferred to be equal to 0.

Otherwise (sps_bdof_enabled_flag is equal to 0), the value of ph_disable_bdof_flag is inferred to be equal to 1.

ph_disable_dmvr_flag equal to 1 specifies that decoder motion vector refinement based inter bi-prediction is disabled in the slices associated with the PH. ph_disable_dmvr_ flag equal to 0 specifies that decoder motion vector refinement based inter bi-prediction may or may not be enabled in the slices associated with the PH.

When ph_disable_dmvr_flag is not present, the following applies:

If sps_dmvr_enabled_flag is equal to 1, the value of ph_disable_dmvr_flag is inferred to be equal to 0.

Otherwise (sps_dmvr_enabled_flag is equal to 0), the value of ph_disable_dmvr_flag is inferred to be equal to 1.

ph_disable_prof_flag equal to 1 specifies that prediction refinement with optical flow is disabled in the slices associated with the PH. ph_disable_prof_flag equal to 0 specifies that prediction refinement with optical flow may or may not be enabled in the slices associated with the PH.

When ph_disable_prof_flag is not present, the following applies:

If sps_affine_prof_enabled_flag is equal to 1, the value of ph_disable_prof_flag is inferred to be equal to 0.

Otherwise (sps_affine_prof_enabled_flag is equal to 0), the value of ph_disable_prof_flag is inferred to be equal to 1.

ph_qp_delta specifies the initial value of $Qp_Y$ to be used for the coding blocks in the picture until modified by the value of CuQpDeltaVal in the coding unit layer.

When qp_delta_info_in_ph_flag is equal to 1, the initial value of the $Qp_Y$ quantization parameter for all slices of the picture, $SliceQp_Y$, is derived as follows:

$$Slice Qp_Y = 26 + \text{init\_qp\_minus26} + ph\_qp\_\text{delta} \qquad (89)$$

The value of $SliceQp_Y$ shall be in the range of −QpBdOffset to +63, inclusive.

phjoint_cbcr_sign_flag specifies whether, in transform units with tu_joint_cbcr_residual_flag[x0][y0] equal to 1, the collocated residual samples of both chroma components have inverted signs. When tu_joint_cbcr_residual_flag[x0][y0] equal to 1 for a transform unit, ph_joint_cbcr_sign_flag equal to 0 specifies that the sign of each residual sample of the Cr (or Cb) component is identical to the sign of the collocated Cb (or Cr) residual sample and ph_joint_cbcr_sign_flag equal to 1 specifies that the sign of each residual sample of the Cr (or Cb) component is given by the inverted sign of the collocated Cb (or Cr) residual sample.

ph_sao_luma_enabled_flag equal to 1 specifies that SAO is enabled for the luma component in all slices associated with the PH; ph_sao_luma_enabled_flag equal to 0 specifies that SAO for the luma component may be disabled for one, or more, or all slices associated with the PH. When ph_sao_luma_enabled_flag is not present, it is inferred to be equal to 0.

ph_sao_chroma_enabled_flag equal to 1 specifies that SAO is enabled for the chroma component in all slices associated with the PH; ph_sao_chroma_enabled_flag equal to 0 specifies that SAO for chroma component may be disabled for one, or more, or all slices associated with the PH. When ph_sao_chroma_enabled_flag is not present, it is inferred to be equal to 0.

ph_dep_quant_enabled_flag equal to 0 specifies that dependent quantization is disabled for the current picture.

ph_dep_quant_enabled_flag equal to 1 specifies that dependent quantization is enabled for the current picture. When ph_dep_quant_enabled_flag is not present, it is inferred to be equal to 0.

pic_sign_data_hiding_enabled_flag equal to 0 specifies that sign bit hiding is disabled for the current picture. pic_sign_data_hiding_enabled_flag equal to 1 specifies that sign bit hiding is enabled for the current picture. When pic_sign_data_hiding_enabled_flag is not present, it is inferred to be equal to 0.

ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_cb_beta_offset_div2 and ph_cb_tc_offset_div2 specify the deblocking parameter offsets for R and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for R and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps_cr_beta_offset_div2 and pps_cr_tc_offset_div2, respectively.

ph_extension_length specifies the length of the PH extension data in bytes, not including the bits used for signalling ph_extension_length itself. The value of ph_extension_length shall be in the range of 0 to 256, inclusive. When not present, the value of ph_extension_length is inferred to be equal to 0.

ph_extension_data_byte may have any value. Decoders conforming to this version of this Specification shall ignore the value of ph_extension_data_byte. Its value does not affect decoder conformance to profiles specified in this version of specification.

3.6. SH Syntax and Semantics

In the latest VVC draft text, the SH syntax and semantics are as follows:

| slice_header( ) { | Descriptor |
|---|---|
| picture_header_in_slice_header_flag | u(1) |
| if( picture_header_in_slice_header_flag ) | |
| picture_header_structure( ) | |
| if( subpic_info_present_flag ) | |
| slice_subpic_id | u(v) |
| if( ( rect_slice_flag && NumSlicesInSubpic[ CurrSubpicIdx ] > 1 ) \|\| ( !rect_slice_flag && NumTilesInPic > 1 ) ) | |
| slice_address | u(v) |
| for( i = 0; i < NumExtraShBits; i++ ) | |
| sh_extra_bit[ i ] | u(1) |
| if( !rect_slice_flag && NumTilesInPic > 1 ) | |
| num_tiles_in_slice_minus1 | ue(v) |
| if( ph_inter_slice_allowed_flag ) | |
| slice_type | ue(v) |
| if( sps_alf_enabled_flag && !alf_info_in_ph_flag ) { | |
| slice_alf_enabled_flag | u(1) |
| if( slice_alf_enabled_flag ) { | |
| slice_num_alf_aps_ids_luma | u(3) |
| for( i = 0; i < slice_num_alf_aps_ids_luma; i++ ) | |
| slice_alf_aps_id_luma[ i ] | u(3) |
| if( ChromaArrayType != 0 ) | |
| slice_alf_chroma_idc | u(2) |
| if( slice_alf_chroma_idc ) | |
| slice_alf_aps_id_chroma | u(3) |
| if( sps_ccalf_enabled_flag ) { | |
| slice_cc_alf_cb_enabled_flag | u(1) |
| if( slice_cc_alf_cb_enabled_flag ) | |
| slice_cc_alf_cb_aps_id | u(3) |
| slice_cc_alf_cr_enabled_flag | u(1) |
| if( slice_cc_alf_cr_enabled_flag ) | |
| slice_cc_alf_cr_aps_id | u(3) |
| } | |
| } | |
| } | |
| if( separate_colour_plane_flag = = 1 ) | |
| colour_plane_id | u(2) |
| if( !rpl_info_in_ph_flag && ( ( nal_unit_type != IDR_W_RADL && nal_unit_type != IDR_N_LP ) \|\| sps_idr_rpl_present_flag ) ) | |
| ref_pic_lists( ) | |
| if( ( rpl_info_in_ph_flag \|\| ( ( nal_unit_type != IDR_W_RADL && nal_unit_type != IDR_N_LP ) \|\| sps_idr_rpl_present_flag ) ) && ( slice_type != I && num_ref_entries[ 0 ][ RplsIdx[ 0 ] ] > 1 ) \|\| ( slice_type = = B && num_ref_entries[ 1 ][ RplsIdx[ 1 ] ] > 1 ) ) { | |
| num_ref_idx_active_override_flag | u(1) |
| if( num_ref_idx_active_override_flag ) | |
| for( i = 0; i < ( slice_type = = B ? 2 : 1 ); i++ ) | |
| if( num_ref_entries[ i ][ RplsIdx[ i ] ] > 1 ) | |
| num_ref_idx_active_minus1[ i ] | ue(v) |
| } | |
| if( slice_type != I ) { | |

```
slice_header( ) {                              Descriptor
  if( cabac_init_present_flag )
    cabac_init_flag                            u(1)
  if( ph_temporal_mvp_
  enabled_flag && !rpl_
  info_in_ph_flag ) {
    if( slice_type = = B )
      slice_collocated_                        u(1)
      from_l0_flag
    if( ( slice_collocated_from_
    l0_flag &&
    NumRefIdxActive
    [ 0 ] > 1 ) | |
    ( ! slice_collocated_from_
      l0_flag &&
      NumRefIdxActive
    [ 1 ] > 1 ) )
      slice_collocated_ref_idx                 ue(v)
  }
  if( !wp_info_in_ph_flag &&
  ( ( pps_weighted_pred_flag
  && slice_type = = P ) | |
  ( pps_weighted_bipred_flag
  && slice_type = = B ) ) )
    pred_weight_table( )
  }
  if( !qp_delta_info_in_ph_flag )
    slice_qp_delta                             se(v)
  if( pps_slice_chroma_qp_
  offsets_present_flag ) {
    slice_cb_qp_offset                         se(v)
    slice_cr_qp_offset                         se(v)
    if( sps_joint_cbcr_enabled_flag )
      slice_joint_cbcr_qp_offset               se(v)
  }
  if( pps_cu_chroma_qp_
  offset_list_enabled_flag )
    cu_chroma_qp_                              u(1)
    offset_enabled_flag
  if( sps_sao_enabled_flag &&
  !sao_info_in_ph_flag ) {
    slice_sao_luma_flag                        u(1)
    if( ChromaArrayType != 0 )
      slice_sao_chroma_flag                    u(1)
  }
  if( deblocking_filter_override_
  enabled_flag &&
  !dbf_info_in_ph_flag )
    slice_deblocking_filter_                   u(1)
    override_flag
  if( slice_deblocking_filter_
  override_flag ) {
    slice_deblocking_filter_                   u(1)
    disabled_flag
    if( !slice_deblocking_
    filter_disabled_flag ) {
      slice_beta_offset_div2                   se(v)
      slice_tc_offset_div2                     se(v)
      slice_cb_beta_offset_div2                se(v)
      slice_cb_tc_offset_div2                  se(v)
      slice_cr_beta_offset_div2                se(v)
      slice_cr_tc_offset_div2                  se(v)
    }
  }
  slice_ts_residual_coding_                    u(1)
  disabled_flag
  if( ph_lmcs_enabled_flag )
    slice_lmcs_enabled_flag                    u(1)
  if( ph_scaling_list_enabled_flag )
    slice_scaling_list_present_flag            u(1)
  if( NumEntryPoints > 0 ) {
    offset_len_minus1                          ue(v)
    for( i = 0; i <
    NumEntryPoints; i++ )
      entry_point_offset_                      u(v)
      minus1[ i ]
  }
  if( slice_header_extension_
```

```
slice_header( ) {                              Descriptor
    present_flag ) {
      slice_header_                            ue(v)
      extension_length
      for( i = 0; i < slice_header_
      extension_length; i++)
        slice_header_extension_                u(8)
        data_byte[ i ]
    }
    byte_alignment( )
  }
```

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$ quantization parameters for the coding unit containing cu_chroma_qp_offset_flag, are all set equal to 0.

picture_header_in_slice_header_flag equal to 1 specifies that the PH syntax structure is present in the slice header. picture_header_in_slice_header_flag equal to 0 specifies that the PH syntax structure is not present in the slice header. It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

If rect_slice_flag is equal to 0, the following applies:
  The slice address is the raster scan tile index.
  The length of slice_address is Ceil(Log 2 (NumTilesInPic)) bits.
  The value of slice_address shall be in the range of 0 to NumTilesInPic−1, inclusive.

Otherwise (rect_slice_flag is equal to 1), the following applies:
  The slice address is the subpicture-level slice index of the slice.
  The length of slice_address is Ceil(Log 2(NumSlicesInSubpic[CurrSubpicIdx])) bits.
  The value of slice_address shall be in the range of 0 to NumSlicesInSubpic[CurrSubpicIdx]−1, inclusive.

It is a requirement of bitstream conformance that the following constraints apply:
  If rect_slice_flag is equal to 0 or subpic_info_present_flag is equal to 0, the value of slice_address shall not be equal to the value of slice_address of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

sh_extra_bit[i] may be equal to 1 or 0. Decoders conforming to this version of this Specification shall ignore the value of sh_extra_bit[i]. Its value does not affect decoder conformance to profiles specified in this version of specification. num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
  picLevelSliceIdx = slice_address
  for( j = 0; j < CurrSubpicIdx; j++ )
    picLevelSliceIdx += NumSlicesInSubpic[ j ]
  NumCtusInCurrSlice = NumCtusInSlice[ picLevelSliceIdx ]
  for( i = 0; i < NumCtusInCurrSlice; i++ )
    CtbAddrInCurrSlice[ i ] = CtbAddrInSlice[ picLevelSliceIdx ][ i ]
                                                                                (117)
} else {
  NumCtusInCurrSlice = 0
  for( tileIdx = slice_address; tileIdx <= slice_address +
  num_tiles_in_slice_minus1;
tileIdx++ ) {
    tileX = tileIdx % NumTileColumns
    tileY = tileIdx / NumTileColumns
    for( ctbY = tileRowBd[ tileY ]; ctbY < tileRowBdf tileY + 1 ];
    ctbY++ ) {
      for( ctbX = tileColBd[ tileX ]; ctbX < tileColBd[ tileX + 1 ];
      ctbX++ ) {
        CtbAddrInCurrSlice[ NumCtusInCurrSlice ] = ctbY *
        PicWidthInCtb + ctbX
        NumCtusInCurrSlice++
      }
    }
  }
}
```

The variables SubpicLeftBoundaryPos, SubpicTopBoundaryPos, SubpicRightBoundaryPos, and SubpicBotBoundaryPos are derived as follows:

```
if( subpic_treated_as_pic_flag[ CurrSubpicIdx ] ) {
  SubpicLeftBoundaryPos = subpic_ctu_top_left_x[ CurrSubpicIdx ] *
  CtbSizeY
  SubpicRightBoundaryPos = Min( pic_width_max_in_luma_samples
  − 1,
    ( subpic_ctu_top_left_x[ CurrSubpicIdx ] +
    subpic_width_minus1[ CurrSubpicIdx ] + 1 ) * CtbSizeY − 1 )
  SubpicTopBoundaryPos = subpic_ctu_top_left_y[ CurrSubpicIdx ]
  *CtbSizeY   (118)
  SubpicBotBoundaryPos = Min( pic_height_max_in_luma_samples −
  1,
    ( subpic_ctu_top_left_y[ CurrSubpicIdx ] +
    subpic_height_minus1[ CurrSubpicIdx ] + 1 ) * CtbSizeY − 1 )
}
``` slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the value of slice_type is inferred to be equal to 2.

When ph_intra_slice_allowed_flag is equal to 0, the value of slice_type shall be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.

The variables MinQt Log 2SizeY, MinQt Log 2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

If slice_type equal to 2 (I), the following applies:

$\text{Min}Qt \text{ Log } 2\text{Size}Y = \text{Min}Cb \text{ Log } 2\text{Size}Y + ph\_\log 2\_diff\_min\_qt\_min\_cb\_intra\_slice\_luma$ (119)

$\text{Min}Qt \text{ Log } 2\text{Size}C = \text{Min}Cb \text{ Log } 2\text{Size}Y + ph\_\log 2\_diff\_min\_qt\_min\_cb\_intra\_slice\_chroma$ (120)

$\text{Max}BtSizeY = 1 << (\text{Min}Qt \text{ Log } 2\text{Size}Y + ph\_\log 2\_diff\_max\_bt\_min\_qt\_intra\_slice\_luma)$ (121)

$\text{Max}BtSizeC = 1 << (\text{Min}Qt \text{ Log } 2\text{Size}C + ph\_\log 2\_diff\_max\_bt\_min\_qt\_intra\_slice\_chroma)$ (122)

$\text{Max}TtSizeY = 1 << (\text{Min}Qt \text{ Log } 2\text{Size}Y + ph\_\log 2\_diff\_max\_tt\_min\_qt\_intra\_slice\_luma)$ (123)

$\text{Max}TtSizeC = 1 << (\text{Min}Qt \text{ Log } 2\text{Size}C + ph\_\log 2\_diff\_max\_tt\_min\_qt\_intra\_slice\_chroma)$ (124)

$\text{Max}MttDepthY = ph\_max\_mtt\_hierarchy\_depth\_intra\_slice\_luma$ (125)

$\text{Max}MttDepthC = ph\_max\_mtt\_hierarchy\_depth\_intra\_slice\_chroma$ (126)

$CuQp\text{DeltaSubdiv} = ph\_cu\_qp\_delta\_subdiv\_intra\_slice$ (127)

$Cu\text{Chroma}Qp\text{OffsetSubdiv} = ph\_cu\_chroma\_qp\_offset\_subdiv\_intra\_slice$ (128)

Otherwise (slice_type equal to 0 (B) or 1 (P)), the following applies:

$\text{Min}Qt \text{ Log } 2\text{Size}Y = \text{Min}Cb \text{ Log } 2\text{Size}Y + ph\_\log 2\_diff\_min\_qt\_min\_cb\_inter\_slice$ (129)

$\text{Min}Qt \text{ Log } 2\text{Size}C = \text{Min}Cb \text{ Log } 2\text{Size}Y + ph\_\log 2\_diff\_min\_qt\_min\_cb\_inter\_slice$ (130)

$\text{Max}BtSizeY = 1 << (\text{Min}Qt \text{ Log } 2\text{Size}Y + ph\_\log 2\_diff\_max\_bt\_min\_qt\_inter\_slice)$ (131)

$\text{Max}BtSizeC = 1 < (\text{Min}Qt \text{ Log } 2\text{Size}C + ph\_\log 2\_diff\_max\_bt\_min\_qt\_inter\_slice)$ (132)

$\text{Max}TtSizeY = 1 << (\text{Min}Qt \text{ Log } 2\text{Size}Y + ph\_\log 2\_diff\_max\_tt\_min\_qt\_inter\_slice)$ (133)

$\text{Max}TtSizeC = 1 < (\text{Min}Qt \text{ Log } 2\text{Size}C + ph\_\log 2\_diff\_max\_tt\_min\_qt\_inter\_slice)$ (134)

$\text{Max}MttDepthY = ph\_max\_mtt\_hierarchy\_depth\_inter\_slice$ (135)

MaxMttDepthC=ph_max_mtt_hierarchy_depth_inter_slice (136)

CuQpDeltaSubdiv=ph_cu_qp_delta_subdiv_inter_slice (137)

CuChromaQpOffsetSubdiv=ph_cu_chroma_qp_offset_subdiv_inter_slice (138)

The following applies:

MinQtSizeY=1<MinQt Log 2SizeY (139)

MinQtSizeC=1<<MinQt Log 2SizeC (140)

MinBtSizeY=1<MinCb Log 2SizeY (141)

MinTtSizeY=1<MinCb Log 2SizeY (142)

slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to ph_alf_enabled_flag.

slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma.

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_ parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i]. The value of alf_luma_filter_signal_flag of the APS NAL unit having aps_params_type equal to ALF_APS and adaptation_parameter_set_id equal to slice_alf_aps_id_luma[i] shall be equal to 1.

slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to ph_alf_chroma_idc.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_ parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma.

The value of alf_chroma_filter_signal_flag of the APS NAL unit having aps_params_type equal to ALF_APS and adaptation_parameter_set_id equal to slice_alf_aps_id_chroma shall be equal to 1.

slice_cc_alf_cb_enabled_flag equal to 0 specifies that the cross-component filter is not applied to the Cb colour component. slice_cc_alf_cb_enabled_flag equal to 1 indicates that the cross-component filter is enabled and may be applied to the Cb colour component. When slice_cc_alf_cb_enabled_flag is not present, it is inferred to be equal to ph_cc_alf_cb_enabled_flag.

slice_cc_alf_cb_aps_id specifies the adaptation_parameter_set_id that the Cb colour component of the slice refers to. The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.

The value of alf_cc_cb_filter_signal_flag of the APS NAL unit having aps_params_type equal to ALF_APS and adaptation_parameter_set_id equal to slice_cc_alf_cb_aps_id shall be equal to 1.

slice_cc_alf_cr_enabled_flag equal to 0 specifies that the cross-component filter is not applied to the Cr colour component. slice_cc_alf_cb_enabled_flag equal to 1 indicates that the cross-component adaptive loop filter is enabled and may be applied to the Cr colour component. When slice_cc_alf_cr_enabled_flag is not present, it is inferred to be equal to ph_cc_alf_cr_enabled_flag.

slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.

The value of alf_cc_cr_filter_signal_flag of the APS NAL unit having aps_params_type equal to ALF_APS and adaptation_parameter_set_id equal to slice_cc_alf_cr_aps_id shall be equal to 1.

colour_plane_id identifies the colour plane associated with the current slice when separate_colour_plane_flag is equal to 1. The value of colour_plane_id shall be in the range of 0 to 2, inclusive. colour_plane_id values 0, 1 and 2 correspond to the Y, Cb and Cr planes, respectively. The value 3 of colour_plane_id is reserved for future use by ITU-T|ISO/IEC.

NOTE 1—There is no dependency between the decoding processes of different colour planes of one picture.

num_ref_idx_active_override_flag equal to 1 specifies that the syntax element num_ref_idx_active_minus1[0] is present for P and B slices and the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. When not present, the value of num_ref_idx_active_override_flag is inferred to be equal to 1.

num_ref_idx_active_minus1[i] is used for the derivation of the variable NumRefIdxActive[i] as specified by Equation 143. The value of num_ref_idx_active_minus1[i] shall be in the range of 0 to 14, inclusive.

For i equal to 0 or 1, when the current slice is a B slice, num_ref_idx_active_override_flag is equal to 1, and num_ref_idx_active_minus1[i] is not present, num_ref_idx_active_minus1[i] is inferred to be equal to 0.

When the current slice is a P slice, num_ref_idx_active_override_flag is equal to 1, and num_ref_idx_active_minus1[0] is not present, num_ref_idx_active_minus1[0] is inferred to be equal to 0.

The variable NumRefIdxActive[i] is derived as follows:

```
for( i = 0; i < 2; i++ ) {
   if( slice_type = = B | | ( slice_type = = P && i = = 0 ) ) {
      if( num_ref_idx_active_override_flag )
         NumRefIdxActive[ i ] = num_ref_idx_active_minus1[ i ] +     (143)
      else {
         if( num_ref_entries[ i ][ RplsIdx[ i ] ] >=
num_ref_idx_default_active_minus1[ i ] + 1 )
            NumRefIdxActive[ i ] =
               num_ref_idx_default_active_minus1[ i ] + 1
         else
            NumRefIdxActive[ i ] = num_ref_entries[ i ][ RplsIdx[ i ] ]
      }
   } else /* slice_type = = I | | ( slice_type = = P && i = = 1) */
      NumRefIdxActive[ i ] = 0
}
```

The value of NumRefIdxActive[i]−1 specifies the maximum reference index for reference picture list i that may be used to decode the slice. When the value of NumRefIdxActive[i] is equal to 0, no reference index for reference picture list i may be used to decode the slice.

When the current slice is a P slice, the value of NumRefIdxActive[0] shall be greater than 0.

When the current slice is a B slice, both NumRefIdxActive[0] and NumRefIdxActive[1] shall be greater than 0.

cabac_init_flag specifies the method for determining the initialization table used in the initialization process for context variables. When cabac_init_flag is not present, it is inferred to be equal to 0.

slice_collocated_from_l0_flag equal to 1 specifies that the collocated picture used for temporal motion vector prediction is derived from reference picture list 0. slice_collocated_from_l0_flag equal to 0 specifies that the collocated picture used for temporal motion vector prediction is derived from reference picture list 1.

When slice_type is equal to B or P, ph_temporal_mvp_enabled_flag is equal to 1, and slice_collocated_from_l0_flag is not present, the following applies:

If rpl_info_in_ph_flag is equal to 1, slice_collocated_from_l0_flag is inferred to be equal to ph_collocated_from_l0_flag.

Otherwise (rpl_info_in_ph_flag is equal to 0 and slice_type is equal to P), the value of slice_collocated_from_l0_flag is inferred to be equal to 1.

slice_collocated_ref_idx specifies the reference index of the collocated picture used for temporal motion vector prediction.

When slice_type is equal to P or when slice_type is equal to B and slice_collocated_from_l0_flag is equal to 1, slice_collocated_ref_idx refers to an entry in reference picture list 0, and the value of slice_collocated_ref_idx shall be in the range of 0 to NumRefIdxActive[0]−1, inclusive.

When slice_type is equal to B and slice_collocated_from_l0_flag is equal to 0, slice_collocated_ref_idx refers to an entry in reference picture list 1, and the value of slice_collocated_ref_idx shall be in the range of 0 to NumRefIdxActive[1]−1, inclusive.

When slice_collocated_ref_idx is not present, the following applies:

If rpl_info_in_ph_flag is equal to 1, the value of slice_collocated_ref_idx is inferred to be equal to ph_collocated_ref_idx.

Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture.

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag? 0:1][slice_collocated_ref_idx] shall be equal to 0.

slice_qp_delta specifies the initial value of $Qp_Y$ to be used for the coding blocks in the slice until modified by the value of CuQpDeltaVal in the coding unit layer.

When qp_delta_info_in_ph_flag is equal to 0, the initial value of the $Qp_Y$ quantization parameter for the slice, $SliceQp_Y$, is derived as follows:

$$SliceQp_Y = 26 + init\_qp\_minus26 + slice\_qp\_delta \quad (144)$$

The value of $SliceQp_Y$ shall be in the range of −QpBdOffset to +63, inclusive.

When either of the following conditions is true:

The value of wp_info_in_ph_flag is equal to 1, pps_weighted_pred_flag is equal to 1, and slice_type is equal to P.

The value of wp_info_in_ph_flag is equal to 1, pps_weighted_bipred_flag is equal to 1, and slice_type is equal to B.

the following applies:

The value of NumRefIdxActive[0] shall be less than or equal to the value of NumWeightsL0.

For each reference picture index RefPicList[0][i] for i in the range of 0 to NumRefIdxActive[0]−1, inclusive, the luma weight, Cb weight, and Cr weight that apply to the reference picture index are LumaWeightL0[i], ChromaWeightL0[0][i], and ChromaWeightL0[1][i], respectively.

When wp_info_in_ph_flag is equal to 1, pps_weighted_bipred_flag is equal to 1, and slice_type is equal to B, the following applies:

The value of NumRefIdxActive[1] shall be less than or equal to the value of NumWeightsL1.

For each reference picture index RefPicList[1][i] for i in the range of 0 to NumRefIdxActive[1]−1, inclusive, the luma weight, Cb weight, and Cr weight that apply to the reference picture index are LumaWeightL1[i], ChromaWeightL1[0][i], and ChromaWeightL1[1][i], respectively.

slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to 0. The value of pps_cb_qp_offset+slice_cb_qp_offset shall be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to 0. The value of pps_cr_qp_offset+slice_cr_qp_offset shall be in the range of −12 to +12, inclusive.

slice_joint_cbcr_qp_offset specifies a difference to be added to the value of pps_joint_cbcr_qp_offset_value when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset_value+slice_joint_cbcr_qp_offset shall be in the range of −12 to +12, inclusive.

cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.

slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to ph_sao_luma_enabled_flag.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to ph_sao_chroma_enabled_flag.

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to ph_deblocking_filter_override_flag.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag.

slice_beta_offset_div2 and slice_tc_offset_div2 specify the deblocking parameter offsets for β and tC (divided by 2) that are applied to the luma component for the current slice. The values of slice_beta_offset_div2 and slice_tc_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively.

slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 shall both be in the range of −12 to 12, inclusive. When not present, the values of slice_cb_beta_offset_div2 and slice_cb_tc_offset_div2 are inferred to be equal to ph_cb_beta_offset_div2 and ph_cb_tc_offset_div2, respectively.

slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 shall both be in the range of −12 to 12, inclusive. When not present, the values of slice_cr_beta_offset_div2 and slice_cr_tc_offset_div2 are inferred to be equal to ph_cr_beta_offset_div2 and ph_cr_tc_offset_div2, respectively.

slice_ts_residual_coding_disabled_flag equal to 1 specifies that the residual_coding( ) syntax structure is used to parse the residual samples of a transform skip block for the current slice. slice_ts_residual_coding_disabled_flag equal to 0 specifies that the residual_ts_coding( ) syntax structure is used to parse the residual samples of a transform skip block for the current slice. When slice_ts_residual_coding_disabled_flag is not present, it is inferred to be equal to 0.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

slice_scaling_list_present_flag equal to 1 specifies that the scaling list data used for the current slice is derived based on the scaling list data contained in the referenced scaling list APS with aps_params_type equal to SCALING_APS and adaptation_parameter_set_id equal to ph_scaling_list_aps_id. slice_scaling_list_present_flag equal to 0 specifies that the scaling list data used for the current picture is the default scaling list data derived specified in clause 7.4.3.21. When not present, the value of slice_scaling_list_present_flag is inferred to be equal to 0.

The variable NumEntryPoints, which specifies the number of entry points in the current slice, is derived as follows:

```
NumEntryPoints = 0
for( i = 1; i < NumCtusInCurrSlice; i++ ) {
    ctbAddrX = CtbAddrInCurrSlice[ i ] % PicWidthInCtbsY
    ctbAddrY = CtbAddrInCurrSlice[ i ] / PicWidthInCtbsY
(145)    prevCtbAddrX = CtbAddrInCurrSlice[ i − 1 ] % PicWidthInCtbsY
    prevCtbAddrY = CtbAddrInCurrSlice[ i − 1 ] / PicWidthInCtbsY
    if( CtbToTileRowBd[ ctbAddrY ] != CtbToTileRowBd[ prevCtbAddrY ] | |
        CtbToTileColBd[ ctbAddrX ] != CtbToTileColBd[ prevCtbAddrX ] | |
        ( ctbAddrY != prevCtbAddrY &&
    sps_wpp_entry_point_offsets_present_flag ) )
        NumEntryPoints++
}
``` offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_minus1 plus 1 bits. The slice data that follow the slice header consists of NumEntryPoints+1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[0], inclusive, of the coded slice data, subset k, with k in the range of 1 to NumEntryPoints−1, inclusive, consists of bytes firstByte[k] to lastByte[k], inclusive, of the coded slice data with firstByte[k] and lastByte[k] defined as:

$$firstByte[k] = n = \Sigma_{n=1}^{k}(entry\_point\_offset\_minus1[n-1]+1) \qquad (146)$$

$$lastByte[k] = firstByte[k] + entry\_point\_offset\_minus1[k] \qquad (147)$$

The last subset (with subset index equal to NumEntryPoints) consists of the remaining bytes of the coded slice data.

When sps_entropy_coding_sync_enabled_flag is equal to 0 and the slice contains one or more complete tiles, each subset shall consist of all coded bits of all CTUs in the slice that are within the same tile, and the number of subsets (i.e., the value of NumEntryPoints+1) shall be equal to the number of tiles in the slice.

When sps_entropy_coding_sync_enabled_flag is equal to 0 and the slice contains a subset of CTU rows from a single tile, the NumEntryPoints shall be 0, and the number of subsets shall be 1. The subset shall consist of all coded bits of all CTUs in the slice.

When sps_entropy_coding_sync_enabled_flag is equal to 1, each subset k with k in the range of 0 to NumEntryPoints, inclusive, shall consist of all coded bits of all CTUs in a CTU row within a tile, and the number of subsets (i.e., the value of NumEntryPoints+1) shall be equal to the total number of tile-specific CTU rows in the slice.

slice_header_extension_length specifies the length of the slice header extension data in bytes, not including the bits used for signalling slice_header_extension_length itself. The value of slice_header_extension_length shall be in the range of 0 to 256, inclusive. When not present, the value of slice_header_extension_length is inferred to be equal to 0.

slice_header_extension_data_byte[i] may have any value. Decoders conforming to this version of this Specification shall ignore the values of all the slice_header_extension_data_byte[i] syntax elements. Its value does not affect decoder conformance to profiles specified in this version of specification.

3.7. Transform Unit Syntax (Slice Data)

In the latest VVC draft text, the transform unit syntax and semantics are as follows:

```
transform_unit( x0, y0, tbWidth,
 tbHeight, treeType,
 subTuIndex, chType ) {                    Descriptor
  if( IntraSubPartitionsSplitType !=
    ISP_NO_SPLIT &&
      treeType = = SINGLE_TREE
      && subTuIndex = =
  NumIntraSubPartitions − 1 ) {
    xC = CbPosX[ chType ]
    [ x0 ][ y0 ]
    yC = CbPosY[ chType ]
    [ x0 ][ y0 ]
    wC = CbWidth[ chType ]
    [ x0 ][ y0 ] / SubWidthC
    hC = CbHeight[ chType ]
    [ x0 ][ y0 ] / SubHeightC
  } else {
    xC = x0
    yC = y0
    wC = tbWidth / SubWidthC
    hC = tbHeight / SubHeightC
  }
  chromaAvailable = treeType !=
  DUAL_TREE_LUMA &&
  ChromaArrayType != 0 &&
    ( IntraSubPartitionsSplitType = =
    ISP_NO_SPLIT | |
    ( IntraSubPartitionsSplitType !=
    ISP_NO_SPLIT &&
    subTuIndex = = NumIntra-
    SubPartitions − 1 ) )
    if( ( treeType = = SINGLE_
    TREE | | treeType = =
  DUAL_TREE_CHROMA ) &&
      ChromaArrayType != 0 && (
  IntraSubPartitionsSplitType = =
```

```
transform_unit( x0, y0, tbWidth,
 tbHeight, treeType,
 subTuIndex, chType ) {                    Descriptor
  ISP_NO_SPLIT &&
    ( ( subTuIndex = = 0 &&
    cu_sbt_pos_flag ) | |
    ( subTuIndex = = 1 &&
    !cu_sbt_pos_flag ) ) ) | |
    ( IntraSubPartitionsSplitType !=
    ISP_NO_SPLIT &&
    ( subTuIndex = = NumIntra-
    SubPartitions − 1 ) ) ) {
      tu_cbf_cb[ xC ][ yC ]            ae(v)
      tu_cbf_cr[ xC ][ yC ]            ae(v)
    }
    if( treeType = = SINGLE_TREE | |
    treeType = = DUAL_
    TREE_LUMA ) {
      if( ( IntraSubPartitions-
      SplitType = =
      ISP_NO_SPLIT &&
      !( cu_sbt_flag
  &&
        ( ( subTuIndex = = 0 &&
        cu_sbt_pos_flag ) | |
        ( subTuIndex = = 1 &&
        !cu_sbt_pos_flag ) ) &&
        ( CuPredMode[ chType ]
        [ x0 ][ y0 ] = =
      MODE_INTRA | |
        ( chromaAvailable &&
        ( tu_cbf_cb[ xC ][ yC ] | |
  tu_cbf_cr[ xC ][ yC ] ) ) | |
        CbWidth[ chType ][ x0 ]
        [ y0 ] > MaxTbSizeY | |
        CbHeight[ chType ][ x0 ]
        [ y0 ] > MaxTbSizeY ) ) | |
        ( IntraSubPartitionsSplitType !=
        ISP_NO_SPLIT &&
        ( subTuIndex < NumIntra-
        SubPartitions − 1 | |
        !InferTuCbfLuma ) ) )
      tu_cbf_luma[ x0 ][ y0 ]         ae(v)
      if(IntraSubPartitionsSplitType !=
      ISP_NO_SPLIT )
        InferTuCbfLuma =
        InferTuCbfLuma &&
        !tu_cbf_luma[ x0 ][ y0 ]
    }
    if( ( CbWidth[ chType ]
    [ x0 ][ y0 ] > 64 | |
  CbHeight[ chType ]
  [ x0 ][ y0 ] > 64 | |
      tu_cbf_luma[ x0 ][ y0 ] | |
      ( chromaAvailable &&
    ( tu_cbf_cb[ xC ][ yC ] | |
      tu_cbf_cr[ xC ][ yC ] ) )
      && treeType != DUAL_
      TREE_CHROMA &&
      cu_qp_delta_enabled_flag &&
      !IsCuQpDeltaCoded ) {
      cu_qp_delta_abs                 ae(v)
      if( cu_qp_delta_abs )
        cu_qp_delta_sign_flag         ae(v)
    }
    if( ( CbWidth[ chType ]
    [ x0 ][ y0 ] > 64 | |
  CbHeight[ chType ]
  [ x0 ][ y0 ] > 64 | |
      ( chromaAvailable &&
      ( tu_cbf_cb[ xC ][ yC ] | |
  tu_cbf_cr[ xC ][ yC ] ) ) ) &&
      treeType != DUAL_
      TREE_LUMA &&
  cu_chroma_qp_offset_
  enabled_flag &&
      !IsCuChromaQpOffsetCoded ) {
      cu_chroma_qp_offset_flag        ae(v)
```

```
transform_unit( x0, y0, tbWidth,
tbHeight, treeType,
subTuIndex, chType ) {                    Descriptor
  if( cu_chroma_qp_offset_flag &&
  chroma_qp_offset_list_
  len_minus1 > 0 )
    cu_chroma_qp_offset_idx               ae(v)
  }
  if( sps_joint_cbcr_enabled_flag
  && ( ( CuPredMode
  [ chType ][ x0 ][ y0 ] = =
  MODE_INTRA
      && ( tu_cbf_cb[ xC ][ yC ] | |
      tu_cbf_cr[ xC ][ yC ] ) ) | |
    ( tu_cbf_cb[ xC ][ yC ] &&
    tu_cbf_cr[ xC ][ yC ] ) ) &&
  chromaAvailable )
      tu_joint_cbcr_residual_              ae(v)
      flag[ xC ][ yC ]
    if( tu_cbf_luma[ x0 ][ y0 ] &&
    treeType != DUAL_TREE_
    CHROMA ) {
      if( sps_transform_skip_enabled_
      flag && !BdpcmFlag[ x0 ]
      [ y0 ][ 0 ] &&
        tbWidth <= MaxTsSize &&
        tbHeight <= MaxTsSize &&
        ( IntraSubPartitions-
        SplitType = =
        ISP_NO_SPLIT ) &&
        !cu_sbt_flag )
        transform_skip_flag                ae(v)
        [ x0 ][ y0 ][ 0 ]
      if( !transform_skip_flag
      [ x0 ][ y0 ][ 0 ] | |
      slice_ts_residual_coding_
      disabled_flag )
        residual_coding( x0, y0, Log2
        ( tbWidth ), Log2
        ( tbHeight ), 0 )
      else
        residual_ts_coding( x0, y0,
        Log2( tbWidth ), Log2
        ( tbHeight ), 0 )
    }
    if( tu_cbf_cb[ xC ][ yC ] &&
    treeType != DUAL_TREE_
    LUMA ) {
      if( sps_transform_skip_
      enabled_flag && !BdpcmFlag
      [ x0 ][ y0 ][ 1 ] &&
        wC <= MaxTsSize && hC <=
        MaxTsSize && !cu_sbt_flag )
        transform_skip_flag                ae(v)
        [ xC ][ yC ][ 1 ]
      if( !transform_skip_flag
      [ xC ][ yC ][ 1 ] | |
      slice_ts_residual_coding_
      disabled_flag )
        residual_coding( xC, yC, Log2
        ( wC ), Log2( hC ), 1 )
      else
        residual_ts_coding( xC, yC,
        Log2( wC ), Log2( hC ), 1 )
    }
    if( tu_cbf_cr[ xC ][ yC ] &&
    treeType != DUAL_TREE_
    LUMA &&
      !( tu_cbf_cb[ xC ][ yC ] &&
      tu_joint_cbcr_residual_
      flag[ xC ][ yC ] ) ) {
      if( sps_transform_skip_enabled_
      flag && !BdpcmFlag[ x0 ]
      [ y0 ][ 2 ] &&
        wC <= MaxTsSize && hC <=
        MaxTsSize && !cu_sbt_flag )
        transform_skip_flag                ae(v)
        [ xC ][ yC ][ 2 ]
```

```
transform_unit( x0, y0, tbWidth,
tbHeight, treeType,
subTuIndex, chType ) {                    Descriptor
      if( !transform_skip_flag
      [ xC ][ yC ][ 2 ] | |
      slice_ts_residual_coding_
      disabled_flag )
        residual_coding( xC, yC,
        Log2( wC ), Log2( hC ), 2 )
      else
        residual_ts_coding( xC, yC,
        Log2( wC ), Log2( hC ), 2 )
    }
  }
```

The transform coefficient levels are represented by the arrays TransCoeffLevel[x0][y0][cIdx][xC][yC]. The array indices x0, y0 specify the location (x0, y0) of the top-left luma sample of the considered transform block relative to the top-left luma sample of the picture. The array index cIdx specifies an indicator for the colour component; it is equal to 0 for Y, 1 for Cb, and 2 for Cr. The array indices xC and yC specify the transform coefficient location (xC, yC) within the current transform block. When the value of TransCoeffLevel [x0][y0][cIdx][xC][yC] is not specified in clause 7.3.10.11, it is inferred to be equal to 0.

tu_cbf_cb[x0][y0] equal to 1 specifies that the Cb transform block contains one or more transform coefficient levels not equal to 0. The array indices x0, y0 specify the top-left location (x0, y0) of the considered transform block.

When tu_cbf_cb[x0][y0] is not present, its value is inferred to be equal to 0.

tu_cbf_cr[x0][y0] equal to 1 specifies that the Cr transform block contains one or more transform coefficient levels not equal to 0. The array indices x0, y0 specify the top-left location (x0, y0) of the considered transform block.

When tu_cbf_cr[x0][y0] is not present, its value is inferred to be equal to 0.

tu_cbf_luma[x0][y0] equal to 1 specifies that the luma transform block contains one or more transform coefficient levels not equal to 0. The array indices x0, y0 specify the location (x0, y0) of the top-left luma sample of the considered transform block relative to the top-left luma sample of the picture.

When tu_cbf_luma[x0][y0] is not present, its value is inferred as follows:

If cu_sbt_flag is equal to 1 and one of the following conditions is true, tu_cbf_luma[x0][y0] is inferred to be equal to 0:

subTuIndex is equal to 0 and cu_sbt_pos_flag is equal to 1.

subTuIndex is equal to 1 and cu_sbt_pos_flag is equal to 0.

Otherwise, if treeType is equal to DUAL_TREE_CHROMA, tu_cbf_luma[x0][y0] is inferred to be equal to 0.

Otherwise, tu_cbf_luma[x0][y0] is inferred to be equal to 1.

tu_joint_cbcr_residual_flag[x0][y0] specifies whether the residual samples for both chroma components Cb and Cr are coded as a single transform block. The array indices x0, y0 specify the location (x0, y0) of the top-left luma sample of the considered transform block relative to the top-left luma sample of the picture.

tu_joint_cbcr_residual_flag[x0][y0] equal to 1 specifies that the transform unit syntax includes the transform coefficient levels for a single transform block from which the residual samples for both Cb and Cr are derived. tu_joint_cbcr_residual_flag[x0][y0] equal to 0 specifies that the transform coefficient levels of the chroma components are coded as indicated by the syntax elements tu_cbf_cb[x0][y0] and tu_cbf_cr[x0][y0].

When tu_joint_cbcr_residual_flag[x0][y0] is not present, it is inferred to be equal to 0.

Depending on tu_joint_cbcr_residual_flag[x0][y0], tu_cbf_cb[x0][y0], and tu_cbf_cr[x0][y0], the variable TuCResMode[x0][y0] is derived as follows:

If tu_joint_cbcr_residual_flag[x0][y0] is equal to 0, the variable TuCResMode[x0][y0] is set equal to 0.

Otherwise, if tu_cbf_cb[x0][y0] is equal to 1 and tu_cbf_cr[x0][y0] is equal to 0, the variable TuCResMode[x0][y0] is set equal to 1.

Otherwise, if tu_cbf_cb[x0][y0] is equal to 1, the variable TuCResMode[x0][y0] is set equal to 2.

Otherwise, the variable TuCResMode[x0][y0] is set equal to 3.

cu_qp_delta_abs specifies the absolute value of the difference CuQpDeltaVal between the quantization parameter of the current coding unit and its prediction.

cu_qp_delta_sign_flag specifies the sign of CuQpDeltaVal as follows:

If cu_qp_delta_sign_flag is equal to 0, the corresponding CuQpDeltaVal has a positive value.

Otherwise (cu_qp_delta_sign_flag is equal to 1), the corresponding CuQpDeltaVal has a negative value.

When cu_qp_delta_sign_flag is not present, it is inferred to be equal to 0.

When cu_qp_delta_abs is present, the variables IsCuQpDeltaCoded and CuQpDeltaVal are derived as follows:

$$Is CuQp\text{DeltaCoded}=1 \tag{187}$$

$$CuQp\text{DeltaVal}=cu\_qp\_delta\_abs*(1-2*cu\_qp\_delta\_sign\_flag) \tag{188}$$

The value of CuQpDeltaVal shall be in the range of $-(32+QpBdOffset/2)$ to $+(31+QpBdOffset/2)$, inclusive.

cu_chroma_qp_offset_flag when present and equal to 1, specifies that an entry in the cb_qp_offset_list[ ] is used to determine the value of $CuQpOffset_{Cb}$, a corresponding entry in the cr_qp_offset_list[ ] is used to determine the value of $CuQpOffset_{Cr}$, and a corresponding entry in the joint_cbcr_qp_offset_list[ ] is used to determine the value of $CuQpOffset_{CbCr}$. cu_chroma_qp_offset_flag equal to 0 specifies that these lists are not used to determine the values of $CuQpOffset_{Cb}$, $CuQpOffset_{Cr}$, and $CuQpOffset_{CbCr}$.

cu_chroma_qp_offset_idx, when present, specifies the index into the cb_qp_offset_list[ ], cr_qp_offset_list[ ], and joint_cbcr_qp_offset_list[ ] that is used to determine the value of $CuQpOffset_{Cb}$, $CuQpOffset_{Cr}$, and $CuQpOffset_{CbCr}$. When present, the value of cu_chroma_qp_offset_idx shall be in the range of 0 to chroma_qp_offset_list_len_minus1, inclusive. When not present, the value of cu_chroma_qp_offset_idx is inferred to be equal to 0.

When cu_chroma_qp_offset_flag is present, the following applies:

The variable IsCuChromaQpOffsetCoded is set equal to 1.

The variables $CuQpOffset_{Cb}$, $CuQpOffset_{Cr}$, and $CuQpOffset_{CbCr}$ are derived as follows:

If cu_chroma_qp_offset_flag is equal to 1, the following applies:

$$CuQp\text{Offset}_{Cb}=cb\_qp\_\text{offset\_list}[cu\_chroma\_qp\_\text{offset}\_idx] \tag{189}$$

$$CuQp\text{Offset}_{Cr}=cr\_qp\_\text{offset\_list}[cu\_chroma\_qp\_\text{offset}\_idx] \tag{190}$$

$$CuQp\text{Offset}_{CbCr}=\text{joint}\_cbcr\_qp\_\text{offset\_list}[cu\_chroma\_qp\_\text{offset}\_idx] \tag{191}$$

Otherwise (cu_chroma_qp_offset_flag is equal to 0), $CuQpOffset_{Cb}$, $CuQpOffset_{Cr}$, and $CuQpOffset_{CbCr}$ are all set equal to 0.

transform_skip_flag[x0][y0][cIdx] specifies whether a transform is applied to the associated transform block or not. The array indices x0, y0 specify the location (x0, y0) of the top-left luma sample of the considered transform block relative to the top-left luma sample of the picture. The array index cIdx specifies an indicator for the colour component; it is equal to 0 for Y, 1 for Cb, and 2 for Cr. transform_skip_flag[x0][y0][cIdx] equal to 1 specifies that no transform is applied to the associated transform block. transform_skip_flag[x0][y0][cIdx] equal to 0 specifies that the decision whether transform is applied to the associated transform block or not depends on other syntax elements.

When transform_skip_flag[x0][y0][cIdx] is not present, it is inferred as follows:

If BdpcmFlag[x0][y0][cIdx] is equal to 1, transform_skip_flag[x0][y0][cIdx] is inferred to be equal to 1.

Otherwise (BdpcmFlag[x0][y0][cIdx] is equal to 0), transform_skip_flag[x0][y0][cIdx] is inferred to be equal to 0.

4. Examples of Technical Problems by Disclosed Embodiments

The existing designs for SH, PPS, APS syntax elements (SEs) have the following problems:

1) In the latest VVC draft text, the APS syntax element scaling_list_chroma_present_flag is signaled to control the number of scaling/quantization matrices (QMs) signaled in an SCALING APS, i.e., 28 QMs are signaled for both luma and chroma when scaling_list_chroma_present_flag is equal to 1; otherwise (when scaling_list_chroma_present_flag is equal to 0), 10 QMs are signaled for luma only. Currently, the value of scaling_list_chroma_present_flag is constrained based on ChromaArrayType (derived from SPS syntax element), i.e., the value of scaling_list_chroma_present_flag is required to be equal to 1 when ChromaArrayType is not equal to 0, while the value of scaling_list_chroma_present_flag is required to be equal to 0 when ChromaArrayType is equal to 0. Such constraints in semantics introduce dependencies of APS on SPS, which should not occur, as an APS may be applied to pictures (or slices of pictures) that refer to different SPSs, which may be associated with different values of ChromaArrayType.
   a. Moreover, currently, once a block is coded with user-defined scaling lists, both luma and chroma (if available) should apply user-defined scaling lists, i.e., the user-defined scaling lists for luma and chroma can't be turned on/off separately. Such design may be not efficient/flexible.
2) In the latest VVC draft text, when the LMCS APS syntax structure is signaled, the APS syntax elements related to chroma residual scaling are always signaled, regardless whether ChromaArrayType is equal to 0 (e.g., no chroma component in the video content). This may cause unnecessary transmission of chroma-related syntax elements while there is no chroma treated in the video content.

3) In the latest VVC draft text, the SH syntax element slice_ts_residual_coding_disabled_flag is used to specify whether transform skip based residual coding (TSRC) or regular residual coding (RRC) is used for a transform skip block. However, right now slice_ts_residual_coding_disabled_flag is always signaled in SH, regardless the disabling of the SPS level transform skip. If sps_transform_skip_enabled_flag, transform_skip_flag is always equal to 0, and the condition (!transform_skip_flag[xC][yC][1]||slice_ts_residual_coding_disabled_flag) to switch TSRC and RRC would always be true, in such case, the slice_ts_residual_coding_disabled_flag becomes meaningless.
   a. Moreover, currently, a non-TS block can only use RRC and is unable to switch between TSRC and RRC, which may be not efficient for non-TS block compression.
4) In the latest VVC draft text, multi-level control is used to enable the cu_qp_delta for a luma block, i.e., firstly signal a PPS on/off control flag cu_qp_delta_enabled_flag, then specify the quantization group (QG) size in PH, finally signal the vale of cu_qp_delta_abs in each QG. By designing like this, for a picture consists of multiple slices, when some slices use cu qp delta but other slices never use it, the block level cu_qp_delta_abs is still required to be signaled for every QG. Therefore there is a block level bits waste, which can be avoided.
5) In the latest VVC draft text, when the PPS syntax element single_slice_per_subpic_flag is equal to 0, each subpicture of the pictures referring to the PPS may consist of one or more rectangular slices. When single_slice_per_subpic_flag is equal to 0, for pictures referring to such PPS, below cases might happen:
   a. Redundant case: when sps_num_subpics_minus1 is greater than 0 but there is only one slice in each subpicture. In such a case, each picture contains multiple subpictures and multiple rectangular slices but single_slice_per_subpic_flag is equal to 0, therefore, num_slices_in_pic_minus1 needs to be signalled. However, it is redundantly signalled because such case is conceptually identical with single_slice_per_subpic_flag equal to 1 and there is no need to signal this SE at all.
   b. Redundant case: when sps_num_subpics_minus1 is equal to 0 and there is only one slice in each picture referring to the PPS. In such case, each picture contains one subpicture consisting of only one slice, but single_slice_per_subpic_flag is still allowed to be equal to 0, thus num_slices_in_pic_minus1 needs to be signalled. However, it is redundantly signalled because such case is conceptually identical with single_slice_per_subpic_flag equal to 1 and there is no need to signal this SE at all.
   c. Furthermore, if all of the above redundant cases are prohibited/avoided, it would turn out that single_slice_per_subpic_flag equal to 0 is always used for the cases that pictures have multiple subpictures (either each subpicture contain single slice or multiple slices) or pictures have multiple slices (either each picture contain single subpicture or multiple subpictures). And for both cases, the value of num_slices_in_pic_minus1 is always greater than 1. It also turns out not necessary to conditionally signal the PPS syntax element tile_idx_delta_present_flag.
6) In the latest VVC draft text, the tile layout such as the width and height of tiles are designed in a way of explicit signaling associated with implicit inferring. If a picture is divided into multiple tile rows with tiles of the same height, then the current design allows to just signal the height of the first tile row, and the height of the remaining tile rows can be inferred. Otherwise, if a picture is divided into multiple tile rows with tiles of different heights, then it would explicitly signal the heights of each tile row. Otherwise, if a picture is divided into multiple tile rows with first few tile rows of different heights and last few tile rows of the same height, then it would explicitly signal the heights of first few tile rows and only one of the last few tile rows, and then the heights of the remaining tile rows of the same height would be inferred without signaling. The current design works well for those three cases by combining the explicit signaling and implicit inferring. But however, there would be another case that if a picture is divided into multiple tile rows with first few tile rows of the same height and last few tile rows of different heights. In such case, the current design seems not that efficient since implicit inference can't be applied to that case and it still needs to explicitly signal the heights for every tile row. Likewise, there are same situations for tile columns signaling, and rectangular slice layout signaling, i.e., the slice heights signaling in case of a slice is smaller than a tile. Modifications can be applied here for improvement.
7) Currently, the GCI syntax element no_aps_constraint_flag is used to disable NAL unit with nuh_unit_type equal to PREFIX_APS_NUT or SUFFIX_APS_NUT. More constraints are expected to be addressed in the draft text regarding if there is no ALF APS.
8) Currently, the conformance window parameters are always signalled in the PPS, including when the picture width and height are identical to the max picture width and height signalled in the SPS referenced by the PPS, while on the other hand the conformance window parameters for pictures with the max picture width and height are also signalled in the SPS. The signalling of conformance window parameters for pictures with the max picture width and height in the PPS is redundant.

5. Example Listing of Embodiments and Techniques

To solve the above problems and some other problems not mentioned, methods as summarized below are disclosed. The technical solutions should be considered as examples to explain the general concepts and should not be interpreted in a narrow way. Furthermore, these technical solutions can be applied individually or combined in any manner.

In below description, regarding the protentional text changes based on the latest working draft JVET-Q2001-vD, the deleted parts are highlighted in open and close double brackets (e.g., [[ ]]) with deleted text in between the double brackets, while the added parts are bold italics.

1. Regarding the value of APS syntax element scaling_list_chroma_present_flag relying on a SPS syntax element for solving the first problem, one or more of the following approaches are disclosed:
   1) In one example, VPS ID and/or SPS ID and/or PPS ID may be added to APS syntax structure, i.e., adaptation_ parameter_set_rbsp( ), e.g., the syntax structure of adaptation_parameter_set_rbsp( ) may be changed as follows:

```
adaptation_parameter_set_rbsp( ) {         Descriptor
  adaption_parameter_set_id                u(5)
  aps_seq_parameter_set_id                 u(4)
  aps_params_type                          u(3)
  if( aps_params_type == ALF_APS )
    alf_data( )
```

*aps_seq_parameter_set_id specifies the value of sps_seq_parameter_set_id for the APS. The value of aps_seq_parameter_set_id shall be in the range of 0 to 15, inclusive. The value of aps_seq_parameter_set_id shall be the same in all APSs that are referred to by coded pictures in a CLVS.* a. Additionally, alternatively, the signalling of chroma scaling lists may explicitly conditioned based on the value of ChromaArrayType, e.g., the syntax table of scaling_list_data( ) may be changed as follows:

```
scaling_list_data( ) {                          Descriptor
  scaling_matrix_for_lfnst_disabled_flag        u(1)
  [[scaling_list_chroma_present_flag]]          u(1)
  for( id = 0; id < 28; id ++ )
    matrixSize = (id < 2 ) ?
      2 : ( ( id < 8 ) ? 4 : 8 )
    if( [[scaling_list_chroma_
        present_flag]]
        ( ChromaArrayType != 0 ) | |
    ( id % 3 = = 2 ) | | ( id = = 27 ) ) {
      scaling_list_copy_mode_flag[ id ]         u(1)
    ...
```

And the semantics of scaling_list_chroma_present_flag is changed as follows:

2) In one example, the VPS and/or SPS and/or PPS associated with an APS may be implicitly derived.
    a. For example, if an APS is referred by a video unit (such as a picture header or a slice header), and the video unit depend on a VPS and/or a SPS and/or a PPS, then the APS is implicitly associated with the VPS and/or the SPS and/or the PPS.
  3) In one example, instead of using a user-defined scaling list (also referred to as explicit scaling list), the flat quantization (default scaling list) may be used for chroma blocks even when explicit scaling list is applied luma blocks.
    a. Alternatively, furthermore, even when the explicit scaling list for luma blocks are signaled in the bitstream, explicit scaling list for chroma blocks may be not signalled.
  4) Alternatively, the value of scaling_list_chroma_present_flag may be decoupled with the value of ChromaArrayType.
    a. Indications of whether to use explicit scaling list or default scaling list for different color components (e.g., luma and chroma blocks) may be separately signalled/controlled.
      i. In one example, syntax elements (e.g., one or more flags) may be added to SPS/PPS/PH/SH to specify whether to enable the user-defined scaling list (also referred to as explicit scaling list) for luma and/or chroma components.
      ii. For example, a flag may be added in SPS to make the luma transform coefficients to be able to switch between flat quantization (default scaling list) and user-defined scaling list.
      iii. For example, one ore more flags may be added in SPS to make the chroma-U and/or chroma-V transform coefficients to be able to switch between flat quantization (default scaling list) and user-defined scaling list.
  b. For example, scaling_list_chroma_present_flag may be equal to 1 when ChromaArrayType is equal to 0.
    i. In one example, for the coding pictures in 4:0:0 chroma format, N (such as N=28) sets of scaling matrices may be signalled in APS.
    ii. In one example, for the coding pictures in 4:4:4 chroma format with separate_colour_plane_flag equal to 1, M (such as M=28) sets of scaling matrices may be signalled in APS.
      a) For example, in case of separate_colour_plane_flag equal to 1 and M (such as M=28) sets of scaling matrices signalled in APS, each of the Y (Luma), U (Cb), and V (Cr) channel transform coefficients may be treated as luma-Y-channel and the scaling matrix identifier variable id for Y, U, and V transform coefficients are derived regarding the colour component as equal to the Y-component (e.g. a value of 0).
      b) Alternatively, in case of separate_colour_plane_flag equal to 1 and M (such as M=28) sets of scaling matrices signalled in APS, the scaling matrix identifier variable id for luma-Y transform coefficients is derived regarding the colour component as equal to the Y-component (e.g. a value of 0), while the scaling matrix identifier variable id for chroma-U is derived regarding the colour component as equal to the U-component (e.g. a value of 1), and the scaling matrix identifier variable id for chroma-V is derived regarding the colour component as equal to the V-component (e.g. a value of 2).
  c. For example, scaling_list_chroma_present_flag may be equal to 0 when ChromaArrayType is equal to 1.
    i. In one example, whether the chroma transform coefficients are allowed to use user-defined scaling lists or not may depend on the value of scaling_list_chroma_present_flag.
      a) For example, when scaling_list_chroma_present_flag is equal to 0, the user-defined scaling lists are not allowed to be used for chroma transform coefficients regardless the values of sps_scaling_list_enabled_flag, ph_scaling_list_enabled_flag, and slice_scaling_list_enabled_flag (e.g., the value of the added flag that used to specify the usage of user-defined scaling list for chroma is required to be equal to a certain number such as 0 or 1).
      b) For example, when scaling_list_chroma_present_flag is equal to 1, the user-defined scaling lists may be allowed to be used for chroma transform coefficients.
    ii. In one example, for the coding pictures in 4:2:0, and/or 4:2:2 chroma format, and/or 4:4:4 chroma format with separate_colour_plane_flag equal to 0, N (such as N=10) sets of scaling matrices may be signalled in APS.

a) For example, in case of ChromaArrayType greater than 0, and N (such as N=10) sets of scaling matrices signalled in APS, the scaling matrices for U and/or V transform coefficients may be derived from the signalled N sets of scaling matrices of Y transform coefficients.

b) Alternatively, in case of ChromaArrayType greater than 0, and N (such as N=10) sets of scaling matrices signalled in APS, the U and/or V transform coefficients may not use user-defined scaling lists (instead, the U and/or V transform coefficients may use flat quantization with default scaling factors).

d. For example, the semantics constraints regarding scaling_list_chroma_present_flag based on ChromaArrayType may not be associated with the syntax element scaling_list_chroma_present_flag, e.g., as follows:

scaling_list_chroma_present_flag equal to 1 specifies that chroma scaling lists are present in scaling_list_data( ). scaling_list_chroma_present_flag equal to 0 specifies that chroma scaling lists are not present in scaling_list_data( ).

e. For example, the semantics constraints regarding scaling_list_chroma_present_flag based on ChromaArrayType may be changed as follows:

scaling_list_chroma_present_flag equal to 1 specifies that chroma scaling lists are present in scaling_list_data( ). scaling_list_chroma_present_flag equal to 0 specifies that chroma scaling lists are not present in scaling_list_data( ). It is a requirement of bitstream conformance that scaling_list_chroma_present_flag shall be equal to 0 when ChromaArrayType is equal to 0, *and shall be equal to 1 when ChromaArrayType is not equal to 0* .

5) Alternatively, a constraint may be added associated with the PH and/or SH syntax elements, to constrain the value of scaling_list_chroma_present_flag to a certain value (such as 0 or 1) according to ChromaArrayType derived by PH/SH syntax elements, e.g., as follows:

In one example, the semantics of ph_scaling_list_aps_id are changes as follows:

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

*The value of scaling_list_ chroma_present_flag of the APS NAL unit having aps_params_type equal to SCALING_APS and adaptation_parameter_set_id equal to ph_scaling_list_aps_id shall be equal to Chroma ArrayType = = 0 ? 0 : 1.*

Alternatively, the semantics of ph_scaling_list_aps_id are changes as follows:

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

*When ChromaArrayType is equal to 1, the value of scaling_list_chroma_present_flag of the APS NAL unit having aps_params_type equal to SCALING_APS and adaptation_parameter_set_ id equal to ph_scaling_ list_aps_id shall be equal to 1.*

Alternatively, the semantics of ph_scaling_list_aps_id are changes as follows:

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

*When ChromaArrayType is equal to 0, the value of scaling_list_chroma_present_flag of the APS NAL unit having aps_params_type equal to SCALING_APS and adaptation_parameter_set_ id equal to ph_scaling_ list_aps_id shall be equal to 0.*

And the semantics of APS SE are changed as follows:

scaling_list_chroma_present_flag equal to 1 specifies that chroma scaling lists are present in scaling_list_data( ). scaling_list_chroma_present_flag equal to 0 specifies that chroma scaling lists are not present in scaling_list_data( ).

2. Regarding the unnecessary chroma-related APS syntax elements signalling in case of ChromaArrayType is equal to 0, and for solving the second problem, one or more of the following approaches are disclosed:

1) In one example, a syntax element (e.g., a flag) may be added to the APS syntax structure lmcs_data( ), in order to control the presence of chroma residual scaling related APS syntax elements (e.g., lmcs_delta_abs_crs, lmcs_delta_sign_crs_flag, et al.)

a. For example, when ChromaArrayType is equal to 0, the chroma residual scaling related APS syntax elements (e.g., lmcs_delta_abs_crs, lmcs_delta_sign_crs_flag, et al.) are required to be not allowed to be signaled, e.g., the added flag is required to be equal to certain value such as 0 or 1.

b. For example, when ChromaArrayType is not equal to 0, the chroma residual scaling related APS syntax elements (e.g., lmcs_delta_abs_crs, lmcs_delta_sign_crs_flag, et al.) are required to be signaled, e.g., the added flag is required to be equal to certain value such as 0 or 1.

c. For example, whether the current slice is allowed to use chroma residual scaling or not may be dependent on the added flag, e.g., if the added flag indicating that the chroma residual scaling related APS syntax elements are not signalled, then the chroma residual scaling would be never used regardless the values of sps_lmcs_enabled_flag, ph_lmcs_enabled_flag, ph_chroma_residual_scale_flag, and sh_lmcs_enabled_flag.

2) A bitstream constraint may be added under the semantics of PH/SH/APS syntax elements to constrain the value of lmcs_delta_abs_crs regarding the value of ChromaArrayType, e.g., as follows:

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

When ChromaArrayType is equal to 0, the value of lmcs_ delta_abs_crs of the APS NAL unit having aps_params_ type equal to LMCS_APS and

Alternatively, the semantics of ph_lmcs_aps_id is changed as follows:

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

When ChromaArrayType is equal to 1, the value of lmcs_delta_abs_crs of the APS NAL unit having aps_params_ type equal to LMCS_APS and adaptation_parameter_set_id equal to ph_lmcs_ aps_id shall be greater than 0.

Alternatively, the semantics of ph_lmcs_aps_id is changed as follows:

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

If ChromaArrayType is equal to 0, the value of lmcs_ delta_abs_crs of the APS NAL unit having aps_params_type equal to LMCS_APS and adaptation_parameter_set_id equal to ph_lmcs_aps_id shall be equal to 0. Otherwise, the value of lmcs_delta_abs_crs of the APS NAL unit having aps _params_type equal to LMCS_APS and adaptation parameter_set_id equal to ph_lmcs_aps_id shall be greater than 0.

3. In above example, the term 'ChromaArrayType' may be replaced by 'checking the color format being equal to 4:0:0'.
4. Regarding the usage of RRC and TSRC for solving the third problem, one or more of the following approaches are disclosed:
   1) The signalling of the TSRC enabling/disabling flag (e.g., slice_ts_residual_coding_disabled_flag) may be conditioned on whether transform skip is enabled (e.g., sps_transform_skip_enabled_flag in SPS).
      a. In one example, the following may be applied:

| if( !sps_transform_skip_enabled_flag ) | |
| --- | --- |
| slice_ts_residual_coding_disabled_flag | u(1) | b. Alternatively, furthermore, when slice_ts_residual_coding_disabled_flag is not present, it is inferred to be equal to 1.
   2) Alternatively, the value of the TSRC enabling flag (e.g., slice_ts_residual_coding_disabled_flag) may be constrained by sps_transform_skip_enabled_flag in SPS, e.g., the semantics of slice_ts_residual_coding_disabled_flag may be changed as follows:

slice_ts_residual_coding_disabled_flag equal to 1 specifies that the residual_coding( ) syntax structure is used to parse the residual samples of a transform skip block for the current slice. slice_ts_residual_coding_disabled_flag equal to 0 specifies that the residual_ts_coding( ) syntax structure is used to parse the residual samples of a transform skip block for the current slice. When sps_transform_skip_enabled_flag is equal to 0, the value of slice_ts_residual_coding_disabled_flag shall be equal to *1*.

3) Alternatively, if the signalling of the TSRC enabling flag (e.g., slice_ts_residual_coding_disabled_flag) is not conditioned on any other syntax elements, it may always present, e.g., the semantics of slice_ts_residual_coding_disabled_flag may be changed as follows:

slice_ts_residual_coding_disabled_flag equal to 1 specifies that the residual_coding( ) syntax structure is used to parse the residual samples of a transform skip block for the current slice. slice_ts_residual_coding_disabled_flag equal to 0 specifies that the residual_ts_coding( ) syntax structure is used to parse the residual samples of a transform skip block for the current slice.

4) Additionally, furthermore, TSRC may be applied to non-transform-skip (non-TS) coded block.
      a. In one example, one or more syntax flag may be added to specify whether to enable TSRC or RRC for a non-TS block.
         i. In one example, one or more block level (CTU/CU/TU) syntax flag may be added to specify whether the current video unit is using TSRC or RRC.
         ii. Additionally, alternatively, one or more high level (SPS/PPS/PH/SH) syntax flag may be added to specify whether the TSRC is allowed for the video unit.
      b. In one example, whether to use TSRC for non-TS coded blocks or whether to allow TSRC for non-TS coded blocks may depend on the coded information, such as the QP value for the block.
         i. In one example, for a non-TS block with QP equal to or no grater than X (such as X=4), it may be allowed to use either TSRC or RRC for residual coding.
5. Regarding the on/off control of the cu qp delta for a luma block for solving the fourth problem, one or more of the following approaches are disclosed:
   a. An SH level syntax element (e.g., a flag represented by slice_cu_qp_delta_enabled_flag) may be added to control the enabling and/or disabling of the cu qp delta for a specific slice.
      i. In one example, the presence of the proposed slice_cu_qp_delta_enabled_flag is conditioned on the cu_qp_delta_enabled_flag in PPS, e.g., only if cu_qp_delta_enabled_flag in PPS is equal to 1, the proposed slice_cu_qp_delta_enabled_flag is signaled, otherwise (cu_qp_delta_enabled_flag in PPS is equal to 0), the proposed slice_cu_qp_delta_enabled_flag is not signaled and inferred to be equal to 0.
         a) Alternatively, the value of the proposed slice_cu_qp_delta_enabled_flag is constrained on the value of cu_qp_delta_enabled_flag in PPS, i.e., when cu_qp_delta_enabled_flag in PPS is equal to 0, the value of the proposed slice_cu_qp_delta_enabled_flag shall be equal to 0.

ii. In one example, the cu_qp_delta_enabled_flag in PPS may be used to control the presence of SH-level cu qp delta enabled flag in SHs, and/or the presence of cu_qp_delta_abs and/or cu_qp_delta_sign_flag in the transform unit syntax and the palette coding syntax.

iii. In one example, the syntax structures may be changed as follows:

The PPS syntax structure is changed as follows:

```
pic_parameter_set_rbsp( ) {                    Descriptor
  pps_pic_parameter_set_id                     ue(v)
  ...
  init_qp_minus26                              se(v)
  pps_cu_qp_delta_enabled_flag                 u(1)
  pps_chroma_tool_offsets_present_flag         u(1)
```

*pps* _cu_qp_delta_enabled_flag equal to 1 specifies that the phcu_qp_delta_subdiv_intra_slice and ph_cu_qp_delta_subdiv_inter_slice syntax elements are present in PHs referring to the PPS and cu_qp_delta_abs may be present in the transform unit syntax *and the palette coding syntax.* *pps* _cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS and cu_qp_delta_abs is not present in the transform unit *syntax and the palette coding syntax.*
And the PH syntax structure is changed as follows:

```
picture_header_structure( ) {                  Descriptor
  gdr_or_irap_pic_flag                         u(1)
  ...
  if( ph_intra_slice_allowed_flag ) {
  ...
    if( pps_cu_qp_delta_enabled_flag )
      ph_cu_qp_delta_subdiv_intra_slice        ue(v)
  ...
  if( ph_inter_slice_allowed_flag ) {
  ...
    if( pps_cu_qp_delta_enabled_flag )
      ph_cu_qp_delta_subdiv_inter_slice        ue(v)
  ...
```

And the SH syntax structure is changed as follows:

```
slice_header( ) {                              Descriptor
  picture_header_in_slice_header_flag          u(1)
  ...
  if( pps_cu_qp_delta_enabled_flag )
    cu_qp_delta_enabled_flag                   u(1)
    if( pps_cu_chroma_qp_
  offset_list_enabled_flag )
      cu_chroma_qp_offset_enabled_flag         u(1)
```

*cu_qp_delta_enabled_flag equal to 1 specifies that the cu _qp_delta_abs may be present in the transform unit and palette coding syntax. cu_qp_delta_ enabled_flag equal to 0 specifies that the cu_qp_delta_abs is not present in the transform unit or palette coding syntax. When not present, the value of cu_qp_ delta_enabled_flag is inferred to be equal to 0.* b. Additionally, the presence of cu_qp_delta_abs in the syntax structure palette_coding ( ) and/or the syntax structure transform_unit( ) is conditioned on the proposed slice_cu_qp_delta_enabled_flag, e.g., only if the value of the proposed slice_cu_qp_delta_enabled_flag is equal to 1, cu_qp_delta_abs is signaled; otherwise (the proposed slice_cu_qp_delta_enabled_flag is equal to 0), the value of cu_qp_delta_abs is not signaled and inferred to be equal to 0.

Alternatively, the chroma cu qp offset may be not controlled by slice level on/off flag, e.g., whether the chroma cu qp offset is applied to the current slice or not may be dependent on a PH/PPS/SPS level flag.

c. Alternatively, a PH level syntax element (e.g., a flag represented by ph_cu_qp_delta_enabled_flag) may be added to control the enabling and/or disabling of the cu qp delta for a specific slice.

6. Regarding the design of PPS SEs single_slice_per_subpic_flag, num_slices_in_pic_minus1, tile_idx_delta_present_flag and for solving the fifth problem, one or more of the following approaches are disclosed:

a. In one example, a constraint may be added to the semantics of PH/SH/PPS syntax elements, e.g., as follows:

ph_pic_parameter_set_id specifies the value of pps_pic_parameter_set_id for the PPS in use. The value of ph_pic_parameter_set_id shall be in the range of 0 to 63, inclusive.

It is a requirement of bitstream conformance that the value of TemporalId of the PH shall be greater than or equal to the value of TemporalId of the PPS that has pps_pic_parameter_set_id equal to ph_pic_parameter_set_id. *When sps_num_subpics_ minus1 is equal to 0, rect_ slice_flag is equal to 1, a picture contains only one slice and another picture contains more than one slice, the two pictures shall refer to different PPSs.* b. In one example, the semantics of single_slice_per_subpic_flag may be changes as follows:

single_slice_per_subpic_flag equal to 1 specifies that each subpicture consists of one and only one rectangular slice. single_slice_per_subpic_flag equal to 0 specifies that, if *if sps_num_subpics_minus1 is greater than 0 (and in this c case each picture contains more than one slice), not each of all subpictures contain only one but ectangular slice, and otherwise (sps_num_subpics_ minus1 is equal to 0, and in this case each picture contains only one subpicture) each picture contains more than one slice.* When not present, the value of single_slice_per_subpic_flag is inferred to be equal to 0.

c. In one example, a constraint may be added to the semantics of single_slice_per_subpic_flag, e.g., as follows:

single_slice_per_subpic_flag equal to 1 specifies that each subpicture consists of one and only one rectangular slice. single_slice_per_subpic_flag equal to 0 specifies that each subpicture may consist of one or more rectangular slices. When not present, the value of single_slice_per_subpic_flag is inferred to be equal to 0.

*When sps_num_subpics_minus1 is equal to 0 and there is only one slice in each picture referring to the PPS, the value of single_slice_per_subpic_flag shall be equal to 1.* d. Additionally, alternatively, a constraint may be added to the semantics of single_slice_per_subpic_flag, e.g., as follows:

single_slice_per_subpic_flag equal to 1 specifies that each subpicture consists of one and only one rectangular slice. single_slice_per_subpic_flag equal to 0 specifies that each subpicture may consist of one or more rectangular slices. When not present, the value of single_slice_per_subpic_flag is inferred to be equal to 0.

*When sps_num_subpics_minus1 is greater than 0 and there is only one slice in each subpicture, the value of single_slice_per_subpic_flag shall be equal to 1.* e. In one example, it is constrained that, single_slice_per_subpic_flag shall be equal to 1 when each subpicture consists of one and only one rectangular slice.

f. Additionally, alternatively, the presence of PPS syntax element tile_idx_delta_present_flag may be not conditioned based on num_slices_in_pic_minus1, e.g., as follows:

```
[[ if( num_slices_in_pic_minus1 > 0 )]]
tile_idx_delta_present_flag                       u(1)
``` g. In one example, it is constrained that num_slices_in_pic_minus1 shall be equal to sps_num_subpics_minus1 when single_slice_per_subpic_flag is equal to 1.

h. Additionally, alternatively, the PPS syntax element num_slices_in_pic_minus1 may be changed to be num_slices_in_pic_minus2.

i. Additionally, condition the presence of tile_idx_delta_present_flag based on num_slices_in_pic_minus2, e.g., as follows:

```
num_slices_in_pic_minus[[1]]2                     ue(v)
[[ if( num_slices_in_pic_minus1 > 0 )]]
tile_idx_delta_present_flag                       u(1)
``` num_slices_in_pic_minus2 plus 2 specifies the number of rectangular slices in each picture referring to the PPS. The value of num_slices_in_pic_minus2 shall be in the range of 0 to MaxSlicesPerPicture−2, inclusive, where MaxSlicesPerPicture is specified in Annex A. *The value of the variable NumSliceInPic is derived to be equal to num_slices_in_pic_minus2 + 2.* When no_pic_partition_flag is equal to 1, the value of the *the* When single_slice_per_subpic_flag is equal to 1, *NumSlicesInPic is derived* to be equal to sps_num_subpics_minus1−*1*.

And in addition, "num_slices_in_pic_minus1" in all other places in the VVC draft text is replaced with "NumSlicesInPic−1".

7. Regarding the signalling for slice and tile layout for solving the sixth problem, one or more of the following approaches are disclosed:

a. Syntax elements (e.g., one or more flag) may be added in PPS to specify whether a picture is divided into multiple tile rows/columns with first few tile rows/columns of the same height and last few tile rows/columns of different heights/widths.

i. For example, the proposed syntax flag is dependent on no_pic_partition_flag and/or the number of explicit tile rows/columns (such as num_exp_tile_columns_minus1 and/or num_exp_tile_rows_minus1), e.g., as follows:

```
no_pic_partition_flag                             u(1)
if( !no_pic_partition_flag ) {
  pps_log2_ctu_size_minus5                        u(2)
  num_exp_tile_columns_minus1                     ue(v)
  num_exp_tile_rows_minus1                        ue(v)
  if( num_exp_tile_columns_minus1 > 1 )
    exp_tile_columns_in_reverse_order             u(1)
  if( num_exp_tile_rows_minus1 > 1 )
    exp_tile_rows_in_reverse_order                u(1)
  for( i = 0; i <= num_exp_tile_
     columns_minus1; i++ )
    tile_column_width_minus1[ i ]                 ue(v)
  for( i = 0; i <= num_exp_
    tile_rows_minus1; i++ )
    tile_row_height_minus1[ i ]                   ue(v)
```

*exp_tile_columns_in_reverse_order equal to 1 specifies that a picture is divided into more than two tile columns with first few tile columns of the same width and last few tile columns of different widths. exp_tile_columns_in_reverse_order equal to 0 doesn't impose such tile layout. exp_tile_rows_in_reverse_order equal to 1 specifies that a picture is divided into more than two tile rows with first few tile rows of the same height and last few tile rows of different heights. exp_tile_rows_in_reverse_order equal to 0 doesn't impose such tile layout.* ii. Additionally, when the proposed syntax flag is equal to 1, the tile column widths and/or tile row heights are derived according to the value of the proposed syntax flag, e.g., as follows:

The variable NumTileColumns, specifying the number of tile columns, and the list colWidth[i] for i ranging from 0 to NumTileColumns−1, inclusive, specifying the width of the i-th tile column in units of CTBs, are derived as follows:

```
remainingWidthInCtbsY = PicWidthInCtbsY
for( i = 0; i < num_exp_tile_columns_minus1; i++ ) {
  ccolWidth[ i ] = tile_column_width_minus1[ i ] + 1
  remainingWidthInCtbsY −= ccolWidth[ i ]
}
uniformTileColWidth =
  tile_column_width_minus1[ num_exp_tile_columns_minus1 ] +
  1  (23)
while( remainingWidthInCtbsY >= uniformTileColWidth ) {
  ccolWidth[ i++ ] = uniformTileColWidth
  remainingWidthInCtbsY −= uniformTileColWidth
}
if( remainingWidthInCtbsY > 0 )
  ccolWidth[ i++ ] = remainingWidthInCtbsY
NumTileColumns = i
if( exp_tile_colums_in_reverse_order )
  for( k = 0; k < NumTileColumns; k++) {
    colWidth[ k ] = ccolWidth[ NumTileColumns − 1 − k]
```

The variable NumTileRows, specifying the number of tile rows, and the list RowHeight[j] for j ranging from 0 to NumTileRows−1, inclusive, specifying the height of the j-th tile row in units of CTBs, are derived as follows:

```
remainingHeightInCtbsY = PicHeightInCtbsY
for( j = 0; j < num_exp_tile_rows_minus1; j++ ) {
   cRowHeight[ j ] = tile_row_height_minus1[ j ] + 1
   remainingHeightInCtbsY −= cRowHeight[ j ]
}
uniformTileRowHeight =
tile_row_height_minus1[ num_exp_tile_rows_minus1 ] + 1    (24)
while( remainingHeightInCtbsY >= uniformTileRowHeight ) {
   cRowHeight[ j++ ] = uniformTileRowHeight
   remainingHeightInCtbsY −= uniformTileRowHeight
}
if( remainingHeightInCtbsY > 0 )
   cRowHeight[ j++ ] = remainingHeightInCtbsY
NumTileRows = j
if( exp_tile_rows_in_reverse_order )
   for( k = 0; k < NumTileRows; k++ ) {
      RowHeight[ k ] = cRowHeight[ NumTileRows -1 - k]
``` b. Additionally, likewise, in case of a tile is divided by multiple slices (in this case the slice size is smaller than a tile size), syntax elements (e.g., one or more flag) may be added in PPS to specify whether a tile is divided into multiple slice rows with first few slice rows of the same height and last few slice rows of different heights.
   i. Additionally, when the proposed syntax flag is equal to 1, the slice heights (such as SliceHeightInCtusMinus1) are derived according to the value of the proposed syntax flag.

8. Regarding the case of no ALF APS for solving the seventh problem, one or more of the following approaches are disclosed:
   a. In one example, when there is no ALF APS (e.g., no_aps_constraint_flag is equal to 1, or the APS with required APS ID is not available), then ALF may be disallowed (in this case sps_alf_enabled_flag and sps_ccalf_enabled_flag are required to the equal to 0).
   b. In one example, when there is no ALF APS (e.g., no_aps_constraint_flag is equal to 1, or the APS with required APS ID is not available), then ALF may be still allowed (in this case sps_alf_enabled_flag is allowed to the equal to 0 or 1).
      i. For example, when there is no ALF APS (e.g., no_aps_constraint_flag is equal to 1), ph_alf_enabled_flag, and/or slice_alf_enabled_flag is allowed to be equal to 0 or 1.
      ii. For example, when there is no ALF APS (e.g., no_aps_constraint_flag is equal to 1), chroma ALF and cross component ALF (CC-ALF) are disallowed, but luma ALF with fixed filter may be used.
      iii. For example, when there is no ALF APS (e.g., no_aps_constraint_flag is equal to 1), the values of ph_num_alf_aps_ids_luma, ph_alf_chroma_idc, slice_num_alf_aps_ids_luma, slice_alf_chroma_idc, sps_ccalf_enabled_flag are required to be equal to 0.
   c. In one example, when the GCI syntax element no_alf_constraint_flag is equal to 1, then ALF and/or CCALF may be disallowed (in this case sps_alf_enabled_flag and/or sps_ccalf_enabled_flag is required to the equal to 0).
   d. Alternatively, furthermore, whether to signal number of ALF APSs (e.g., ph_num_alf_aps_ids_luma) and/or ALF/CC-ALF APS indices (e.g., ph_alf_aps_id_luma, ph_alf_aps_id_chroma, ph_cc_alf_cb_aps_id, ph_c_alf_cr_aps_id) to be used may depend on whether ALF APS is allowed (e.g., no_aps_constraint_flag).
      i. In one example, that information may be not signalled when no ALF APS is applied.
   e. In one example, new syntax elements may be signaled in SPS/PPS/PH/SH/GCI to disable ALF, and/or CCALF, and/or LMCS, and/or user-defined scaling lists.

9. Regarding signalling of conformance window parameters for solving the eighth problem:
   a. In one example, the signalling of the conformance window parameters (i.e., pps_conformance_window_flag, pps_conf_win_left_offset, pps_conf_win_right_offset, pps_conf_win_top_offset, and pps_conf_win_bottom_offset) in the PPS may be skipped when pic_width_in_luma_samples is equal to pic_width_max_in_luma_samples and pic_height_in_luma_samples is equal to pic_height_max_in_luma_samples.
      i. In one example, a flag may be added to the PPS syntax, and when the value of this flag equal to X (0 or 1) specifies that pic_width_in_luma_samples is equal to pic_width_max_in_luma_samples and pic_height_in_luma_samples is equal to pic_height_max_in_luma_samples, and the flag equal to 1−X specifies that pic_width_in_luma_samples is less than pic_width_max_in_luma_samples or pic_height_in_luma_samples is less than pic_height_max_in_luma_samples. However, note that even in the case when pic_width_in_luma_samples is equal to pic_width_max_in_luma_samples and pic_height_in_luma_samples is equal to pic_height_max_in_luma_samples, pic_width_in_luma_samples and pic_height_in_luma_samples still need to be signalled in the PPS to avoid parsing dependency of PPS on SPS.
      Additionally, when the above flag is equal to X, the signalling of the conformance window parameters in the PPS (i.e., pps_conformance_window_flag, pps_conf_win_left_offset, pps_conf_win_right_offset, pps_conf_win_top_offset, and pps_conf_win_bottom_offset) is skipped, and furthermore, the values of the parameters are inferred to be equal to the values of the parameters in the SPS (i.e., sps_conformance_window_flag, sps_conf_win_left_offset, sps_conf_win_right_offset, sps_conf_win_top_offset, and sps_conf_win_bottom_offset), FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
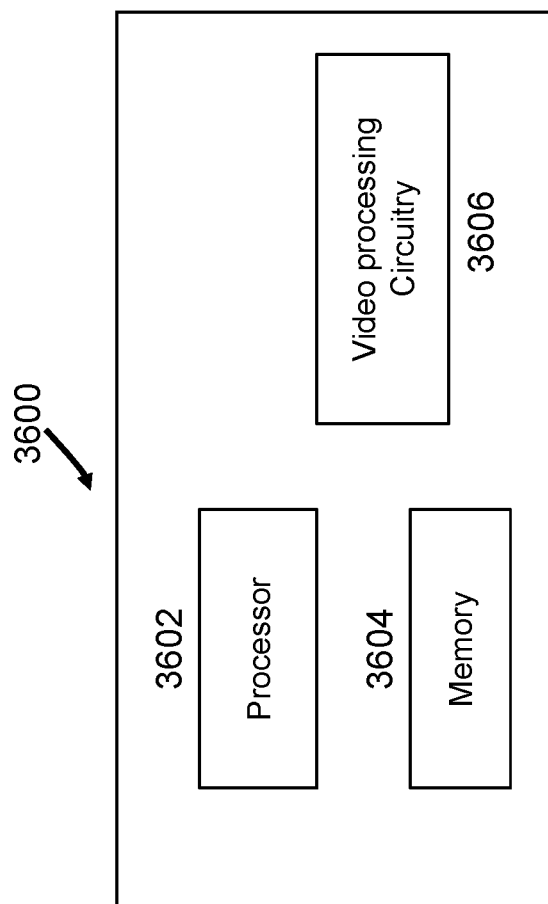
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
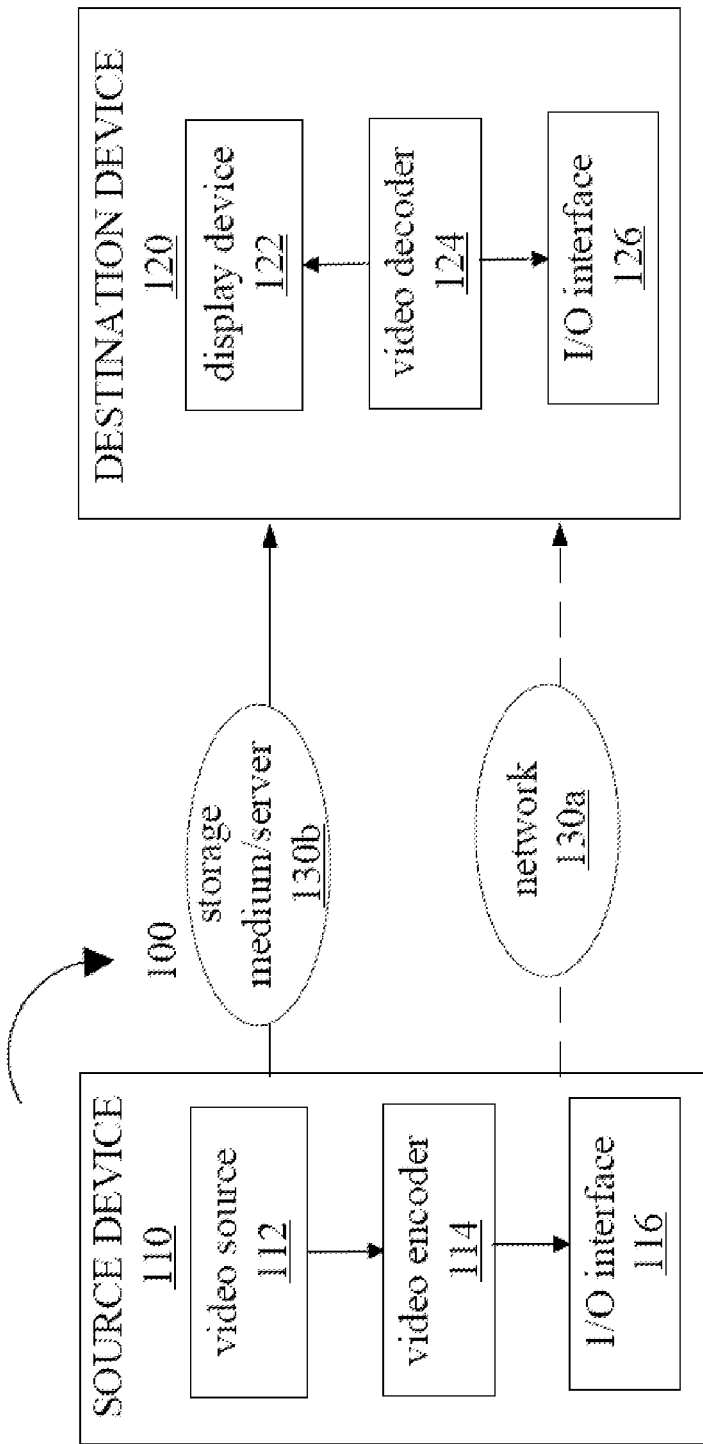
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
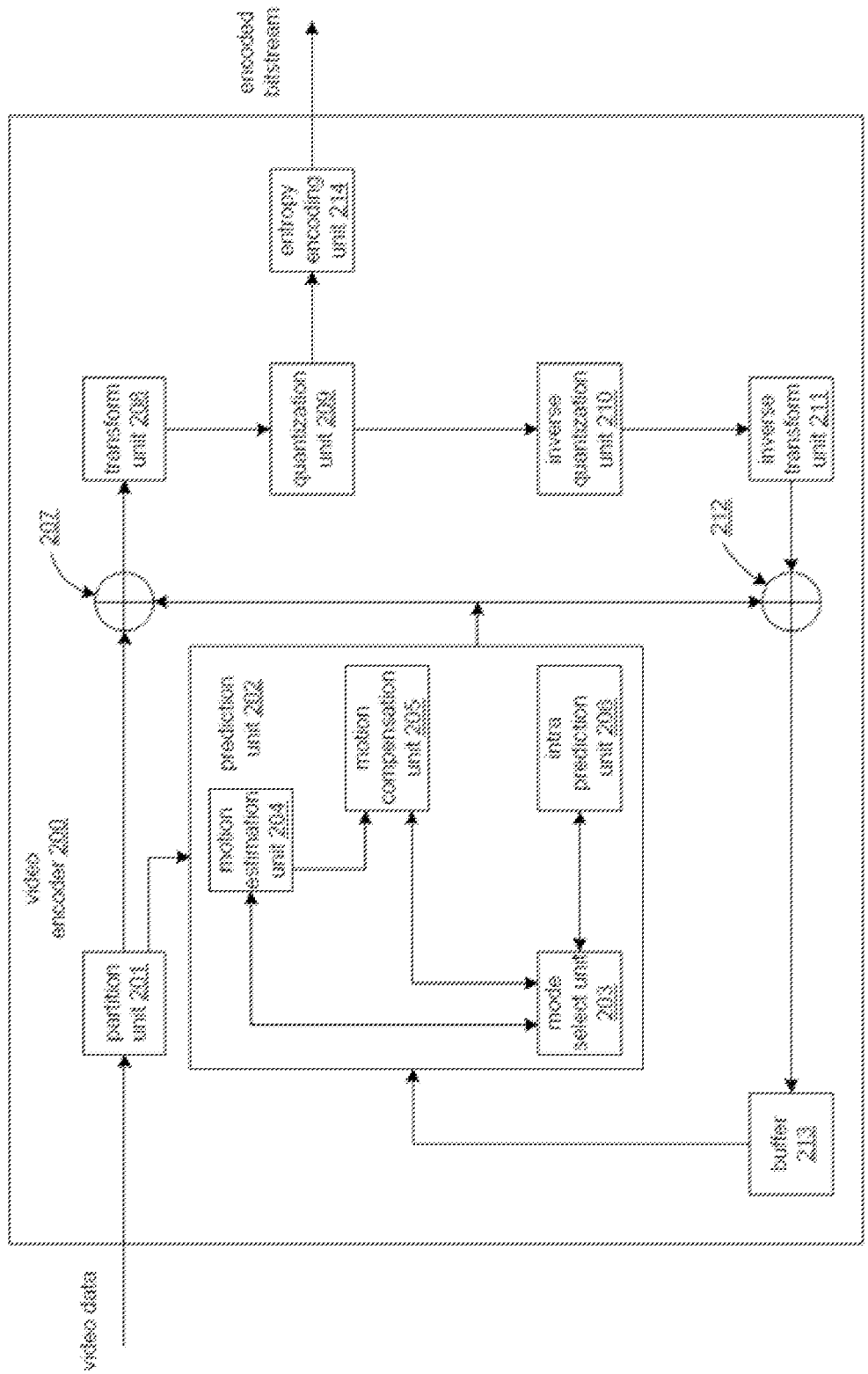
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block.

The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream (or the bitstream representation) of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream of the video to the block of video will be performed using the video processing tool or mode that was enabled based on the decision or determination.

Figure 6:
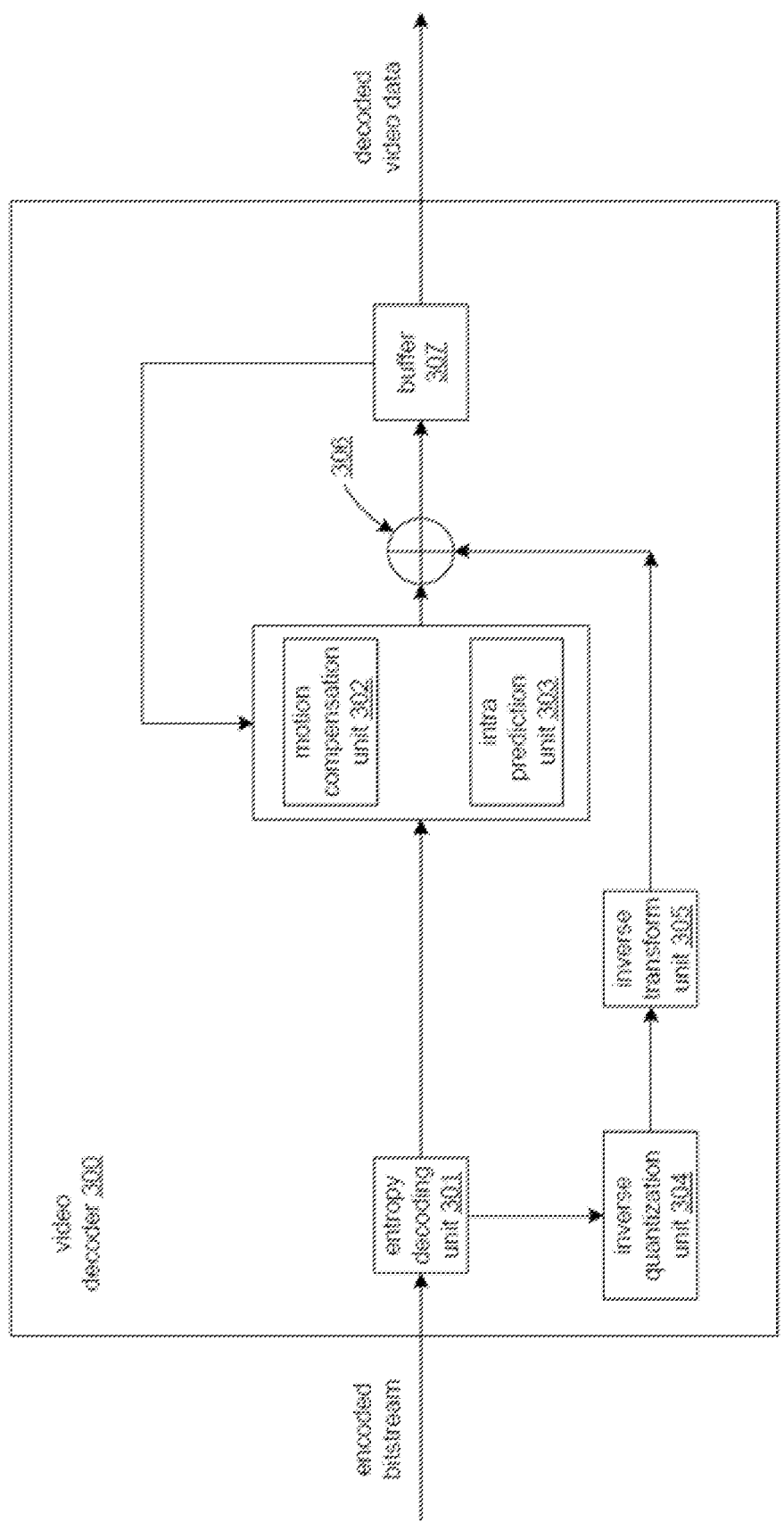
FIG. 6 is a block diagram that illustrates a decoder in accordance with some embodiments of the present disclosure.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., item 1).

Figure 3:
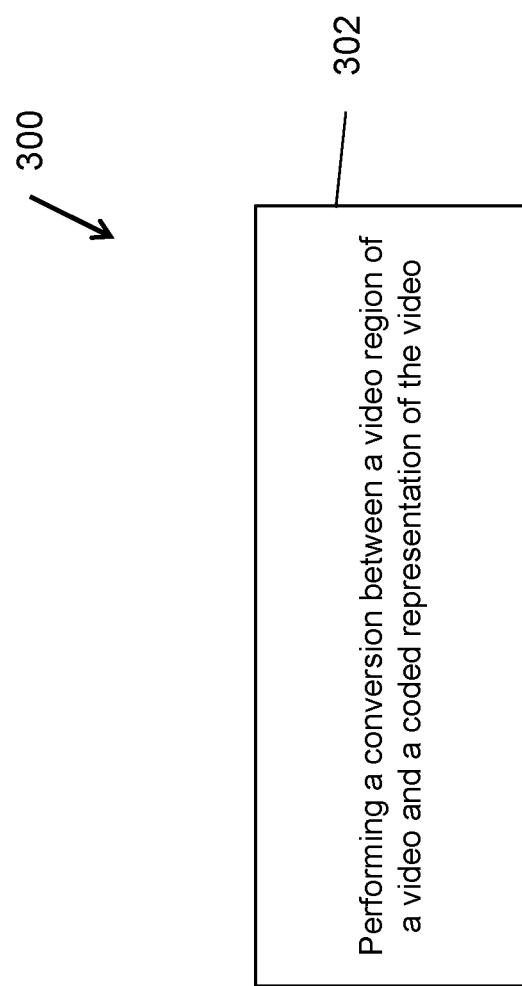
FIG. 3 is a flowchart for an example method of video processing.

1. A video processing method (e.g., method 300 depicted in FIG. 3), comprising performing (302) a conversion between a video region of a video and a coded representation of the video; wherein the coded representation conforms to a format rule; wherein the format rule specifies that a flag indicating whether a scaling list for a color component in the video is included in an adaptation parameter set independently of syntax field values in a sequence parameter set.

2. The method of solution 1, wherein the format rule specifies that a field is included in the adaptation parameter set for identifying a sequence parameter set.

3. The method of solution 1, wherein the format rule specifies an implicit relationship between the adaptation parameter set and a video parameter set of a sequence parameter set or a picture parameter set that controls inclusion of the scaling list in the coded representation.

4. The method of any of solutions 1-3, wherein the format rule specifies a format for inclusion of a user-defined or explicit scaling list used during the conversion.

5. The method of any of solutions 1-4, wherein the format rule specifies that inclusion of the flag in the coded representation is independent of inclusion of a syntax element indicative of an array type of a chroma component.

6. The method of solution 5, wherein the flag indicates that the scaling list is included and the syntax element indicative of the array type of the chroma components is set to zero.

7. The method of solution 5, wherein the flag indicates that the scaling list is not included and the syntax element indicative of the array type of the chroma components is set to one.

8. The method of solution 1, wherein the format rule specifies that the flag is constrained by a constrain rule to depend from a picture header or a slice header.

The following solutions show example embodiments of techniques discussed in the previous section (e.g., item 2).

9. A method of video processing, comprising: performing a conversion between a video region of a video and a coded representation of the video region; wherein the coded representation conforms to a format rule; wherein the format rule specifies that one or more adaptation parameter sets are included in the coded representation such that, for each adaptation parameter set, chroma related syntax elements are omitted due to a chroma constraint on the video.

10. The method of solution 9, wherein, for each adaptation parameter set, a syntax element signals whether chroma related syntax elements are included in the adaptation parameter set.

11. The method of solution 9, wherein the format rule specifies that chroma related fields in picture headers or slice headers or adaptation parameter sets are conditionally included if an only if the chroma constraint indicates presence of chroma in the coded representation of the video.

The following solutions show example embodiments of techniques discussed in the previous section (e.g., item 3).

12. The method of any of claims 9-11, wherein the chroma constraint is that a chroma array type is equal to zero.

13. The method of any of solutions 9-11, wherein the chroma constraint is that a format of the video is equal to 4:0:0.

The following solutions show example embodiments of techniques discussed in the previous section (e.g., item 4).

14. A method of video processing, comprising: performing a conversion between a video comprising one or more video regions comprising one or more video units and a coded representation of the video; wherein the coded representation conforms to a format rule; wherein the format rule specifies that whether a first transform coding syntax field is included in the coded representation at a level of a video unit of a video region and/or a value thereof depends on a value of a second transform coding syntax field at a level of the video region.

15. The method of solution 14, wherein the first transform coding syntax field is slice_ts_residual_coding_disabled_flag and wherein the second transform coding syntax field is sps_transform_skip_enabled_flag.

The following solutions show example embodiments of techniques discussed in the previous section (e.g., item 5).

16. A video processing method, comprising: performing a conversion between a video comprising one or mode video regions, each video region comprising one or more video units and a coded representation of the video; wherein the coded representation conforms to a format rule; wherein the format rule specifies that a flag at a video unit level controls whether a differential signaling of quantisation parameter is enabled for the conversion.

17. The method of solution 16, wherein the flag at the video unit level controls whether a second flag at a coding unit or a transform unit level is included for signaling use of differential quantization parameter signaling.

The following solutions show example embodiments of techniques discussed in the previous section (e.g., item 6).

18. A video processing method, comprising: performing a conversion between a video comprising one or mode video regions, each video region comprising one or more video units and a coded representation of the video; wherein the coded representation conforms to a format rule; wherein the format rule specifies interpretation of a first flag at picture level indicative of number of subpictures and a second flag at subpicture level indicative of a number of slices in a subpicture.

19. The method of solution 18, wherein the format rule specifies that, in case that the first flag is set to 1, and the second flag is set to 1, then at least one subpicture in the picture comprises more than one slices.

20. The method of solution 18, wherein the format rule specifies that the second flag must be set to 1 due to the first flag being zero and there is a single slice in each picture.

The following solutions show example embodiments of techniques discussed in the previous section (e.g., item 7).

21. A method of video processing, comprising: performing a conversion between a video comprising one or more video pictures, each video picture comprising one or more slices and/or one or more tiles and a coded representation of the video; wherein the coded representation conforms to a format rule; wherein the format rule specifies that a field in a picture parameter set associated with a video picture indicates whether video picture is divided into multiple tile rows or columns of different heights or widths.

22. The method of solution 21, wherein a second field in the coded representation indicates whether a tile of the video picture is divided into multiple slice rows having different heights.

23. The method of solution 22, wherein the second field indicates slice heights of the multiple slice rows.

The following solutions show example embodiments of techniques discussed in the previous section (e.g., item 8).

24. A method of video processing, comprising: performing a conversion between a video comprising one or more video pictures, each video picture comprising one or more slices and/or one or more tiles and a coded representation of the video; wherein the coded representation conforms to a format rule; wherein the format rule specifies that applicability of adaptive loop filtering to a video region in case that an adaptation parameter set excludes indication of adaptive loop filtering is based on a second rule.

25. The method of solution 24, wherein the second rule specifies that adaptive loop filtering is disabled for the video region.

26. The method of solution 24, wherein the second rule specifies that adaptive loop filtering is conditionally allowed based on value of a flag at a sequence parameter set level.

The following solutions show example embodiments of techniques discussed in the previous section (e.g., item 9).

27. A method of video processing, comprising: performing a conversion between a video comprising one or more video pictures, each video picture comprising one or more slices and/or one or more tiles and a coded representation of the video; wherein the coded representation conforms to a format rule; wherein the format rule specifies that explicit signaling of conformance window parameters in a picture parameter set is skipped for pictures that have a width and a height a maximum width and a maximum height of the video.

28. The method of solution 27, wherein the format rule further specifies to include a flag indicative of whether the width and the height are equal to the maximum width and the maximum height in case that the explicit signaling is skipped.

29. The method of any of solutions 1-28, wherein the video region comprises a video picture.

30. The method of any of solutions 1-29, wherein the video unit comprises a video slice or a video coding unit.

31. The method of any of solutions 1 to 30, wherein the conversion comprises encoding the video into the coded representation.

32. The method of any of solutions 1 to 30, wherein the conversion comprises decoding the coded representation to generate pixel values of the video.

33. A video decoding apparatus comprising a processor configured to implement a method recited in one or more of solutions 1 to 32.

34. A video encoding apparatus comprising a processor configured to implement a method recited in one or more of solutions 1 to 32.

35. A computer program product having computer code stored thereon, the code, when executed by a processor, causes the processor to implement a method recited in any of solutions 1 to 32.

36. A method, apparatus or system described in the present document.

Figure 7:
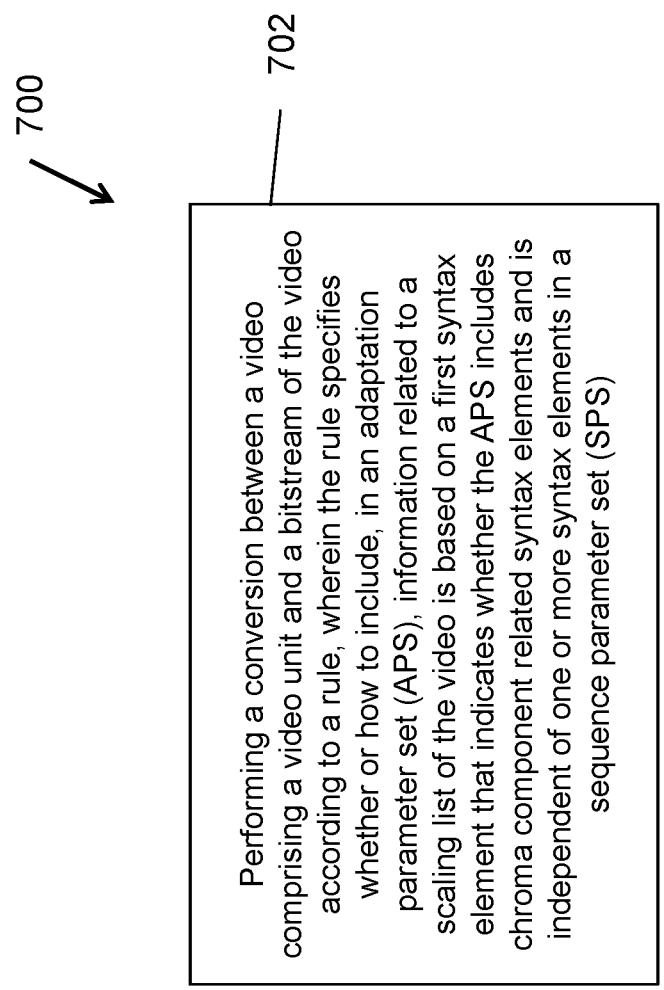
FIGS. 7 to 19 are flowcharts for example methods of video processing.

FIG. 7 is a flowchart for example method 700 of video processing. Operation 702 includes performing a conversion between a video comprising a video unit and a bitstream of the video according to a rule, wherein the rule specifies whether or how to include, in an adaptation parameter set (APS), information related to a scaling list of the video is based on a first syntax element that indicates whether the APS includes chroma component related syntax elements and is independent of one or more syntax elements in a sequence parameter set (SPS).

In some embodiments of method 700, the information related to the scaling list includes whether the scaling list for a color component is included in the APS. In some embodiments of method 700, the rule specifies that one or more fields are included in the APS for identifying any one or more of a video parameter set (VPS), the SPS, and a picture parameter set (PPS). In some embodiments of method 700, the rule specifies that the APS includes a field that indicates the SPS associated with the APS, wherein a value of the field is in a range from 0 to 15, inclusive, and wherein the value of the field is same in all APSs that are referred to by one or more video pictures in a coded layer video sequence (CLVS). In some embodiments of method 700, the rule specifies that whether a second syntax element is included in the APS is based on a value of the first syntax element indicating whether the APS includes the chroma component related syntax elements, and wherein the second syntax element specifies whether values of the scaling list are same as values of a reference scaling list. In some embodiments of method 700, the rule specifies that an implicit relationship between the APS and any one or more of a video parameter set (VPS), the SPS, and a picture parameter set (PPS) is derived.

In some embodiments of method 700, the rule specifies that the APS is implicitly associated with any one or more of the VPS, the SPS, and the PPS when the APS is referred by a header of the video unit and when the video unit depends on any one or more of the VPS, the SPS, and the PPS. In some embodiments of method 700, the header of the video unit includes a picture header or a slice header. In some embodiments of method 700, the rule specifies that a flat quantization included the scaling list is applied to chroma video blocks of the video independently of whether a user-defined scaling list is applied to luma video blocks of the video. In some embodiments of method 700, the rule specifies that the bitstream excluding an explicit scaling list for chroma video blocks of the video is not dependent on the bitstream including the explicit scaling list for luma video blocks of the video. In some embodiments of method 700, the rule specifies that the one or more syntax elements in the SPS includes a flag to indicate whether an explicit scaling list is used for certain video units. In some embodiments of method 700, the certain video units include video blocks coded with a low-frequency non-separable transform.

In some embodiments of method 700, the rule specifies that whether the first syntax element is included in the APS is independent of a value of a flag that indicates whether the scaling list is present in the APS. In some embodiments of method 700, the rule specifies that whether to use an explicit scaling list or a default scaling list for different color components of the video is separately indicated or controlled in the APS. In some embodiments of method 700, the rule specifies that at least one syntax element is added to the SPS or a picture parameter set (PPS) or a picture header (PH) or a slice header (SH) to specify whether to enable an explicit scaling list for luma components of the video and/or chroma components of the video. In some embodiments of method 700, the rule specifies that the one or more syntax elements in the SPS includes a flag to indicate whether either flat quantization or an explicit scaling list is used for luma transform coefficients of the video. In some embodiments of method 700, the rule specifies that the one or more syntax element added in the SPS indicate whether either flat quantization and an explicit scaling list is used for chroma-U and/or chroma-V transform coefficients. In some embodiments of method 700, the rule specifies that the first syntax element is equal to 0 when the value of the flag that indicates whether the scaling list is present in the APS is equal to 1. In some embodiments of method 700, the rule further specifies that when video pictures of the video are in a 4:0:0 chroma format, N sets of scaling matrices are indicated in the APS.

In some embodiments of method 700, the rule further specifies that M sets of scaling matrices are indicated in the APS when video pictures of the video are in a 4:4:4 chroma format and when a separate color plane flag indicates that three color components of a 4:4:4 chroma format are coded separately. In some embodiments of method 700, the rule specifies that when the separate color plane flag indicates that three color components of the 4:4:4 chroma format are coded separately and the M sets of scaling matrices are indicated in the APS: (1) each of luma, chroma-U, and chroma-V transform coefficients are treated as luma-Y-channel, and (2) the luma, the chroma-U, and the chroma-V transform coefficients have a same scaling matrix identifier. In some embodiments of method 700, the rule specifies that when the separate color plane flag indicates that three color components of the 4:4:4 chroma format are coded separately and the M sets of scaling matrices are indicated in the APS: (1) a first scaling matrix identifier for luma transform coefficients is derived for a luma component, (2) a second scaling matrix identifier for chroma-U transform coefficients is derived for a chromaU component, and (3) a third scaling matrix identifier for chroma-V transform coefficients is derived for a chromaV component. In some embodiments of method 700, the rule specifies that the first syntax element is equal to 1 when the value of the flag that indicates whether the scaling list is present in the APS is equal to 0. In some embodiments of method 700, the rule further specifies that whether chroma transform coefficients are allowed to use explicit scaling lists is based on the value of the flag.

In some embodiments of method 700, the rule specifies that when the value of the flag is equal to 0, explicit scaling lists are not allowed to be used for chroma transform coefficients regardless of values of syntax elements that indicate whether scaling lists are enabled for the SPS, a picture header (PH), and a slice header (SH). In some embodiments of method 700, the rule specifies that when the value of the flag is equal to 1, explicit scaling lists are allowed to be used for chroma transform coefficients. In some embodiments of method 700, the rule further specifies that N sets of scaling matrices are indicated in the APS when video pictures of the video have a 4:2:0 chroma format, a 4:2:2 chroma format, and/or a 4:4:4 chroma format and when a value of a separate color plane flag is 0.

In some embodiments of method 700, the rule further specifies that when the first syntax element is greater than to 0, and when the N sets of the scaling matrices are indicated in the APS, scaling matrices for chroma-U and/or chroma-V transform coefficients are derived from the N sets of the scaling matrices indicated in the APS for luma transform coefficients. In some embodiments of method 700, the rule further specifies that when the first syntax element is greater than to 0, and when the N sets of the scaling matrices are indicated in the APS, chroma-U and/or chroma-V transform coefficients are not allowed to use an explicit scaling list, and the chroma-U and/or chroma-V transform coefficients are allowed to use flat quantization with default scaling factors. In some embodiments of method 700, the rule specifies that a first value of the first syntax element is not dependent on the value of the flag that indicates whether the scaling list is present in the APS. In some embodiments of method 700, the rule specifies that a first value of the first syntax element is not required to be 0 when the value of the flag that indicates whether the scaling list is present in the APS is equal to 1.

In some embodiments of method 700, the rule specifies that a value of a flag that indicates whether the scaling list is present in the APS is based on a first value of the first syntax element, and wherein the rule further specifies that the first value of the first syntax element is derived from one or more values derived by one or more syntax elements in a picture header (PH) and/or a slice header (SH In some embodiments of method 700, the value of the flag that indicates whether the scaling list is present in the APS is 0 when the first value of the first syntax element is 0, and wherein the value of the flag that indicates whether the scaling list is present in the APS is 1 when the value of the first syntax element is 1. In some embodiments of method 700, the value of the flag that indicates whether the scaling list is present in the APS is not required to be 0 when the first value of the first syntax element is 0. In some embodiments of method 700, the value of the flag that indicates whether the scaling list is present in the APS is not required to be 1 when the first value of the first syntax element is 0. In some embodiments of method 700, the color component is a chroma component. In some embodiments of method 700, the first syntax element indicates a chroma sampling relative to a luma sampling and is referred to as an array type of a chroma component. In some embodiments of method 700, wherein the first syntax element equal to 0 specifies that a color format of the video is 4:0:0.

Figure 8:
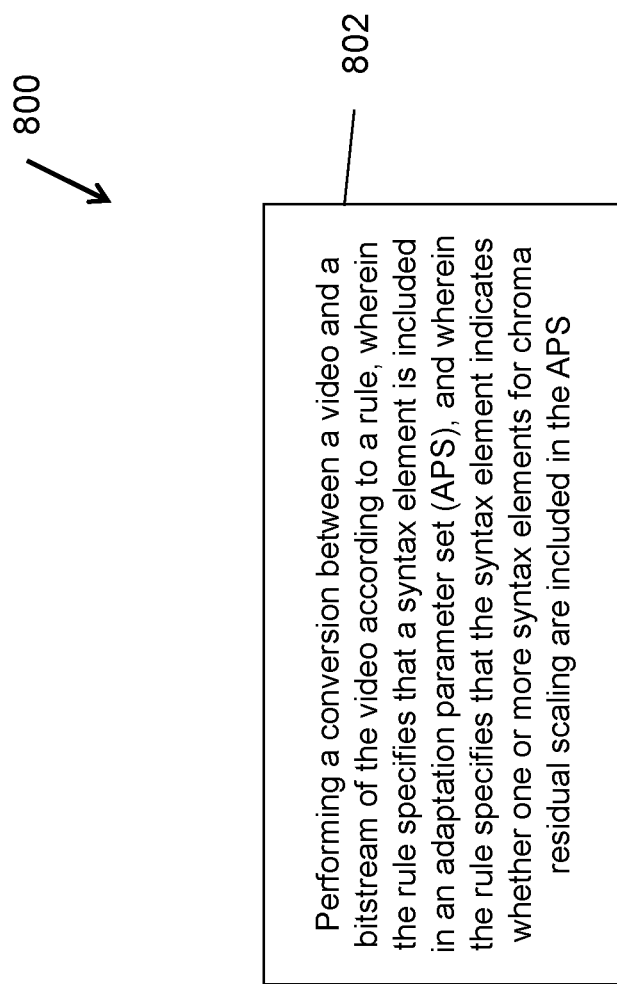

FIG. 8 is a flowchart for example method 800 of video processing. Operation 802 includes performing a conversion between a video and a bitstream of the video according to a rule, wherein the rule specifies that a syntax element is included in an adaptation parameter set (APS), and wherein the rule specifies that the syntax element indicates whether one or more syntax elements for chroma residual scaling are included in the APS.

In some embodiments of method 800, wherein the rule specifies that the one or more syntax elements for the chroma residual scaling are not included in the APS when a value of the syntax element indicating that the APS excludes a chroma component related syntax elements, and wherein the rule specifies that the syntax element in the APS indicates that the one or more syntax elements for the chroma residual scaling are not included in the APS. In some embodiments of method 800, the rule specifies that the one or more syntax elements for the chroma residual scaling are included in the APS when a value of the syntax element indicating the APS includes chroma component related syntax elements, and wherein the rule specifies that the syntax element in the APS indicates that the one or more syntax elements for the chroma residual scaling are included in the APS. In some embodiments of method 800, wherein the rule specifies that whether a current slice of the video is allowed to use the chroma residual scaling is dependent on the syntax element and is not dependent on the one or more syntax elements. In some embodiments of method 800, wherein the syntax element for the chroma residual scaling in the APS indicates an absolute codeword value of a variable related to luma mapping with chroma scaling (LMCS). In some embodiments of method 800, wherein the syntax element for the chroma residual scaling in the APS indicates a sign of a variable related to luma mapping with chroma scaling (LMCS).

Figure 9:
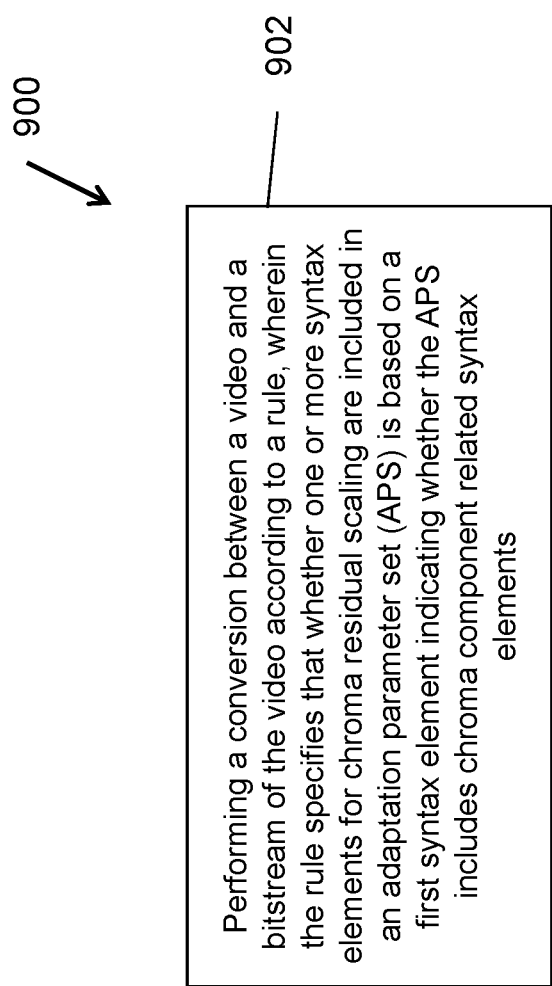

FIG. 9 is a flowchart for example method 900 of video processing. Operation 902 includes performing a conversion between a video and a bitstream of the video according to a rule, wherein the rule specifies that whether one or more syntax elements for chroma residual scaling are included in an adaptation parameter set (APS) is based on a first syntax element indicating whether the APS includes chroma component related syntax elements.

In some embodiments of method 900, wherein the rule specifies that a second value of a second syntax element from the one or more syntax element is equal to 0 when a first value of the first syntax element is equal to 0, wherein the second syntax element is associated with an APS network abstraction layer (NAL) unit, wherein a type of APS parameters for the APS NAL unit is a luma mapping with chroma scaling (LMCS) APS, and wherein a first identifier of the APS for the APS NAL unit is equal to equal to a second identifier in a picture header (PH) referred to by slices in a current picture. In some embodiments of method 900, the rule specifies that a second value of a second syntax element from the one or more syntax element is greater than 0 when a first value of the first syntax element is equal to 1, wherein the second syntax element is associated with an APS network abstraction layer (NAL) unit, wherein a type of APS parameters for the APS NAL unit is a luma mapping with chroma scaling (LMCS) APS, and wherein a first identifier of the APS for the APS NAL unit is equal to equal to a second identifier in a picture header (PH) referred to by slices in a current picture. In some embodiments of method 900, the first syntax element for the chroma residual scaling in the APS indicates an absolute codeword value of a variable related to luma mapping with chroma scaling (LMCS). In some embodiments of method(s) 700-900, wherein the rule specifies that the first syntax element or the syntax element indicates that a color format of the video is 4:0:0.

Figure 10:
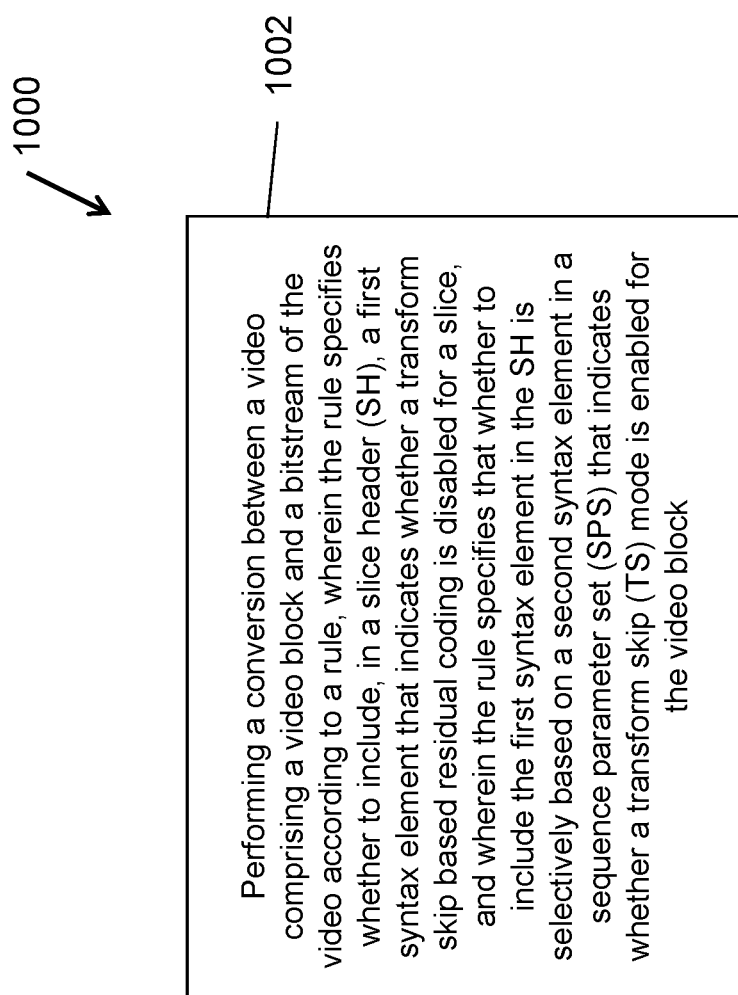

FIG. 10 is a flowchart for example method 1000 of video processing. Operation 1002 includes performing a conversion between a video comprising a video block and a bitstream of the video according to a rule, wherein the rule specifies whether to include, in a slice header (SH), a first syntax element that indicates whether a transform skip based residual coding is disabled for a slice, and wherein the rule specifies that whether to include the first syntax element in the SH is selectively based on a second syntax element in a sequence parameter set (SPS) that indicates whether a transform skip (TS) mode is enabled for the video block.

In some embodiments of method 1000, the rule specifies that the first syntax element is selectively included in the SH in response to the second syntax element indicating that the TS mode is enabled. In some embodiments of method 1000, the second syntax element in the SPS indicates whether a flag indicating whether a transform skip is applied to the video block is present in a transform unit syntax. In some embodiments of method 1000, the rule specifies that the first syntax element is selectively included in the SH in response to the second syntax element indicating that the flag is present in the transform unit syntax. In some embodiments of method 1000, the rule specifies that a first value of the first syntax element is based on a second value of the second syntax element. In some embodiments of method 1000, the rule specifies that the first value of the first syntax element is 0 when the second value of the second syntax element is 0. In some embodiments of method 1000, the rule further specifies that the first syntax element is included in the SH in response to the first syntax element not being based on any other syntax elements.

In some embodiments of method 1000, the rule specifies that one or more syntax elements are included to indicate whether either the transform skip based residual coding or a regular residual coding is enabled for the video block for which the transform skip mode is not enabled. In some embodiments of method 1000, the rule specifies that the one or more syntax elements are indicated at a video segment level to which the video block belongs. In some embodiments of method 1000, the video segment level includes a coding tree unit (CTU), a coding unit (CU), or a transform unit (TU). In some embodiments of method 1000, the rule specifies that the one or more syntax elements are indicated in the SPS, a picture parameter set (PPS), a picture header (PH), or the SH to indicate whether the transform skip based residual coding is disabled for the video block. In some embodiments of method 1000, the rule specifies that whether the transform skip based residual coding is enabled for the video block is based on coded information associated with the video block when the TS mode is not enabled for the video block. In some embodiments of method 1000, the coded information includes quantization parameter (QP) value for the video block. In some embodiments of method 1000, the rule specifies that either the transform skip based residual coding or a regular residual coding (RRC) mode is enabled for the video block when the QP value is less than or equal to a number X. In some embodiments of method 1000, X is equal to 4.

Figure 11:
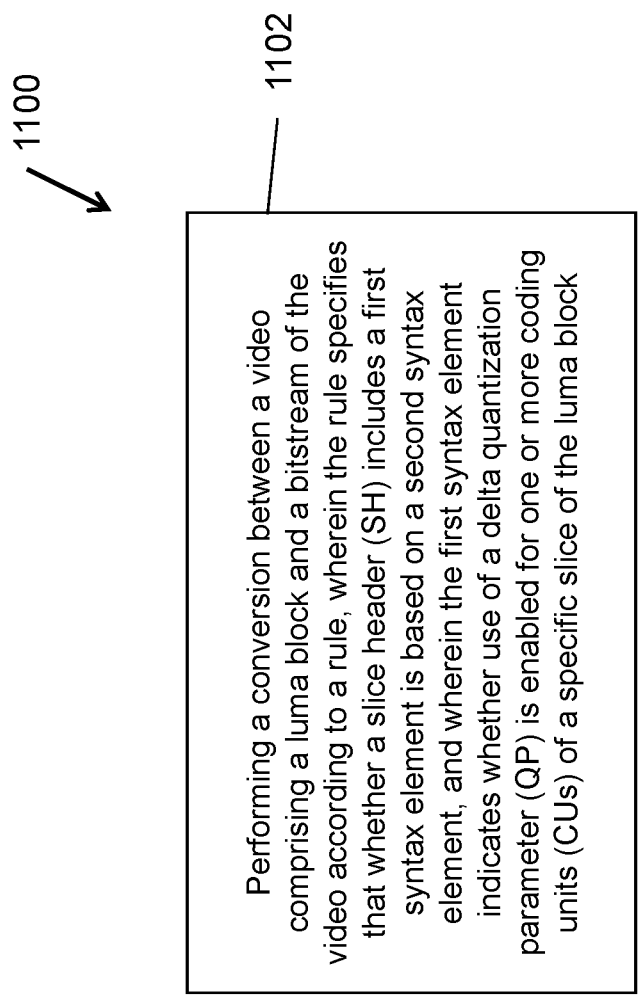

FIG. 11 is a flowchart for example method 1100 of video processing. Operation 1102 includes performing a conversion between a video comprising a luma block and a bitstream of the video according to a rule, wherein the rule specifies that whether a slice header (SH) includes a first syntax element is based on a second syntax element, and wherein the first syntax element indicates whether use of a delta quantization parameter (QP) is enabled for one or more coding units (CUs) of a specific slice of the luma block.

In some embodiments of method 1100, the rule specifies that whether the first syntax element is included in the SH is based on the second syntax element included in a picture parameter set (PPS) that indicates whether use of the delta QP is enabled for one or more video pictures of the video. In some embodiments of method 1100, the rule specifies that the first syntax element is not included in the SH and is inferred to have a first value of 0 when a second value of the second syntax element is 0, and wherein the rule specifies that the first syntax element is included in the SH when the second value of the second syntax element is 1. In some embodiments of method 1100, the rule specifies that a first value of the first syntax element is based on a second value of the second syntax element. In some embodiments of method 1100, the rule specifies that the second syntax element included in a picture parameter set (PPS) that indicates whether use of the delta QP is enabled for one or more video pictures of the video, and wherein the rule specifies that the second syntax element controls: (1) whether the first syntax element is included in the SH, and/or (2) whether a transform unit syntax and a palette coding syntax include a third syntax element that indicates an absolute value of a difference between a QP value of a current CU and a prediction value of the CU and/or a fourth syntax element that indicates a sign of the difference between the QP value of the current CU and the prediction value of the CU. In some embodiments of method 1100, the rule specifies that a picture parameter set (PPS) includes: an identifier for the PPS coded with ue(v), an initial value coded with se(v) indicating a luma QP for each slice referring to the PPS, and the second syntax element coded with u(1) indicating (1) whether ph_cu_qp_delta_subdiv_intra_slice syntax element and ph_cu_qp_delta_subdiv_inter_slice syntax element are present in one or more picture headers (PHs) referring to the PPS and (2) whether a third syntax element that indicates an absolute value of a difference between a QP value of a current CU and a prediction value of the CU is present in a transform unit syntax and a palette coding syntax, and a fourth syntax element coded with u(1) indicating whether chroma tool offsets related syntax elements are included in the PPS.

In some embodiments of method 1100, the rule specifies that when a value of the second syntax element is 1, the ph_cu_qp_delta_subdiv_intra_slice syntax element and the ph_cu_qp_delta_subdiv_inter_slice syntax element are present in the one or more PHs referring to the PPS and the third synax element is present in the transform unit syntax and the palette coding syntax, and wherein the rule specifies that when a value of the second syntax element is 0, the ph_cu_qp_delta_subdiv_intra_slice syntax element and the ph_cu_qp_delta_subdiv_inter_slice syntax element are not present in the one or more PHs referring to the PPS and the third syntax element is not present in the transform unit syntax and the palette coding syntax. In some embodiments of method 1100, a PH from the one or more PHs includes the following structure:

| picture_header_structure( ) { | Descriptor |
|---|---|
| gdr_or_irap_pic_flag | u(1) |
| ... | |
| if( ph_intra_slice_allowed_flag ) { | |
| ... | |
|   if( pps_cu_qp_delta_enabled_flag ) | |
|     ph_cu_qp_delta_subdiv_intra_slice | ue(v) |
| ... | |
| if( ph_inter_slice_allowed_flag ) { | |
| ... | |
|   if( pps_cu_qp_delta_enabled_flag ) | |
|     ph_cu_qp_delta_subdiv_inter_slice | ue(v). |
| ... | |

In some embodiments of method 1100, the rule specifies that the SH includes a fifth syntax element that indicates whether the third syntax element is present in the transform unit syntax and the palette coding syntax when the second syntax element in the PPS indicates that (1) the ph_cu_qp_delta_subdiv_intra_slice syntax element and the ph_cu_qp_delta_subdiv_inter_slice syntax element are present in the one or more PHs referring to the PPS, and that (2) the third syntax element is present in the transform unit syntax and the palette coding syntax. In some embodiments of method 1100, the rule specifies that when a value of the fifth syntax element is 1, the third syntax element is present in the transform unit syntax and the palette coding syntax, and wherein the rule specifies that when the value of the fifth syntax element is 0, the third syntax element is not present in the transform unit syntax and the palette coding syntax. In some embodiments of method 1100, the rule specifies that the first syntax element controls whether a third syntax element that indicates an absolute value of a difference between a QP value of a current CU and a prediction value of the CU is present in a transform unit syntax and a palette coding syntax. In some embodiments of method 1100, the rule specifies that when a first value of the first syntax value is 1, the third syntax element is included in the transform unit syntax and the palette coding syntax, and wherein the rule specifies that when the first value of the first syntax value is 0, the third syntax element is not included in the transform unit syntax and the palette coding syntax.

In some embodiments of method 1100, the rule specifies that a cu_qp_offset syntax element for a chroma block of the video is not controlled by the first syntax element of the SH, and the rule specifies that the cu_qp_offset syntax element for the chroma block is based on a flag indicated in a picture header (PH), a picture parameter set (PPS), or a sequence parameter set (SPS). In some embodiments of method 1100, the rule further specifies that a picture header (PH) includes a flag that controls whether use of the delta QP is enabled for the one or more CUs of the specific slice of the luma block.

Figure 12:
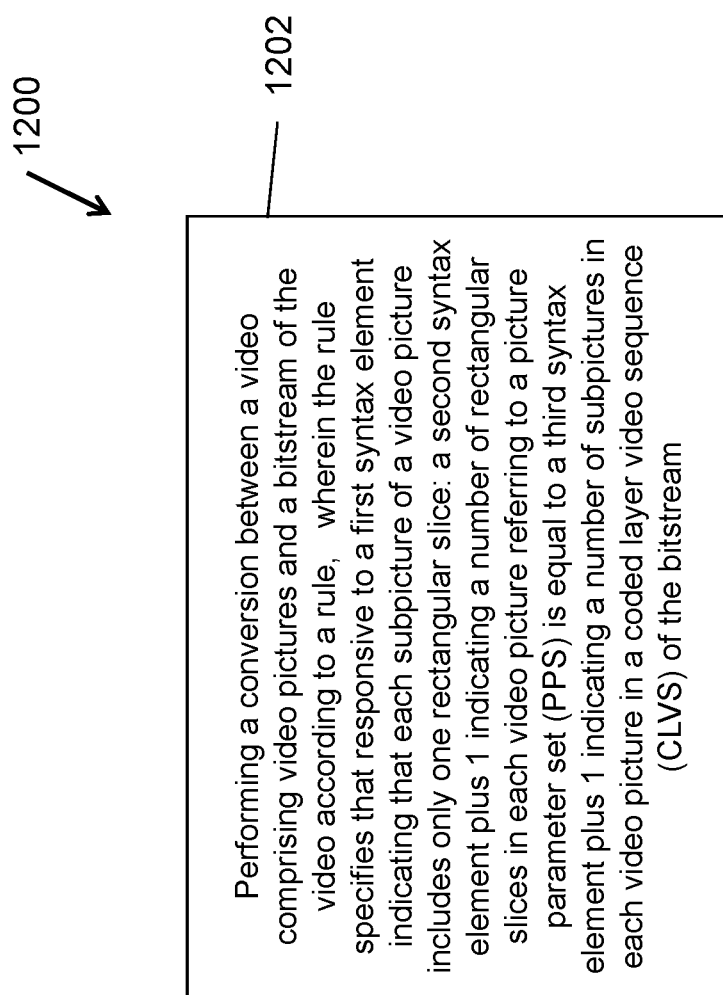

FIG. 12 is a flowchart for example method 1200 of video processing. Operation 1202 includes performing a conversion between a video comprising video pictures and a bitstream of the video according to a rule, wherein the rule specifies that responsive to a first syntax element indicating that each subpicture of a video picture includes only one rectangular slice: a second syntax element plus 1 indicating a number of rectangular slices in each video picture referring to a picture parameter set (PPS) is equal to a third syntax element plus 1 indicating a number of subpictures in each video picture in a coded layer video sequence (CLVS) of the bitstream.

In some embodiments of method 1200, the rule specifies that a first video picture and the second video picture of the video refer to different picture parameter sets (PPSs) when: (1) a value of the third syntax element is equal to 0, (2) a fourth syntax element indicates that a rectangular slice mode is in use for each video picture referring to the PPS and that a slice layout is included in the PPS, (3) the first video picture includes only one slice, and (4) a second video picture includes a plurality of slices. In some embodiments of method 1200, the rule specifies that each of subpicture of a video picture includes one or more rectangular slices and each of a plurality of subpictures of the video picture does not include only one rectangular slice when a value of the third syntax element is greater than 0, and wherein the rule specifies that each video picture comprises a plurality of slices when the value of the third syntax element is equal to 0. In some embodiments of method 1200, the rule specifies that a first value of the first syntax element is equal to 1 when a second value of the third syntax element is equal to 0 and when each video picture referring to the PPS includes only one slice. In some embodiments of method 1200, the rule specifies that a first value of the first syntax element is equal to 1 when a second value of the third syntax element is greater than 0 and when each video picture referring to the PPS includes only one slice.

In some embodiments of method 1200, the rule specifies that a first value of the first syntax element is equal to 1 when each subpicture of a video picture includes only one rectangular slice. In some embodiments of method 1200, the rule specifies that a presence of a tile_idx_delta_present_flag syntax element in the PPS is not based on the second syntax element In some embodiments of method 1200, the rule specifies that a presence of a tile_idx_delta_present_flag syntax element in the PPS is based on a fourth syntax element, wherein the fourth syntax element plus 2 indicates the number of rectangular slices in each video picture referring to the PPS. In some embodiments of method 1200, the rule specifies that a number of slices in a video picture is equal to the fourth syntax element plus 2. In some embodiments of method 1200, the rule specifies that a number of slices in a video picture is equal to 1 when a flag indicates that no picture partitioning is applied to each video picture referring to the PPS. In some embodiments of method 1200, the rule specifies that a number of slices in a video picture is equal to the second syntax element minus 1 when the first syntax element has a value of 1.

Figure 13:
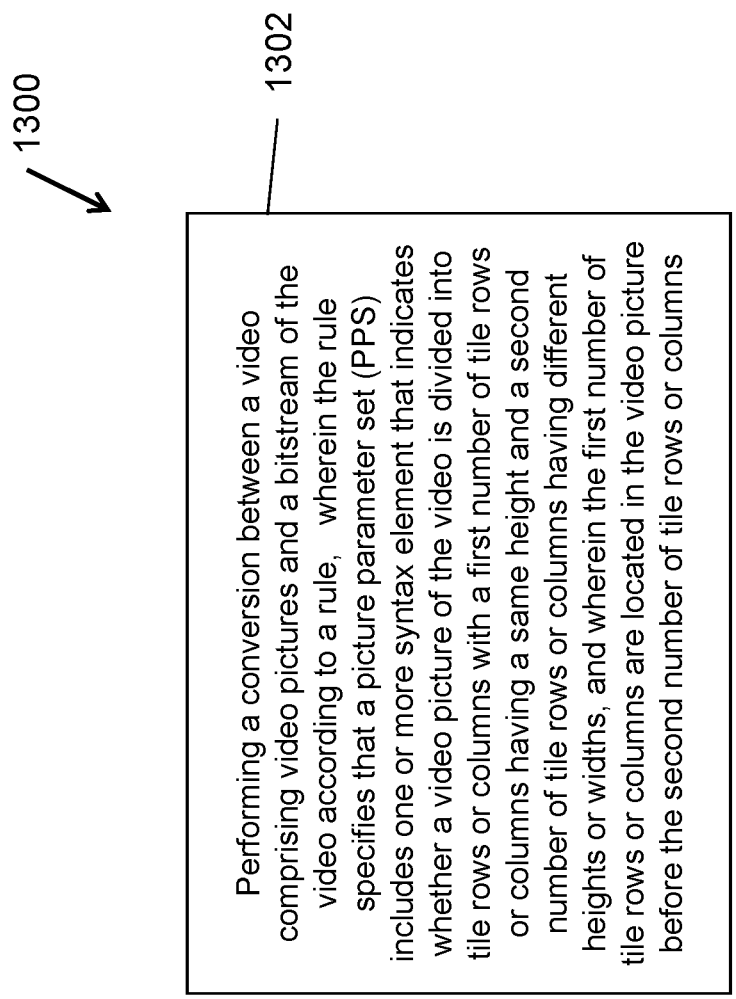

FIG. 13 is a flowchart for example method 1300 of video processing. Operation 1302 includes performing a conversion between a video comprising video pictures and a bitstream of the video according to a rule, wherein the rule specifies that a picture parameter set (PPS) includes one or more syntax element that indicates whether a video picture of the video is divided into tile rows or columns with a first number of tile rows or columns having a same height and a second number of tile rows or columns having different heights or widths, and wherein the first number of tile rows or columns are located in the video picture before the second number of tile rows or columns.

In some embodiments of method 1300, the rule specifies that when: (1) a flag in the PPS indicates that no picture partitioning is applied to each video picture referring to the PPS, and (2) a first syntax element in the PPS indicates that a number of explicitly provided tile column widths minus 1 is greater than 1, the PPS includes a second syntax element that indicates whether the video picture is divided into more than two tile columns with a first number of tile columns of a same width and a second number of tile columns having different widths, and wherein the first number of tile columns are located in the video picture before the second number of tile columns. In some embodiments of method 1300, the rule specifies that when (1) a flag in the PPS indicates that no picture partitioning is applied to each video picture referring to the PPS, and (2) a third syntax element in the PPS indicates that a number of explicitly provided tile rows heights minus 1 is greater than 1, wherein the PPS includes a fourth syntax element that indicates whether the video picture is divided into more than two tile rows with a first number of tile rows of a same height and a second number of tile rows having different heights, and wherein the first number of tile rows are located in the video picture before the second number of tile rows. In some embodiments of method 1300, the rule specifies that the tile column widths and/or the tile row heights are derived based on the second syntax element and the fourth syntax element, respectively In some embodiments of method 1300, the rule specifies that when a tile of the video picture is divided by multiple slices, the one or more syntax element in the PPS includes a first syntax element that indicates whether a tile is derived into multiple slice rows, wherein a first number of slice rows have a same height and a second number of slice rows have different heights, and wherein the first number of slice rows are located in the tile before the second number of slice rows. In some embodiments of method 1300, the rule specifies that slice heights of the multiple slices are derived based on a value of a second syntax element in the PPS, wherein the second syntax element indicates whether the video picture is divided into more than two tile rows with a first number of tile rows of a same height and a second number of tile rows having different heights, and wherein the first number of tile rows are located in the video picture before the second number of tile rows.

Figure 14:
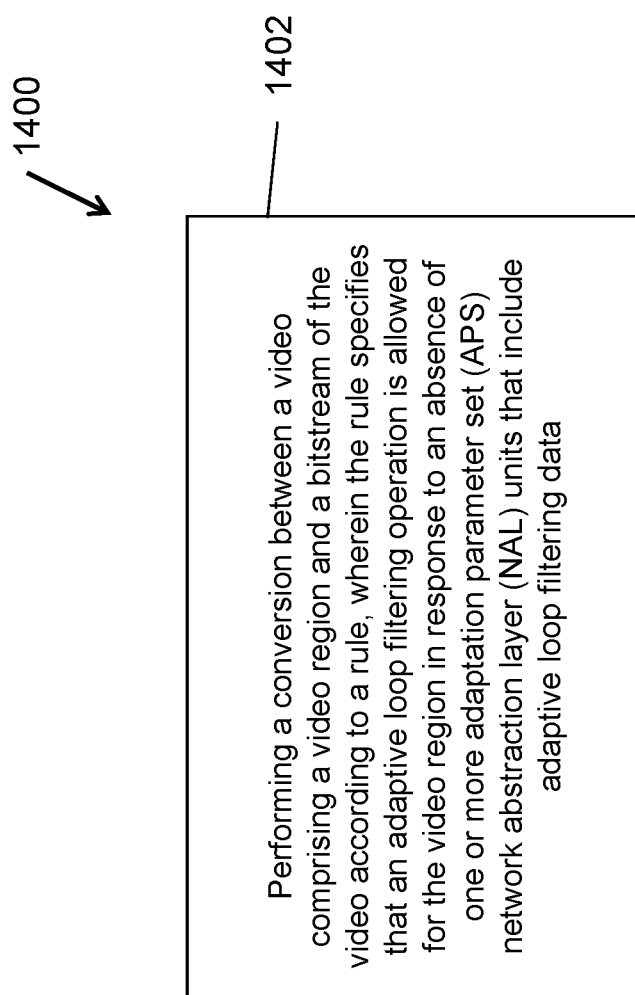

FIG. 14 is a flowchart for example method 1400 of video processing. Operation 1402 includes performing a conversion between a video comprising a video region and a bitstream of the video according to a rule, wherein the rule specifies that an adaptive loop filtering operation is allowed for the video region in response to an absence of one or more adaptation parameter set (APS) network abstraction layer (NAL) units that include adaptive loop filtering data.

In some embodiments of method 1400, the rule further specified that a general constraint syntax element equal to 1 specifies the absence of the one or more APS NAL units that include the adaptive loop filtering data. In some embodiments of method 1400, the rule further specifies that a sequence parameter set (SPS) includes a second syntax element that indicates that the adaptive loop filtering operation is enabled for a coded layer video sequence (CLVS). In some embodiments of method 1400, the rule further specifies that a sequence parameter set (SPS) includes a second syntax element that indicates that the adaptive loop filtering operation is disabled for a coded layer video sequence (CLVS). In some embodiments of method 1400, the rule further specifies that a second syntax element in a picture header (PH) indicates that the adaptive loop filtering operation is enabled for a current video picture to which the video region belongs, and/or wherein the rule further specifies that a third syntax element in a slice header (SH) indicates that the adaptive loop filtering operation is enabled for luma and chroma color components of a current slice to which the video region belongs.

In some embodiments of method 1400, the rule further specifies that a second syntax element in a picture header (PH) indicates that the adaptive loop filtering operation is disabled for a current video picture to which the video region belongs, and/or wherein the rule further specifies that a third syntax element in a slice header (SH) indicates that the adaptive loop filtering operation is disabled for luma and chroma color components of a current slice to which the video region belongs. In some embodiments of method 1400, the rule further specifies that the adaptive loop filtering operation is disabled for a chroma color component of the video region and that a cross-component adaptive loop filtering operation is disabled for the video region. In some embodiments of method 1400, the rule further specifies that the adaptive loop filtering operation is used for a luma component of the video region. In some embodiments of method 1400, the rule further specifies that values of the following syntax elements are equal to 0: ph_num_alf_aps_ids_luma, ph_alf_chroma_idc, slice_num_alf_aps_ids_luma, slice_alf_chroma_idc, and sps_ccalf_enabled_flag.

Figure 15:
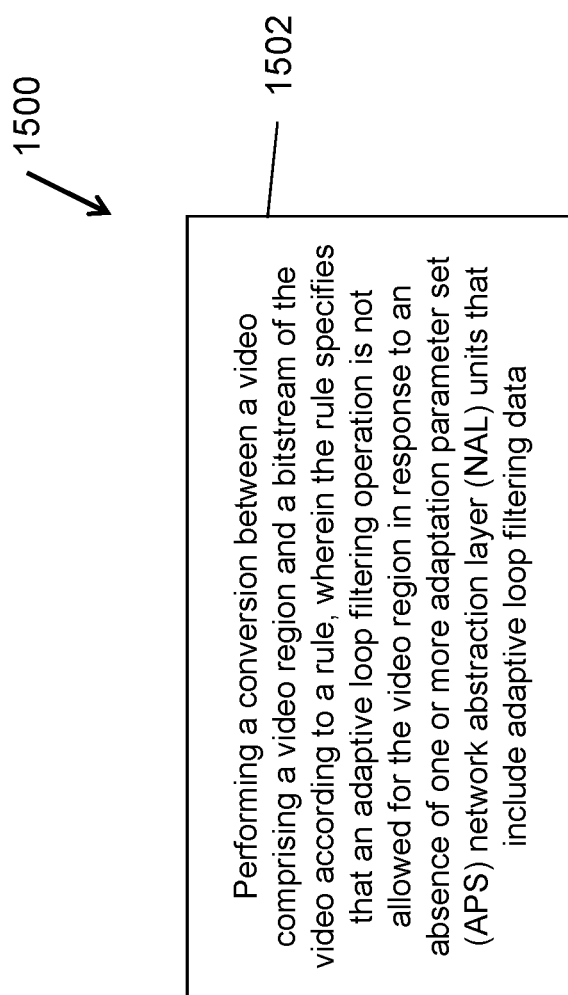

FIG. 15 is a flowchart for example method 1500 of video processing. Operation 1502 includes performing a conversion between a video comprising a video region and a bitstream of the video according to a rule, wherein the rule specifies that an adaptive loop filtering operation is not allowed for the video region in response to an absence of one or more adaptation parameter set (APS) network abstraction layer (NAL) units that include adaptive loop filtering data.

In some embodiments of method 1500, the rule further specifies that a sequence parameter set (SPS) includes a second syntax element and a third syntax element, wherein the second syntax element indicates that the adaptive loop filtering operation is disabled for a coded layer video sequence (CLVS), and wherein the third syntax element indicates that a cross-component adaptive loop filtering operation is disabled for a coded layer video sequence (CLVS).

Figure 16:
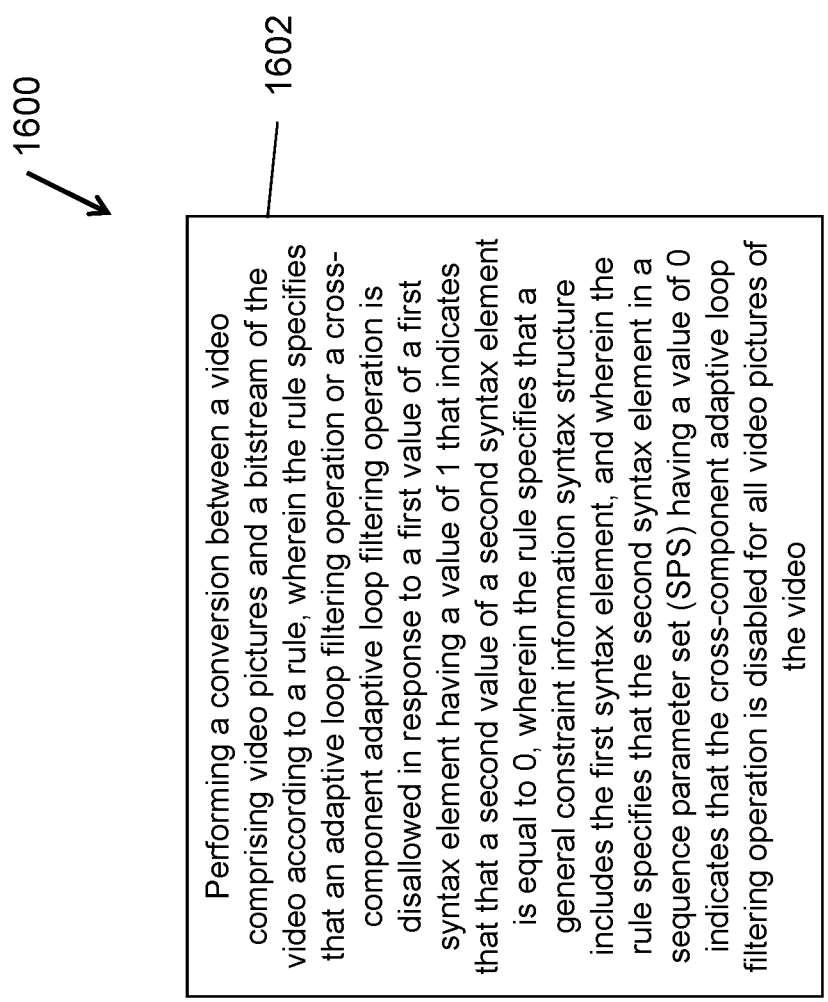

FIG. 16 is a flowchart for example method 1600 of video processing. Operation 1602 includes performing a conversion between a video comprising video pictures and a bitstream of the video according to a rule, wherein the rule specifies that an adaptive loop filtering operation or a cross-component adaptive loop filtering operation is disallowed in response to a first value of a first syntax element having a value of 1 that indicates that that a second value of a second syntax element is equal to 0, wherein the rule specifies that a general constraint information syntax structure includes the first syntax element, and wherein the rule specifies that the second syntax element in a sequence parameter set (SPS) having a value of 0 indicates that the cross-component adaptive loop filtering operation is disabled for all video pictures of the video.

In some embodiments of method 1600, the rule specifies that a third value of a third syntax element in the SPS is 0 that indicates that the ALF is disabled for a coded layer video sequence (CLVS).

Figure 17:
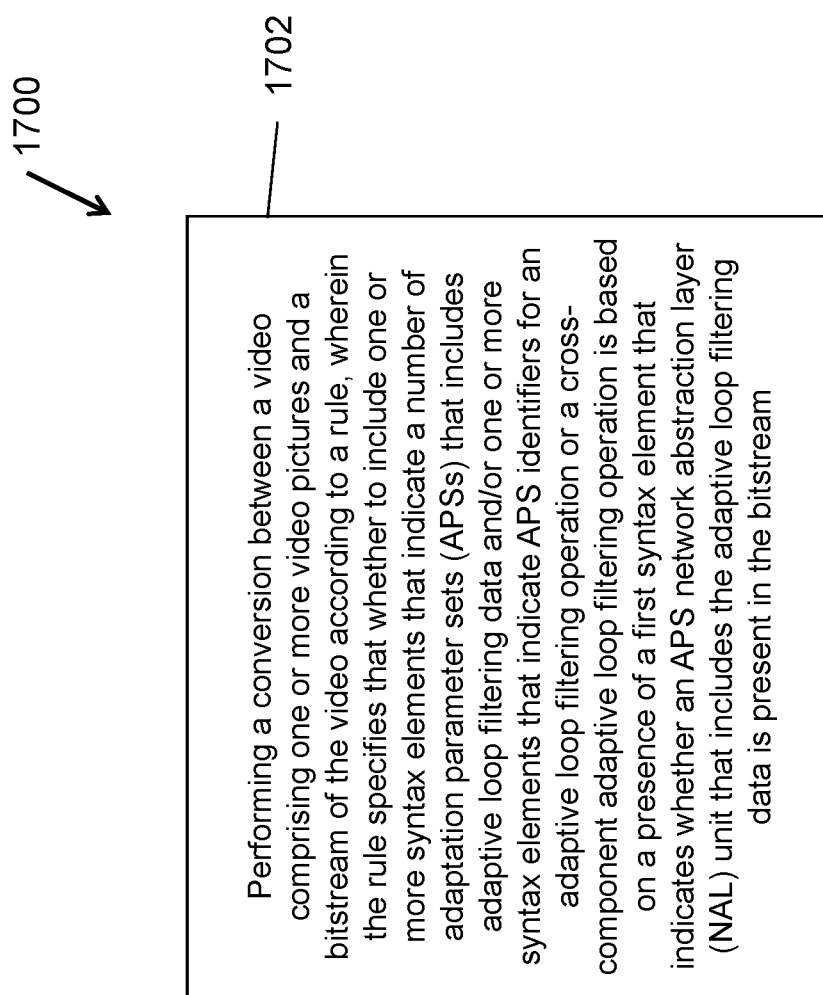

FIG. 17 is a flowchart for example method 1700 of video processing. Operation 1702 includes performing a conversion between a video comprising one or more video pictures and a bitstream of the video according to a rule, wherein the rule specifies that whether to include one or more syntax elements that indicate a number of adaptation parameter sets (APSs) that includes adaptive loop filtering data and/or one or more syntax elements that indicate APS identifiers for an adaptive loop filtering operation or a cross-component adaptive loop filtering operation is based on a presence of a first syntax element that indicates whether an APS network abstraction layer (NAL) unit that includes the adaptive loop filtering data is present in the bitstream.

In some embodiments of method 1700, the rule specifies that the one or more syntax elements are not included in response to the first syntax element indicating an absence of the APS NAL unit that includes the adaptive loop filtering data in the bitstream. In some embodiments of method 1700, the first syntax element indicates that there is no network abstraction layer (NAL) unit having a type of a NAL unit header (NUH) that indicates (1) that the NAL unit precede a first video coding layer (VCL) of a prediction unit (PU) of the video region or (2) that the NAL unit follows a last VCL of the PU of the video region.

In some embodiments of method 1700, the one or more syntax elements includes a second syntax element that indicates the number of APSs that includes the adaptive loop filtering data and that are referred to by video slices in a current video picture, and wherein the second syntax element is included in a picture header (PH). In some embodiments of method 1700, the one or more syntax elements includes: a third syntax element that indicates a first APS identifier for a first APS that includes the adaptive loop filtering data, wherein the first APS identifier is referred to by a luma component of a slice in a current video picture, or a fourth syntax element that indicates a second APS identifier for a second APS that includes the adaptive loop filtering data, wherein the second APS identifier is referred to by chroma color components of the slice in the current video picture, or a fifth syntax element that indicates a third APS identifier for a third APS that includes the adaptive loop filtering data, wherein the third APS identifier is referred to by a Cb chroma color component of the slice in the current video picture, or a sixth syntax element that indicates a fourth APS identifier for a fourth APS that includes the adaptive loop filtering data, wherein the fourth APS identifier is referred to by a Cr chroma color component of the slice in the current video picture, and wherein the third syntax element, the fourth syntax element, the fifth syntax element, or the sixth syntax element is included in a picture header (PH).

Figure 18:
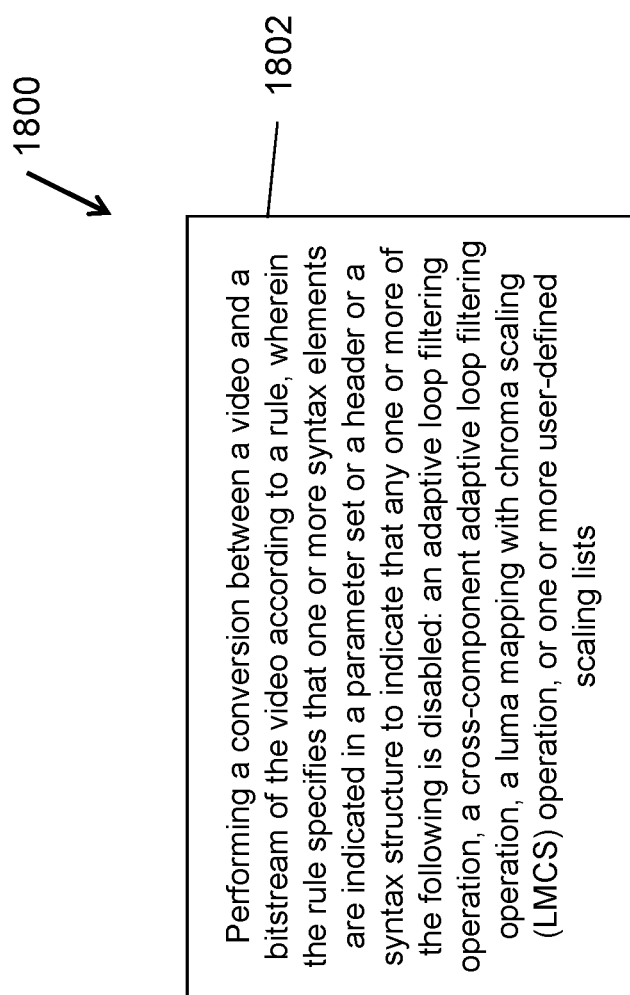

FIG. 18 is a flowchart for example method 1800 of video processing. Operation 1802 includes performing a conversion between a video and a bitstream of the video according to a rule, wherein the rule specifies that one or more syntax elements are indicated in a parameter set or a header or a syntax structure to indicate that any one or more of the following is disabled: an adaptive loop filtering operation, a cross-component adaptive loop filtering operation, a luma mapping with chroma scaling (LMCS) operation, or one or more user-defined scaling lists.

In some embodiments of method 1800, the parameter set includes a sequence parameter set (SPS) or a picture parameter set (PPS). In some embodiments of method 1800, the header includes a picture header (PH) or a slice header (SH). In some embodiments of method 1800, the syntax structure includes a general constraint information syntax structure.

Figure 19:
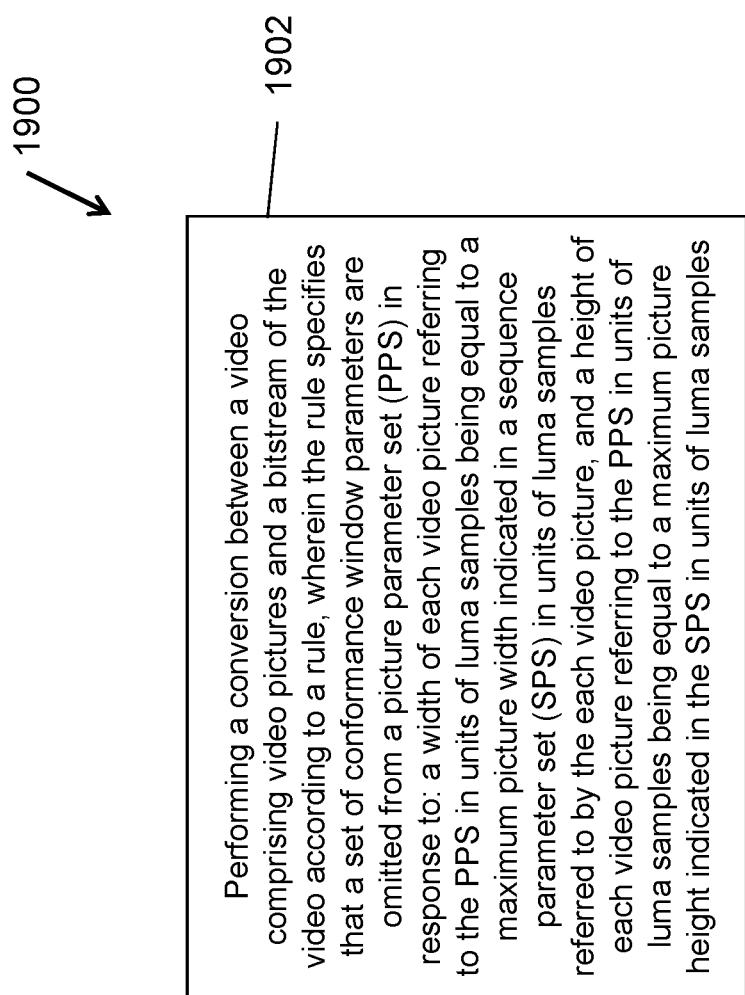

FIG. 19 is a flowchart for example method 1900 of video processing. Operation 1902 includes performing a conversion between a video comprising video pictures and a bitstream of the video according to a rule, wherein the rule specifies that a set of conformance window parameters are omitted from a picture parameter set (PPS) in response to: a width of each video picture referring to the PPS in units of luma samples being equal to a maximum picture width indicated in a sequence parameter set (SPS) in units of luma samples referred to by the each video picture, and a height of each video picture referring to the PPS in units of luma samples being equal to a maximum picture height indicated in the SPS in units of luma samples.

In some embodiments of method 1900, rule specifies that a syntax element having a certain value indicates that: (1) the width of each video picture is equal to the maximum picture width, and (2) the height of each video picture is equal to the maximum picture height. In some embodiments of method 1900, the rule specifies that a syntax element is equal to 0 in response to: (1) a first value of a PPS syntax element indicating the width of each video picture being equal to a second value of a SPS syntax element indicating the maximum picture width, and (2) a third value of the PPS syntax element indicating the height of each video picture being equal to a fourth value of the SPS syntax element indicating the maximum picture height. In some embodiments of method 1900, the syntax element specifies that whether conformance cropping window offset parameters are present in the PPS. In some embodiments of method 1900, the rule specifies that the PPS includes syntax elements indicating the width of each video picture and the height of each video picture.

In some embodiments of method 1900, rule specifies that the syntax element having a value of 1 minus the certain value indicates that: (1) the width of each video picture is less than the maximum picture width, and (2) the height of each video picture is less than the maximum picture height. In some embodiments of method 1900, the rule specifies that in response to the syntax element having the certain value, the set of conformance window parameters are not included in the PPS. In some embodiments of method 1900, the set of conformance windows parameters includes: a first syntax element that indicates whether a conformance cropping window offset parameters follow next in the PPS, and four additional syntax elements that indicate samples of a video picture in a coded layer video sequence (CLVS) in terms of a rectangular region specified in picture coordinates. In some embodiments of method 1900, values for the set of conformance window parameters are inferred to be equal to a second set of conformance window parameters included in the SPS. In some embodiments of method 1900, the second set of conformance windows parameters includes: a sixth syntax element that indicates whether a conformance cropping window offset parameter follow next in the SPS, four additional syntax elements that specify coordinates of a cropping window that is applied to one or more video pictures having: (1) a width that is equal to the maximum picture width, and (2) a height that is equal to the maximum picture height.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   performing a conversion between a video comprising a video region and a bitstream of the video according to a rule,
   wherein the rule specifies that when a first general constraint information syntax element is equal to 1, an adaptive loop filtering (ALF) operation for a chroma component of the video region is disabled, a cross-component adaptive loop filter (CC-ALF) operation for the video region is disabled, and an ALF operation for a luma component of the video region is allowed, and
   wherein the first general constraint information syntax element equal to 1 specifies an absence of one or more adaptation parameter set (APS) network abstraction layer (NAL) units that include ALF data.

2. The method of claim 1, wherein the rule further specifies that when the first general constraint information syntax element is equal to 1, a value of a second syntax element included in a sequence parameter set (SPS), a picture header (PH), or a slice header (SH) indicating whether the ALF operation is enabled or disabled is allowed to be equal to 1, and wherein the second syntax element equal to 1 specifies that the ALF operation is allowed to be enabled in a sequence level, a picture level, or a slice level.

3. The method of claim 1, wherein the rule further specifies that when the first general constraint information syntax element is equal to 1, a value of a third syntax element included in a sequence parameter set (SPS) indicating whether the CC-ALF operation is enabled or disabled is equal to 0, and wherein the third syntax element equal to 0 specifies that the CC-ALF operation is disabled in a sequence level.

4. The method of claim 1, wherein the rule further specifies that when the first general constraint information syntax element is equal to 1, a value of a fourth syntax element included in a picture header (PH) that specifies a number of ALF APSs referred to by slices associated with the PH is equal to 0.

5. The method of claim 1, wherein the rule further specifies that when the first general constraint information syntax element is equal to 1, a value of a fifth syntax element included in a slice header (SH) that specifies a number of ALF APSs referred to by a slice is equal to 0.

6. The method of claim 1, wherein the rule further specifies that when the first general constraint information syntax element is equal to 1, values of the following syntax elements are equal to 0:
   ph_num_alf_aps_ids_luma,
   slice_num_alf_aps_ids_luma, and
   sps_ccalf_enabled_flag.

7. The method of claim 1, wherein the performing the conversion comprises encoding the video into the bitstream.

8. The method of claim 1, wherein the performing the conversion comprises decoding the video from the bitstream.

9. An apparatus for processing video data comprising a processor and a non-transitory memory with instructions thereon, wherein the instructions upon execution by the processor, cause the processor to:
   perform a conversion between a video comprising a video region and a bitstream of the video according to a rule, wherein the rule specifies that when a first general constraint information syntax element is equal to 1, an adaptive loop filtering (ALF) operation for a chroma component of the video region is disabled, a cross-component adaptive loop filter (CC-ALF) operation for the video region is disabled, and an ALF operation for a luma component of the video region is allowed, and wherein the first general constraint information syntax element equal to 1 specifies an absence of one or more adaptation parameter set (APS) network abstraction layer (NAL) units that include ALF data.

10. The apparatus of claim 9, wherein the rule further specifies that when the first general constraint information syntax element is equal to 1, a value of a second syntax element included in a sequence parameter set (SPS), a picture header (PH), or a slice header (SH) indicating whether the ALF operation is enabled or disabled is allowed to be equal to 1, and wherein the second syntax element equal to 1 specifies that the ALF operation is allowed to be enabled in a sequence level, a picture level or a slice level; and wherein the rule further specifies that when the first general constraint information syntax element is equal to 1, a value of a third syntax element included in a sequence parameter set (SPS) indicating whether the CC-ALF operation is enabled or disabled is equal to 0, and wherein the third syntax element equal to 0 specifies that the CC-ALF operation is disabled in a sequence level.

11. The apparatus of claim 9, wherein the rule further specifies that when the first general constraint information syntax element is equal to 1, a value of a fourth syntax element included in a picture header (PH) that specifies a number of ALF APSs referred to by slices associated with the PH is equal to 0;

wherein the rule further specifies that when the first general constraint information syntax element is equal to 1, a value of a fifth syntax element included in a slice header (SH) that specifies a number of ALF APSs referred to by a slice is equal to 0.

12. The apparatus of claim 9, wherein the rule further specifies that when the first general constraint information syntax element is equal to 1, values of the following syntax elements are equal to 0:
ph_num_alf_aps_ids_luma,
slice_num_alf_aps_ids_luma, and
sps_ccalf_enabled_flag.

13. A non-transitory computer-readable storage medium storing instructions that cause a processor to:
perform a conversion between a video comprising a video region and a bitstream of the video according to a rule,
wherein the rule specifies that when a first general constraint information syntax element is equal to 1, an adaptive loop filtering (ALF) operation for a chroma component of the video region is disabled, a cross-component adaptive loop filter (CC-ALF) operation for the video region is disabled, and an ALF operation for a luma component of the video region is allowed, and
wherein the first general constraint information syntax element equal to 1 specifies an absence of one or more adaptation parameter set (APS) network abstraction layer (NAL) units that include ALF data.

14. The non-transitory computer-readable storage medium of claim 13, wherein the rule further specifies that when the first general constraint information syntax element is equal to 1, a value of a second syntax element included in a sequence parameter set (SPS), a picture header (PH), or a slice header (SH) indicating whether the ALF operation is enabled or disabled is allowed to be equal to 1, and wherein the second syntax element equal to 1 specifies that the ALF operation is allowed to be enabled in a sequence level, a picture level or a slice level; and wherein the rule further specifies that when the first general constraint information syntax element is equal to 1, a value of a third syntax element included in a sequence parameter set (SPS) indicating whether the CC-ALF operation is enabled or disabled is equal to 0, and wherein the third syntax element equal to 0 specifies that the CC-ALF operation is disabled in a sequence level.

15. The non-transitory computer-readable storage medium of claim 13, wherein the rule further specifies that when the first general constraint information syntax element is equal to 1, a value of a fourth syntax element included in a picture header (PH) that specifies a number of ALF APSs referred to by slices associated with the PH is equal to 0;

wherein the rule further specifies that when the first general constraint information syntax element is equal to 1, a value of a fifth syntax element included in a slice header (SH) that specifies a number of ALF APSs referred to by a slice is equal to 0.

16. The non-transitory computer-readable storage medium of claim 13, wherein the rule further specifies that when the first general constraint information syntax element is equal to 1, values of the following syntax elements are equal to 0:
ph_num_alf_aps_ids_luma,
slice_num_alf_aps_ids_luma, and
sps_ccalf_enabled_flag.

17. A non-transitory computer-readable recording medium storing a bitstream of a video which is generated by a method performed by a video processing apparatus, wherein the method comprises:
generating the bitstream for the video which comprises a video region according to a rule,
wherein the rule specifies that when a first general constraint information syntax element is equal to 1, an adaptive loop filtering (ALF) operation for a chroma component of the video region is disabled, a cross-component adaptive loop filter (CC-ALF) operation for the video region is disabled, and an ALF operation for a luma component of the video region is allowed, and
wherein the first general constraint information syntax element equal to 1 specifies an absence of one or more adaptation parameter set (APS) network abstraction layer (NAL) units that include ALF data.

18. The non-transitory computer-readable recording medium of claim 17, wherein the rule further specifies that when the first general constraint information syntax element is equal to 1, a value of a second syntax element included in a sequence parameter set (SPS), a picture header (PH), or a slice header (SH) indicating whether the ALF operation is enabled or disabled is allowed to be equal to 1, and wherein the second syntax element equal to 1 specifies that the ALF operation is allowed to be enabled in a sequence level, a picture level or a slice level; and wherein the rule further specifies that when the first general constraint information syntax element is equal to 1, a value of a third syntax element included in a sequence parameter set (SPS) indicating whether the CC-ALF operation is enabled or disabled is equal to 0, and wherein the third syntax element equal to 0 specifies that the CC-ALF operation is disabled in a sequence level.

19. The non-transitory computer-readable recording medium of claim 17, wherein the rule further specifies that when the first general constraint information syntax element is equal to 1, a value of a fourth syntax element included in a picture header (PH) that specifies a number of ALF APSs referred to by slices associated with the PH to is equal to 0;
  wherein the rule further specifies that when the first general constraint information syntax element is equal to 1, a value of a fifth syntax element included in a slice header (SH) that specifies a number of ALF APSs referred to by a slice is equal to 0.

20. The non-transitory computer-readable recording medium of claim 17, wherein the rule further specifies that when the first general constraint information syntax element is equal to 1, values of the following syntax elements are equal to 0:
  ph_num_alf_aps_ids_luma,
  slice_num_alf_aps_ids_luma, and
  sps_ccalf_enabled_flag.

* * * * *